United States Patent [19]
Katayama

[11] Patent Number: 5,875,167
[45] Date of Patent: Feb. 23, 1999

[54] OPTICAL HEAD DEVICE

[75] Inventor: Ryuichi Katayama, Tokyo, Japan

[73] Assignee: NEC Corporation, Tokyo, Japan

[21] Appl. No.: 796,152

[22] Filed: Feb. 6, 1997

[30] Foreign Application Priority Data

Feb. 6, 1996 [JP] Japan .................................... 8-019744
Sep. 20, 1996 [JP] Japan .................................... 8-250081

[51] Int. Cl.⁶ ..................................................... G11B 7/00
[52] U.S. Cl. .................. 369/112; 369/44.32; 369/44.37; 369/94; 369/118
[58] Field of Search .............................. 369/112, 94, 110, 369/109, 54, 44.37, 44.32, 118

[56] References Cited

U.S. PATENT DOCUMENTS

| | | | |
|---|---|---|---|
| 4,908,813 | 3/1990 | Ojima et al. ................................. | 369/94 |
| 5,661,711 | 8/1997 | Tanaka et al. ............................. | 369/112 |
| 5,696,749 | 12/1997 | Brazas, Jr. et al. ....................... | 369/112 |
| 5,696,750 | 12/1997 | Katayama et al. ........................ | 369/112 |
| 5,703,856 | 12/1997 | Hayashi et al. ........................... | 369/112 |

FOREIGN PATENT DOCUMENTS

| | | |
|---|---|---|
| A0731457 | 9/1996 | European Pat. Off. . |
| A0742552 | 11/1996 | European Pat. Off. . |
| A0747893 | 12/1996 | European Pat. Off. . |
| A6259804 | 9/1994 | Japan . |
| 765407 | 3/1995 | Japan . |
| A8-55363 | 2/1996 | Japan . |

*Primary Examiner*—Tod R. Swann
*Assistant Examiner*—Kim-Kwok Chu
*Attorney, Agent, or Firm*—Sughrue, Mion, Zinn, Macpeak & Seas, PLLC

[57] ABSTRACT

Disclosed is an optical head device, including: a first light source which emits light with a first wavelength; a second light source which emits light with a second wavelength; first and second optical detectors; an optical coupling and dividing means in which light emitted from the first light source and light emitted from the second light source are coupled and are each respectively led to an optical recording medium having a first and a second substrate thickness, and in which the lights emitted from the first and second light sources, and reflected on the optical recording medium, are led to the first and second optical detectors, respectively; and, a lens system which is disposed between the optical coupling and dividing means and the optical recording medium, and includes an objective lens; wherein the second substrate thickness is set to be greater than the first substrate thickness, and an effective optical path length from the second light source to the lens system is set to be shorter than an effective optical path length from the first light source to the lens system, and wherein the recording or reproducing of the optical recording medium with the first and second substrate thickness is conducted by using the light emitted from the first and the second light sources, respectively.

61 Claims, 53 Drawing Sheets

- 33 HOLOGRAM
- 17: INCIDENT LIGHT
- 36: ADHESIVE
- 35: DIELECTRIC MULTILAYER FILM
- 34: SiO₂ FILM
- 18: INCIDENT LIGHT

- 33
- 17
- 39: ADHESIVE
- 38: DIELECTRIC MULTILAYER FILM
- 37: SiO₂ FILM
- 18

5 APERTURE CONTROL DEVICE
43, 44, 46
46, 47
17B — 17B

44: DIELECTRIC MULTILAYER FILM
5
47: SiO₂ FILM
43: SiO₂ FILM
46: GLASS SUBSTRATE
40: GLASS SUBSTRATE
45: ADHESIVE

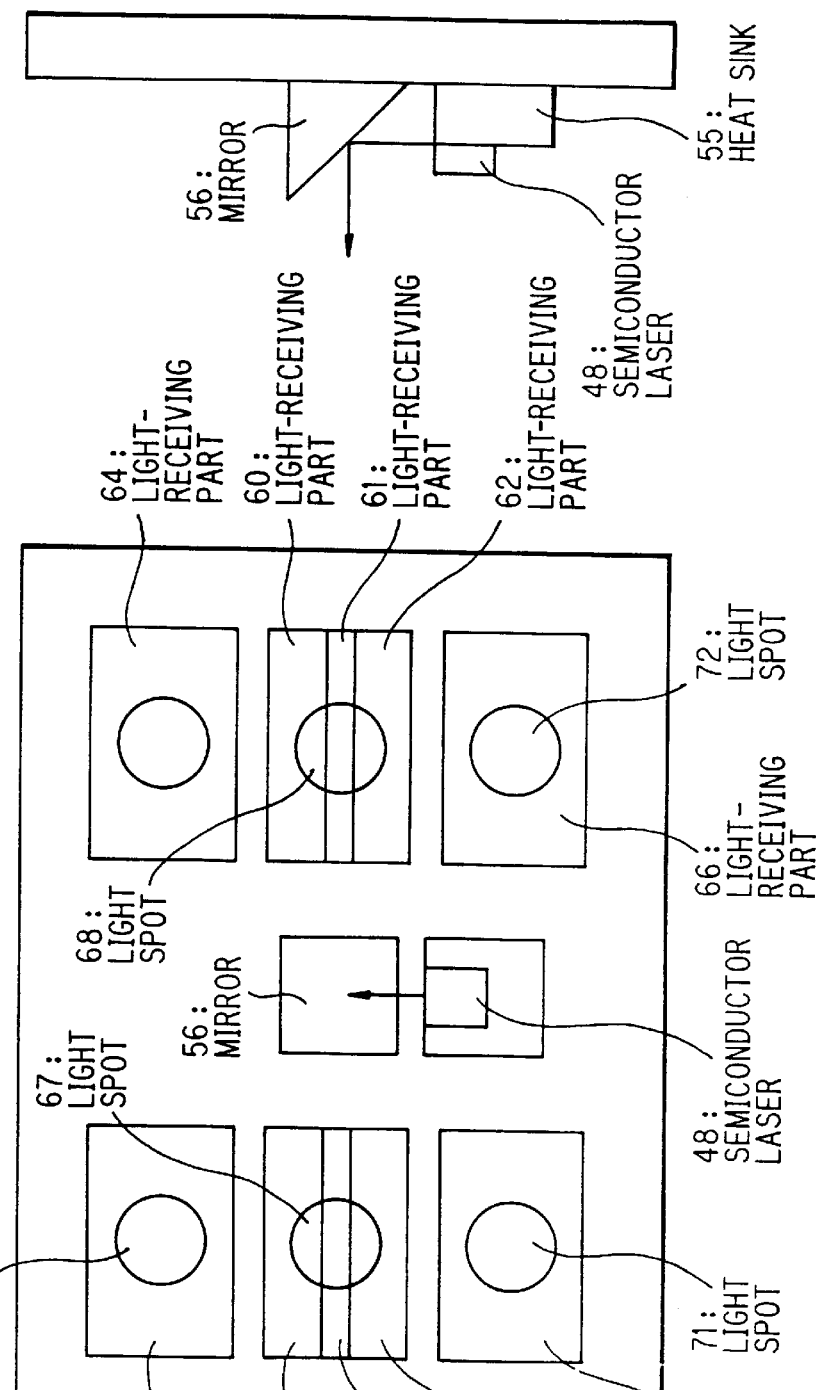

112 : REGION
113 : REGION
114 : REGION
115 : REGION

111 : Nb$_2$O$_5$
110 : PROTON EXCHANGING REGION
109 : LITHIUM NIOBATE SUBSTRATE

178 OPTICAL COUPLING AND DIVIDING/OPTICAL PATH CONTROL DEVICE
180: DIELECTRIC MULTILAYER FILM
167: REFLECTION FILM
179: DIELECTRIC MULTILAYER FILM
164: PRISM
181: INCIDENT LIGHT
163: PRISM
162: PRISM

182: INCIDENT LIGHT

183: INCIDENT LIGHT

178 OPTICAL COUPLING AND DIVIDING/ OPTICAL PATH CONTROL DEVICE

10: PRISM
181: INCIDENT LIGHT
9: PRISM
196: HOLOGRAM

207 OPTICAL PATH CONTROL DEVICE
213: PRISM
216: REFLECTION FILM
217: INCIDENT LIGHT
215: REFLECTION FILM
212: PRISM
214: DIELECTRIC MULTILAYER FILM

218: INCIDENT LIGHT

219 OPTICAL PATH CONTROL DEVICE
221: PRISM
217: INCIDENT LIGHT
220: PRISM
222: DIELECTRIC MULTILAYER FILM

218: INCIDENT LIGHT

207
OPTICAL PATH CONTROL DEVICE

217: INCIDENT LIGHT
9: PRISM
228: HOLOGRAM

207

9
228
218: INCIDENT LIGHT

OPTICAL HEAD DEVICE

FIELD OF THE INVENTION

This invention relates to an optical head device used for the recording or reproducing of an optical recording medium, and more particularly to, an optical head device used for the recording or reproducing of two kinds of optical recording mediums with different substrate thicknesses.

BACKGROUND OF THE INVENTION

Recently, the standardization of an optical disk with large storage capacity such as a digital video disk has been discussed. In the standard of digital video disk, an optical disk with a substrate thickness of 0.6 mm is used. On the other hand, in the standard of conventional compact disk, an optical disk with a substrate thickness of 1.2 mm is used. Thus, an optical head device which can be used for the reproducing of both the digital video disk and compact disk is desired.

However, in a conventional optical head device, since an objective lens thereof is designed such that it cancels a spherical aberration as to a disk with a predetermined substrate thickness, there remains a spherical aberration as to another disk with a different substrate thickness, therefore resulting in failure in reproduction. Therefore, many optical head devices have been suggested which can be used for the reproducing of both the digital video disk and compact disk with different substrate thicknesses( for example, Japanese patent application laid-open No. 7-65407 (1995)).

FIG. 1 shows a composition of a conventional optical head device. As shown in FIG. 1, around half of emitted light from a semiconductor laser 237 is reflected by a half mirror 238, being transmitted through an aperture 239, entering an optical path control device 240, thereby being divided into a first light and a second light. The first light emitted from the optical path control device 240 is transmitted through a collimator lens 4, entering an objective lens 6 as a collimated light, thereby being focused on a disk 7 which is a first optical disk such as a digital video disk with a substrate thickness of 0.6 mm. On the other hand, the second light emitted from the optical path control device 240 is transmitted through the collimator lens 4, entering the objective lens 6 as a divergent light, thereby being focused on a disk 8 which is a second optical disk such as a compact disk with a substrate thickness of 1.2 mm.

Then, the first and second lights are reflected on the disk 7 and disk 8, respectively, being reversely transmitted through the objective lens 6, collimator lens 4, optical path control device 240 and aperture 239, around its half being transmitted through the half mirror 238, further being transmitted through a concave lens 241, being received by an optical detector 242.

FIGS. 2A and 2B show a composition of the optical path control device 240. The optical path control device 240 is composed of a prism 243 and a prism 244 which are adhered through a polarization separating film 245. The polarization separating film 245 has a function that a P-polarization component of an incident light is all transmitted through and a S-polarization component of the incident light is all reflected. Of the incident light to the optical path control device 240, an incident light 248, which is a P-polarization component to the polarization separating film 245, as shown in FIG. 2A, is all transmitted through the polarization separating film 245, being reflected on reflection films 246, 247 of the prism 244, again being all transmitted through the polarization separating film 245, then being emitted from the prism 243 as the first light. On the other hand, of the incident light to the optical path control device 240, an incident light 249, which is a S-polarization component to the polarization separating film 245, as shown in FIG. 2B, is all reflected on the polarization separating film 245, being emitted from the prism 243 as the second light.

Accordingly, in the conventional optical head device shown in FIG. 1, by the optical path control device 240, effective optical path lengths as to the first and second lights are different from each other, i.e., the effective optical path length from the semiconductor laser 237 to the collimator lens 4 as to the second light is shorter than that as to the first light. Thus, if the effective optical path length from the semiconductor laser 237 to the collimator lens 4 is adjusted such that the first light enters the objective lens 6 as a collimated light, the second light will enter the objective lens 6 as a divergent light. The objective lens 6 has a spherical aberration that cancels a spherical aberration which occurs when a collimated light entering the objective lens 6 is transmitted through a substrate with a thickness of 0.6 mm. Therefore, when the collimated light entering the objective lens 6 is transmitted through a substrate with a thickness of 1.2 mm, there remains a spherical aberration. However, if a divergent light enters the objective lens 6, there occurs a new spherical aberration due to a movement of the image point of the objective lens 6, thereby the remaining spherical aberration when transmitting through the substrate with 1.2 mm thickness being canceled. Thus, if the difference of the effective optical path lengths from the semiconductor laser 237 to the collimator lens 4 as to the first and second lights is suitably set, the first light can be focused on the disk 7 with a substrate thickness of 0.6 mm with no aberration, and the second light can be focused on the disk 8 with a substrate thickness of 1.2 mm with no aberration.

Meanwhile, a numerical aperture of objective lens in the standard of compact disk is to be smaller than that in the standard of digital video disk. In the composition shown in FIG. 1, since the effective optical path lengths as to the first and second lights are different from each other, by providing the aperture 239 in the optical system, the beam diameter of the second light entering the objective lens 6 can be smaller than the beam diameter of the first light entering the objective lens 6 Therefore, the effective numerical aperture as to the second light of the objective lens 6 is smaller than the effective numerical aperture as to the first light of the objective lens 6, thereby the above requirement being satisfied.

FIGS. 3A and 3B show another composition of the optical path control device 240 In the optical head device in FIG. 1. As shown in FIGS.3A and 3B, the optical path control device 240 is composed of a prism 10 and a hologram 250 which is formed on the oblique plane of the prism 10. Of the incident light to the optical path control device 240, an incident light 248, which is a P-polarization component to the hologram 250, as shown in FIG. 3A, is reflected and diffracted as a +1st-order diffraction light by the hologram 250, then being emitted from the prism 10 as the second light. On the other hand, of the incident light to the optical path control device 240, an incident light 249, which is a S-polarization component to the hologram 250, as shown in FIG. 3B, is all reflected by the hologram 250, being emitted from the prism 10 as the first light.

FIG. 4 shows a composition of the hologram 250 in FIGS.3A and 3B. The hologram 250 is composed of a polarization separating film 251 and a hologram layer 252 which are formed on the oblique plane of the prism 10. The polarization separating film 251 has a function that a P-polarization component of an incident light is all transmitted through and a S-polarization component of the incident light is all reflected. The hologram 250 functions as a convex surface mirror to a +1st-order diffraction light. Of the incident light to the hologram 250, the incident light 248, which is a P-polarization component to the polarization separating film 251, is all transmitted through the polarization separating film 251, being reflected and diffracted as a +1st-order diffraction light by the hologram layer 252, again being all transmitted through the polarization separating film 251, then being emitted from the hologram 250 as the second light. On the other hand, of the incident light to the hologram 250, the incident light 249, which is a S-polarization component to the polarization separating film 251, is all reflected by the polarization separating film 251, being emitted from the hologram 250 as the first light. As shown in FIG. 4, by forming a step-like section of the hologram layer 252, the diffraction efficiency to a +1st-order diffraction light can be enhanced.

By using the optical path control device 240 as shown in FIGS.3A and 3B, an apparent luminous point to the second light becomes closer to the optical path control device 240 than that to the first light. Therefore, the effective optical path length from the semiconductor laser 237 to the collimator lens 4 as to the second light can be shorter than that as to the first light.

However, the conventional optical head device as shown in FIG. 1 has a first problem that, since the incident light is divided into the first and second lights by the optical path control device 240, the utilization efficiency as to the respective lights is reduced by half. Namely, if the semiconductor laser 237 has the same output power as that of an usual optical head device, the amount of light received by the optical detector 242 is reduced by half of that in the usual optical head device, thereby the signal-to-noise ratio(S/N ratio) of a reproduced signal being reduced. Thus, to make the amount of light received by the optical detector 242 equal to that in the usual optical head device, the output power of the semiconductor laser 237 needs to be two times that in the usual optical head device. If the recording of the disks 7, 8 is performed as well as the reproducing, the output power of the semiconductor laser 237 needs to be further increased, i.e., it is substantially impossible.

Also, the conventional optical head device as shown in FIG. 1 has a second problem, which is related to a wavelength of light emitted from the semiconductor laser 237. in the standard of digital video disk, a wavelength of 635 nm to 650 is used, and, in the standard of compact disk, a wavelength of 785 nm is used. Herein, in order to reproduce both the digital video disk and the compact disk, a semiconductor laser which outputs light with a wavelength of 635 to 650 nm needs to be used since it can give a more reduced diameter of focused spot. As one kind of compact disk, there is a rewritable-type compact disk. Though the rewritable-type compact disk has a high reflection factor more than 70% in 785 nm wavelength, it has a low reflection factor of around 10% in a wavelength of 635 to 650 nm. Therefore, it is impossible for a conventional optical head device which is adapted to a wavelength of 635 to 650 nm to be used in the reproducing of the rewritable-type compact disk.

SUMMARY OF THE INVENTION

Accordingly, it is an object of the invention to provide an optical head device which is used for the recording or reproducing of two kinds of optical recording mediums with different substrate thicknesses, in which a reproduced signal has a S/N ratio equal to that in an usual optical head device and a semiconductor laser is; only required to have an output power equal to that in an usual optical head device.

It is a further object of the invention to provide an optical head device which is used for the recording or reproducing of two kinds of optical recording mediums with different substrate thicknesses, by which a rewritable-type compact disk can be reproduced.

According to the invention, an optical head device, comprises:

a first light source which emits a light with a first wavelength;

a second light source which emits a light with a second wavelength;

first and second optical detectors;

an optical coupling and dividing means in which the light emitted from the first light source and the light emitted from the second light source are coupled and are then led to an optical recording medium with a first or second substrate thickness, and in which the light emitted from the first light source and reflected on the optical recording medium is led to the first optical detector and the light emitted from the second light source and reflected on the optical recording medium is led to the second optical detector; and a lens system which is disposed between the optical coupling and dividing means and the optical recording medium and includes an objective lens;

wherein the second substrate thickness is set to be greater than the first substrate thickness and an effective optical path length from the second light source to the lens system is set to be shorter than an effective optical path length from the first light source to the lens system, and wherein the recording or reproducing of the optical recording medium with the first substrate thickness is conducted by using the light emitted from the first light source, and the recording or reproducing of the optical recording medium with the second substrate thickness is conducted by using the light emitted from the second light source.

According to another aspect of the invention, an optical head device, comprises:

a first light source which emits a light with a first wavelength;

a second light source which emits a light with a second wavelength;

an optical detector;

an optical coupling and dividing means in which the light emitted from the first light source and the light emitted from the second light source are coupled and are then led to an optical recording medium with a first or second substrate thickness, and in which the light emitted from the first light source and reflected on the optical recording medium and the light emitted from the second light source and reflected on the optical recording medium are led to the optical detector; and a lens system which is disposed between the optical coupling and dividing means and the optical recording medium and includes an objective lens;

wherein the second substrate thickness is set to be greater than the first substrate thickness and an effective optical path length from the second light source to the lens system is set to be shorter than an effective optical path length from the first light source to the lens system, and wherein the recording or reproducing of the optical recording medium with the first substrate thickness is conducted by using the light emitted from the first light source, and the recording or reproducing of the optical recording medium with the second substrate thickness is conducted by using the light emitted from the second light source.

According to a further aspect of the invention, an optical head device, comprises:

a first light source which emits a light with a first wavelength;

a second light source which emits a light with a second wavelength;

an optical detector;

an optical coupling and dividing means in which the light emitted from the first light source and the light emitted from the second light source are coupled and are then led to an optical recording medium with a first or second substrate thickness, and in which the light emitted from the first light source and reflected on the optical recording medium and the light emitted from the second light source and reflected on the optical recording medium are led to the optical detector;

an objective lens which is disposed between the optical coupling and dividing Deans and the optical recording medium;

a first collimator lens which is disposed between the first light source and the optical coupling and dividing means; and a second collimator lens which is disposed between the second light source and the optical coupling and dividing means;

wherein the second substrate thickness is set to be greater than the first substrate thickness, and a difference between an effective optical path length from the second light source to the second collimator lens and a focal distance of the second collimator lens is set to be smaller than a difference between an effective optical path length from the first light source to the first collimator lens and a focal distance of the first collimator lens, and wherein the recording or reproducing of the optical recording medium with the first substrate thickness is conducted by using the light emitted from the first light source, and the recording or reproducing of the optical recording medium with the second substrate thickness is conducted by using the light emitted from the second light source.

According to a further aspect of the invention, an optical head device, comprises:

a first light source which emits a light with a first wavelength;

a second light source which emits a light with a second wavelength;

first and second optical detectors;

an optical coupling and dividing means in which the light emitted from the first light source and the light emitted from the second light source are coupled and are then led to an optical recording medium with a first or second substrate thickness, and in which the light emitted from the first light source and reflected on the optical recording medium is led to the first optical detector and the light emitted from the second light source and reflected on the optical recording medium is led to the second optical detector;

an objective lens which is disposed between the optical coupling and dividing means and the optical recording medium;

a first collimator lens which is disposed between the first light source and the optical coupling and dividing means; and a second collimator lens which is disposed between the second light source and the optical coupling and dividing means;

wherein a lens means by which the light emitted from the second light source is led to the objective lens as a divergent light or by which the light emitted from the first light source is led to the objective lens as a convergent light is disposed between the first or second collimator lens and the optical coupling and dividing means, and wherein the recording or reproducing of the optical recording medium with the first substrate thickness is conducted by using the light emitted from the first light source, and the recording or reproducing of the optical recording medium with the second substrate thickness which is greater than the first substrate thickness is conducted by using the light emitted from the second light source.

BRIEF DESCRIPTION OF THE DRAWINGS

The invention will be explained in more detail in conjunction with the appended drawings, wherein:

FIGS. 20A shows a pattern of light-receiving parts of an optical detector in FIG. 18 and a location of light spots on the light-receiving parts in the case that the diffraction optical device and hologram optical device in FIGS. 19A and 19B are used, FIG. 20B is a side view at the central part of the optical detector in FIG. 20A.

DESCRIPTION OF THE PREFERRED EMBODIMENTS

Figure 1:
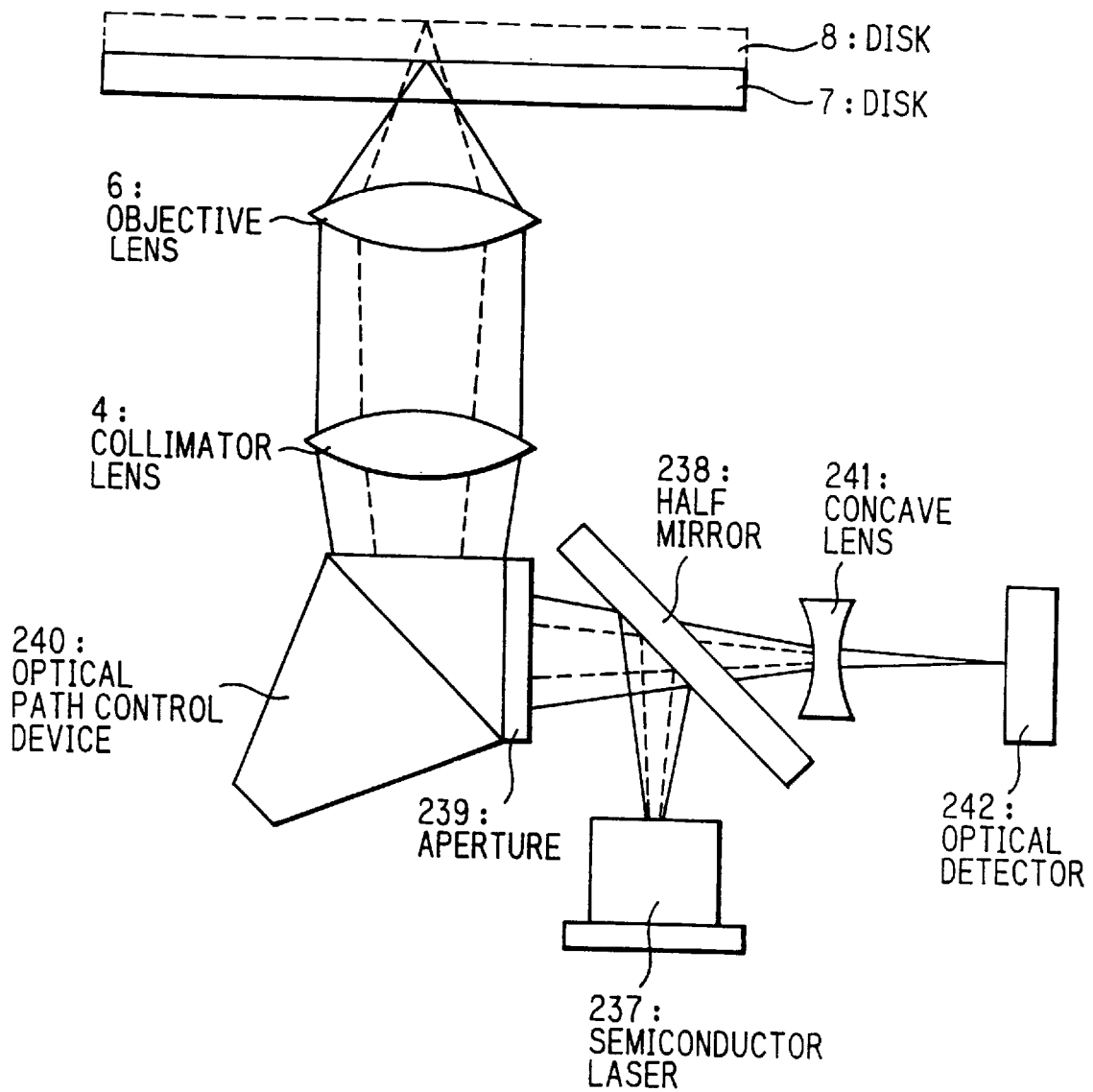
FIG. 1 shows a composition of a conventional optical head device.
Figure 2A:
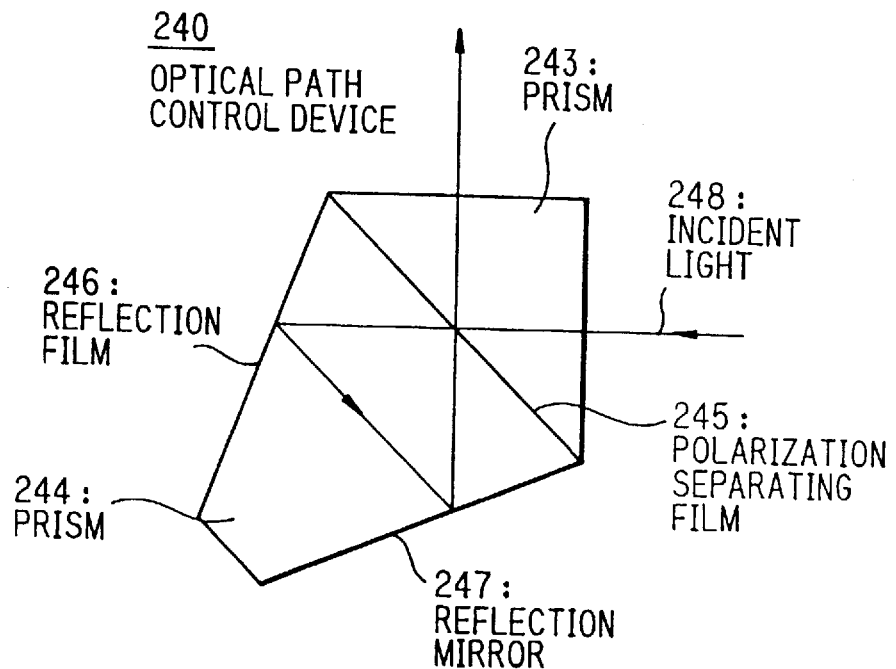
FIGS. 2A and 2B show a composition of an optical path control device used in the optical head device in FIG. 1, FIGS. 3A and 3B show a composition of another optical path control device used in the optical head device in FIG. 1.
Figure 2B:
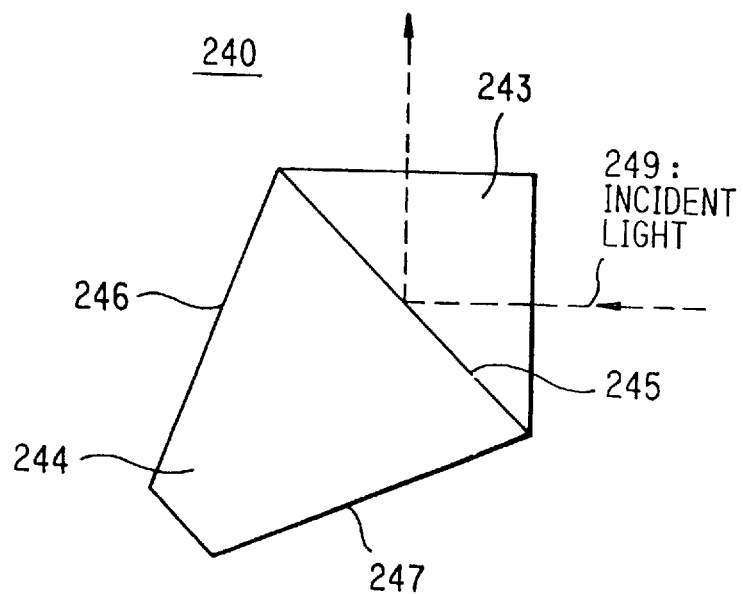
Figure 3A:
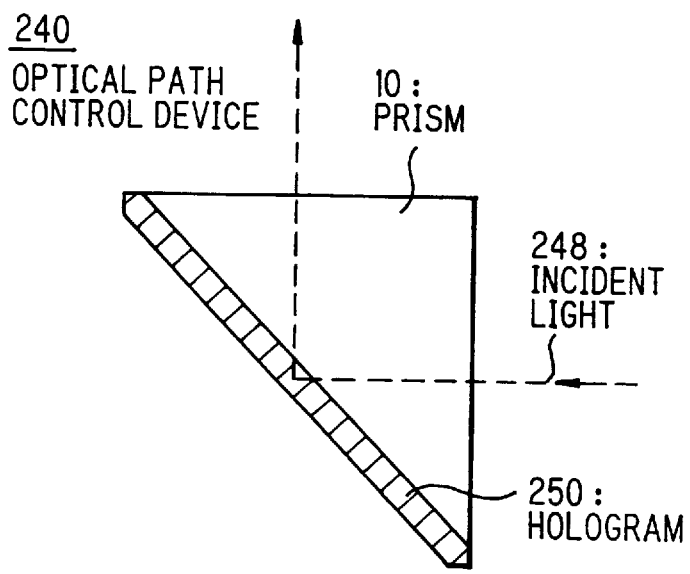
Figure 3B:
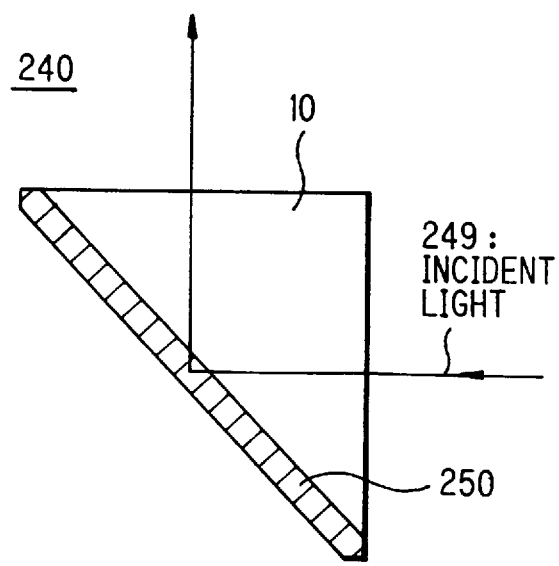
Figure 4:
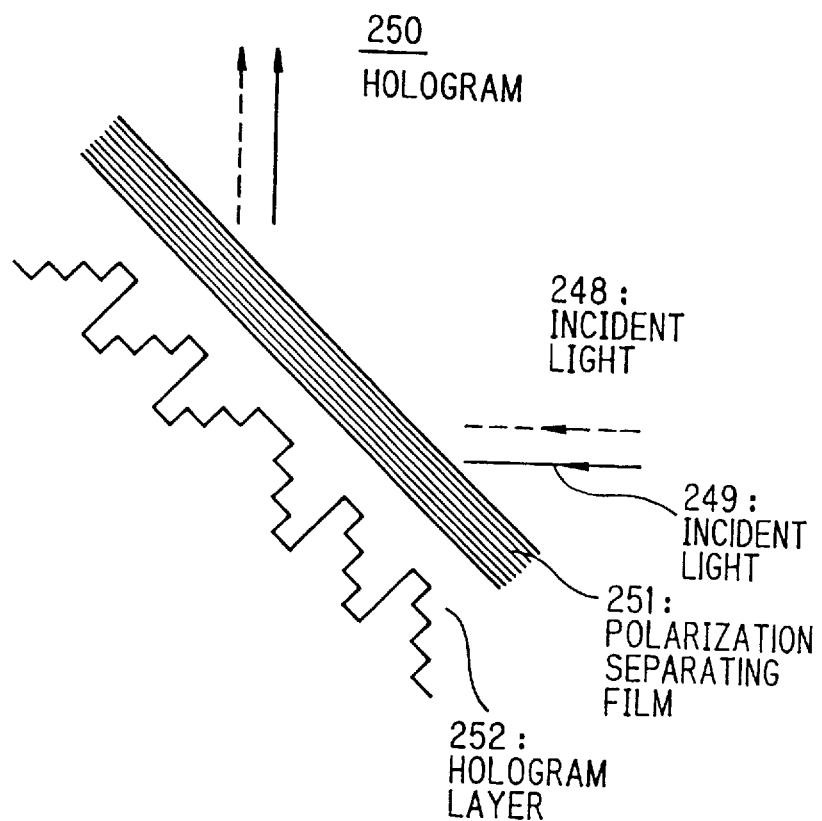
FIG. 4 shows a composition of a hologram used in the optical path control device in FIGS. 3A and 3B.

An optical head device in the first preferred embodiment will be explained in FIG. 5, wherein like parts are indicated by like reference numerals as used in FIG. 1.

Figure 5:
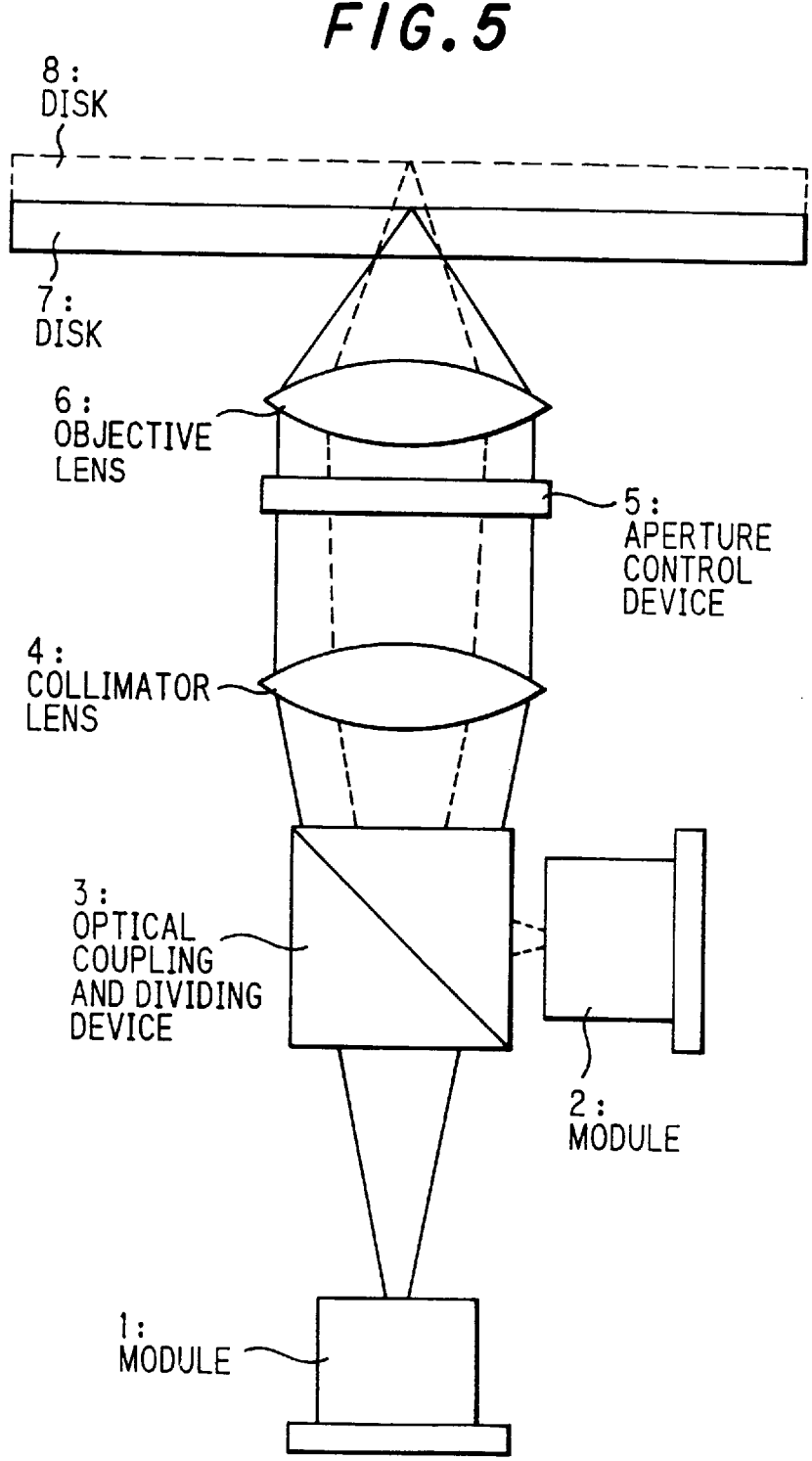
FIG. 5 shows a composition of an optical head device in a first preferred embodiment according to the invention.

In FIG. 5, both a module 1 and a module 2, as explained after, include a semiconductor laser and an optical detector which receives light reflected on a disk. The semiconductor laser of the module 1 emits light with 635 nm wavelength, and the semiconductor laser of the module 2 emits light with 785 nm wavelength.

Light emitted from the semiconductor laser of the module 1 is transmitted through an optical coupling and dividing device 3, a collimator lens 4 and an aperture control device 5, entering an objective lens 6 as a collimated light, then being focused on a disk 7 such as a digital video disk with a substrate thickness of 0.6 mm. Light reflected on the disk 7 is reversely transmitted through the objective lens 6, aperture control device 5, collimator lens 4 aid optical coupling and dividing device 3, being received by the optical detector of the module 1.

On the other hand, light emitted from the semiconductor laser of the module 2 is reflected by the optical coupling and dividing device 3, then being transmitted through the collimator lens 4 and aperture control device 5, entering the objective lens 6 as a divergent light, then being focused on a disk 8 such as a compact disk with a substrate thickness of 1.2 mm. Light reflected on the disk 8 is reversely transmitted through the objective lens 6, aperture control device 5, collimator lens 4 and optical coupling and dividing device 3, being received by the optical detector of the module 2. The aperture control device 5 can be integrally driven with the objective lens 6 in the directions of focusing and tracking by an actuator(not shown).

Figure 6A:
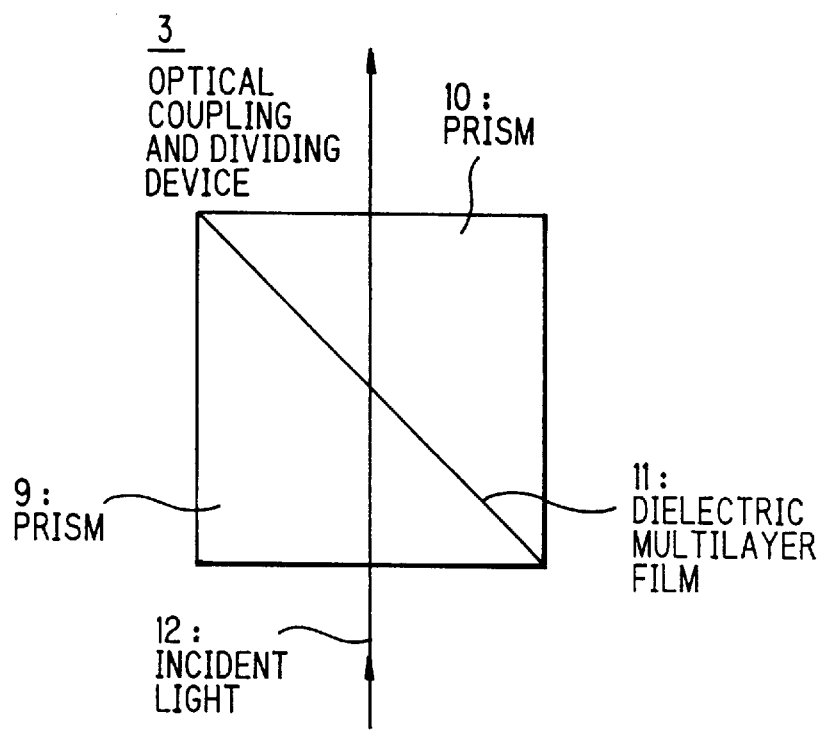
FIGS. 6A and 6B show a composition of an optical coupling and dividing device used in the first embodiment.
Figure 6B:
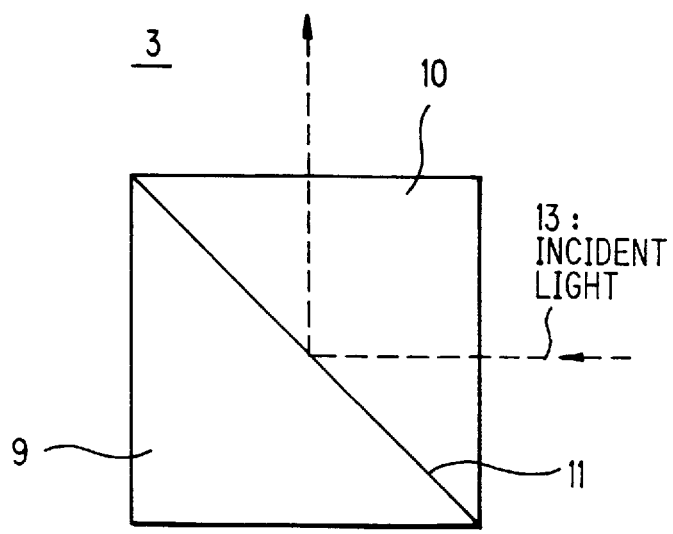

FIGS. 6A and 6B show a composition of the optical coupling and dividing device 3 in FIG. 5. The optical coupling and dividing device 3 is composed of a prism 9 and a prism 10 which are adhered through a dielectric multilayer film 11. The dielectric multilayer film 11 has a function that a light with 635 nm wavelength is all transmitted through and a light with 785 nm wavelength is all reflected.

Therefore, as shown in FIG. 6A, an incident light 12 with 635 nm wavelength, which is emitted from the semiconductor laser of the module 1 and then enters the prism 9 of the optical coupling and dividing device 3, is all transmitted through the dielectric multilayer film 11, being emitted from the prism 10 of the optical coupling and dividing device 3. On the other hand, as shown in FIG. 6B, an incident light 13 with 785 nm wavelength, which is emitted from the semiconductor laser of the module 2 and then enters the prism 10 of the optical coupling and dividing device 3, is all reflected on the dielectric multilayer film 11, being emitted from the prism 10 of the optical coupling and dividing device 3.

In the first embodiment shown in FIG. 5, the optical path length from the module 2 to the collimator lens 4 as to the light with 785 nm wavelength is shorter than the optical path length from the module 1 to the collimator lens 4 as to the light with 635 nm wavelength. Therefore, if the optical path length from the module 1 and module 2 to the collimator lens 4 is adjusted such that the light with 635 nm wavelength enters the objective lens 6 as a collimated light, the light with 785 nm wavelength will enter the objective lens 6 as a divergent light.

The objective lens 6 has a spherical aberration that cancels a spherical aberration occurred when a collimated light entering the objective lens 6 is transmitted through a substrate with a thickness of 0.6 mm. Therefore, when the collimated light entering the objective lens 6 is transmitted through a substrate with a thickness of 1.2 mm, there remains a spherical aberration. However, if a divergent light enters the objective lens 6, there occurs a new spherical aberration due to a movement of image point of the objective lens 6, thereby the remaining spherical aberration when transmitting through the substrate with 1.2 mm thickness being canceled.

Thus, if the difference of the optical path lengths from the module 1 to the collimator lens 4 as to the light with 635 nm wavelength and the optical path lengths from the module 2 to the collimator lens 4 as to the light with 785 nm wavelength is suitably set, the light with 635 wavelength can be focused on the disk 7 with a substrate thickness of 0.6 mm with no aberration, and the light with 785 nm wavelength can be focused on the disk 8 with a substrate thickness of 1.2 mm with no aberration.

In the first embodiment shown in FIG. 5, the optical coupling and dividing device 3 has the dielectric multilayer film 11 where the light with 635 nm wavelength is all transmitted through and the light with 785 nm wavelength is all reflected. Alternatively, the optical coupling and dividing device 3 may have a dielectric multilayer film where the light with 635 nm wavelength is all reflected on and the light with 785 nm wavelength is all transmitted through. In this case, the positions of the module 1 and module 2 need to be exchanged with each other.

An optical head device in the second preferred embodiment will be explained in FIG. 7, wherein like parts are indicated by like reference numerals as used in FIG. 5.

Figure 7:
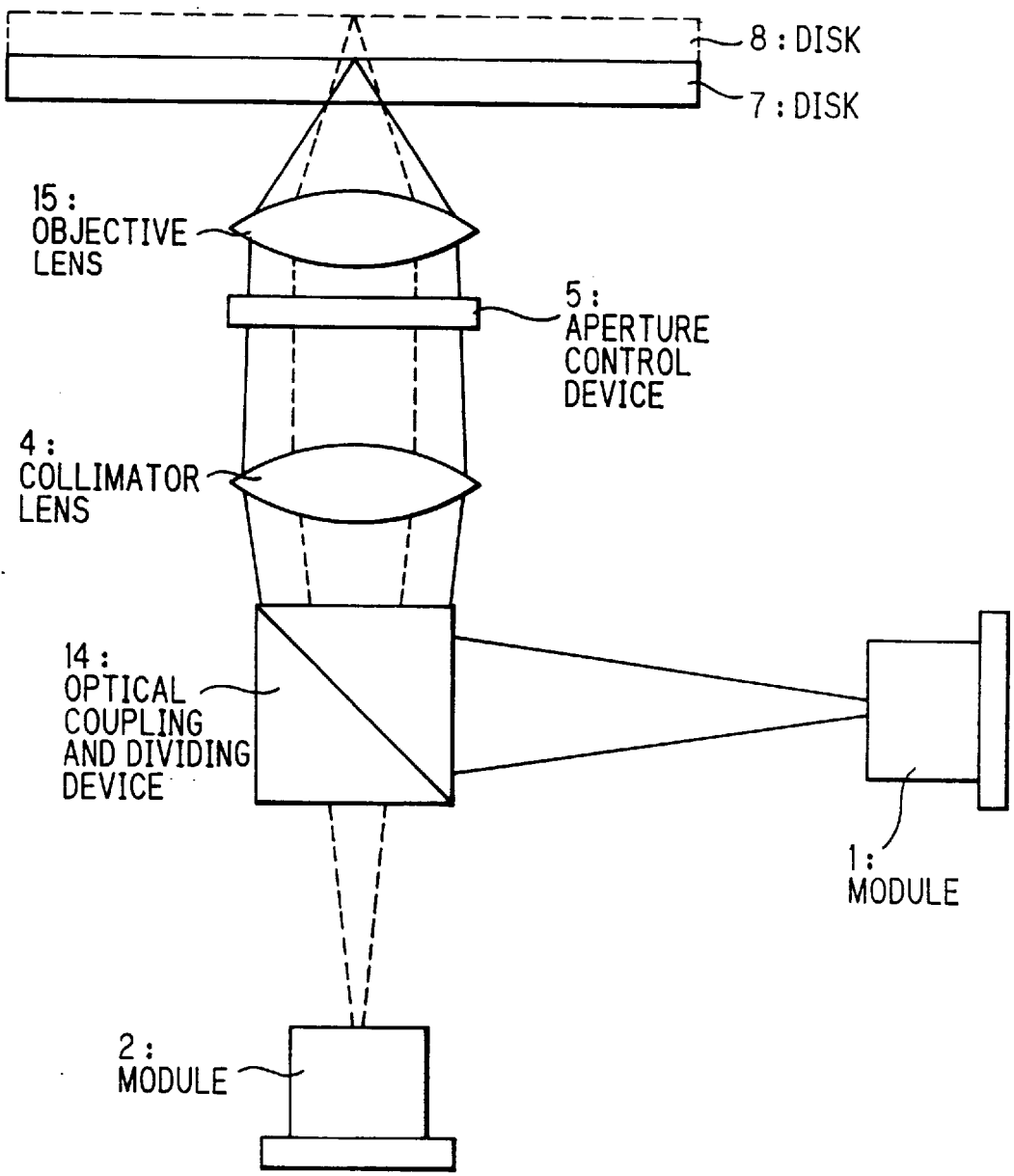
FIG. 7 shows a composition of an optical head device in a second preferred embodiment according to the invention.

In FIG. 7, both a module 1 and a module 2 include a semiconductor laser and an optical detector which receives light reflected on a disk. The semiconductor laser of the module 1 emits light with 635 nm wavelength, and the semiconductor laser of the module 2 emits light with 785 nm wavelength.

Light emitted from the semiconductor laser of the module 1 is transmitted through an optical coupling and dividing device 14, a collimator lens 4 and an aperture control device 5, entering an objective lens 15 as a convergent light, then being focused on a disk 7 such as a digital video disk with a substrate thickness of 0.6 mm. Light reflected on the disk 7 is reversely transmitted through the objective lens 15, aperture control device 5, collimator lens 4 and optical coupling and dividing device 14, being received by the optical detector of the module 1.

On the other hand, light emitted from the semiconductor laser of the module 2 is transmitted through the optical coupling and dividing device 14, collimator lens 4 and aperture control device 5, entering the objective lens 15 as a collimated light, then being focused on a disk 8 such as a compact disk with a substrate thickness of 1.2 mm. Light reflected on the disk 8 is reversely transmitted through the objective lens 15, aperture control device 5, collimator lens 4 and optical coupling and dividing device 14, being received by the optical detector of the module 2. The aperture control device 5 can be integrally driven with the objective lens 15 in the directions of focusing and tracking by an actuator(not shown).

Figure 8A:
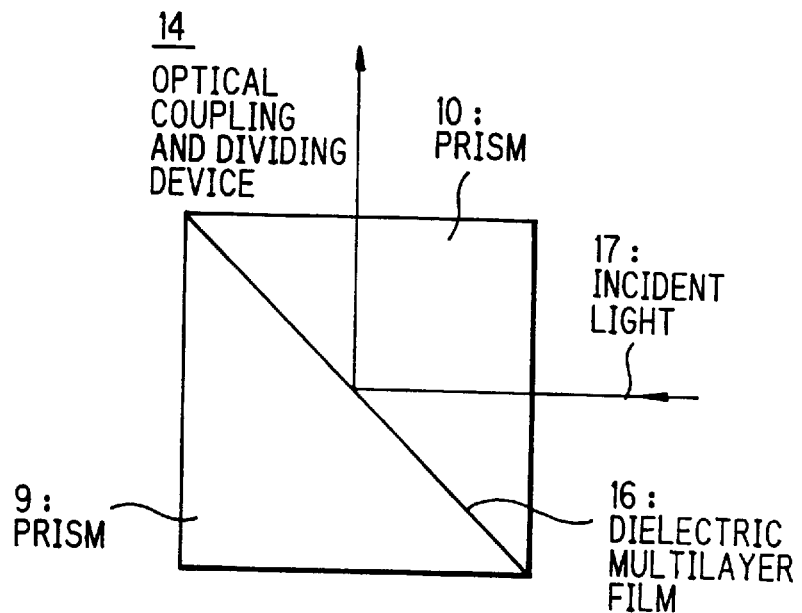
FIGS. 8A and 8B show a composition of a first example of optical coupling and dividing device used in the second embodiment.
Figure 8B:
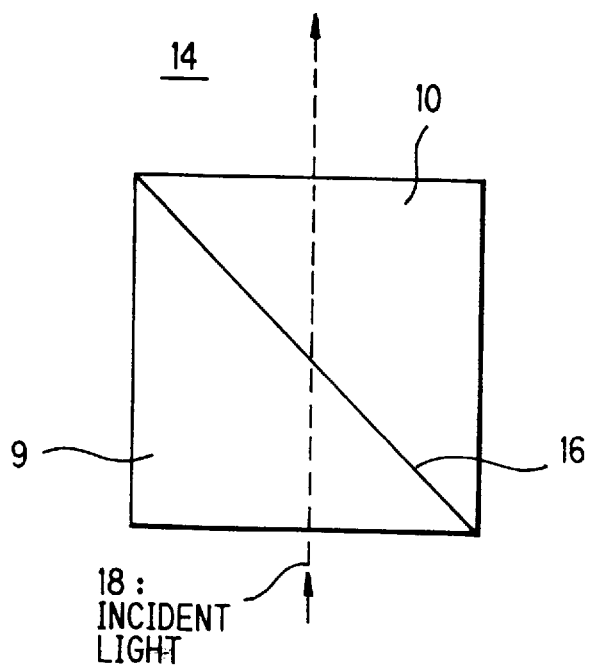

FIGS. 8A and 8B show a composition of the optical coupling and dividing device 14 in FIG. 7. The optical coupling and dividing device 14 is composed of a prism 9 and a prism 10 which are adhered through a dielectric multilayer film 16. The dielectric multilayer film 16 has a function that a light with 635 nm wavelength is all reflected on and a light with 785 nm wavelength is all transmitted through.

Therefore, as shown in FIG. 8A, an incident light 17 with 635 nm wavelength, which is emitted from the semiconductor laser of the module 1 and then enters the prism 10 of the optical coupling and dividing device 14, is all reflected on the dielectric multilayer film 16, being emitted from the prism 10 of the optical coupling and dividing device 14. On the other hand, as shown in FIG. 8B, an incident light 18 with 785 nm wavelength, which is emitted from the semiconductor laser of the module 2 and then enters the prism 9 of the optical coupling and dividing device 14, is all transmitted through the dielectric multilayer film 16, being emitted from the prism 10 of the optical coupling and dividing device 14.

In the second embodiment shown in FIG. 7, the optical path length from the module 1 to the collimator lens 4 as to the light with 635 nm wavelength is longer than the optical path length from the module 2 to the collimator lens 4 as to the light with 785 nm wavelength. Therefore, if the optical path length from the module 1 and module 2 to the collimator lens 4 is adjusted such that the light with 785 nm wavelength enters the objective lens 15 as a collimated light, the light with 635 nm wavelength will enter the objective lens 15 as a convergent light.

The objective lens 15 has a spherical aberration that cancels a spherical aberration occurred when a collimated light entering the objective lens 15 is transmitted through a substrate with a thickness of 1.2 mm. Therefore, when the collimated light entering the objective lens 15 is transmitted through a substrate with a thickness of 0.6 mm, there remains a spherical aberration. However, if a convergent light enters the objective lens 15, there occurs a new spherical aberration due to a movement of image point of the objective lens 15, thereby the remaining spherical aberration when transmitting through the substrate with 0.6 mm thickness being canceled.

Thus, if the difference of the optical path lengths from the module 1 to the collimator lens 4 as to the light with 635 nm wavelength and the optical path lengths from the module 2 to the collimator lens 4 as to the light with 785 nm wavelength is suitably set, the light with 635 wavelength can be focused on the disk 7 with a substrate thickness of 0.6 mm with no aberration, and the light with 785 nm wavelength can be focused on the disk 8 with a substrate thickness of 1.2 mm with no aberration.

In the second embodiment shown in FIG. 7, the optical coupling and dividing device 14 has the dielectric multilayer film 16 where the light with 635 nm wavelength is all reflected and the light with 785 nm wavelength is all transmitted through. Alternatively, the optical coupling and dividing device 14 may have a dielectric multilayer film where the light with 635 nm wavelength is all transmitted through and the light with 785 nm wavelength is all reflected on. In this case, the positions of the module 1 and module 2 need to be exchanged with each other.

Figure 9A:
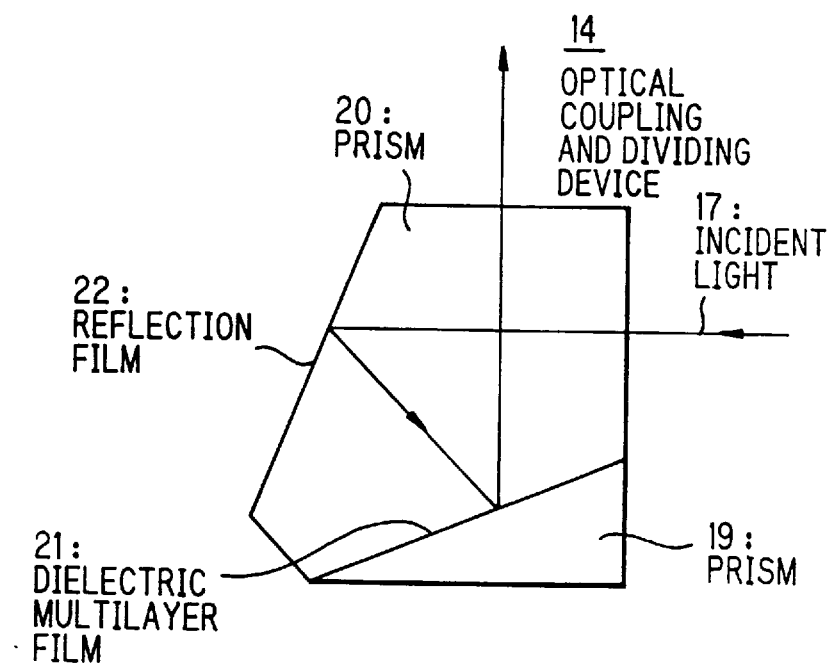
FIGS. 9A and 9B show a composition of a second example of optical coupling and dividing device used in the second embodiment.
Figure 9B:
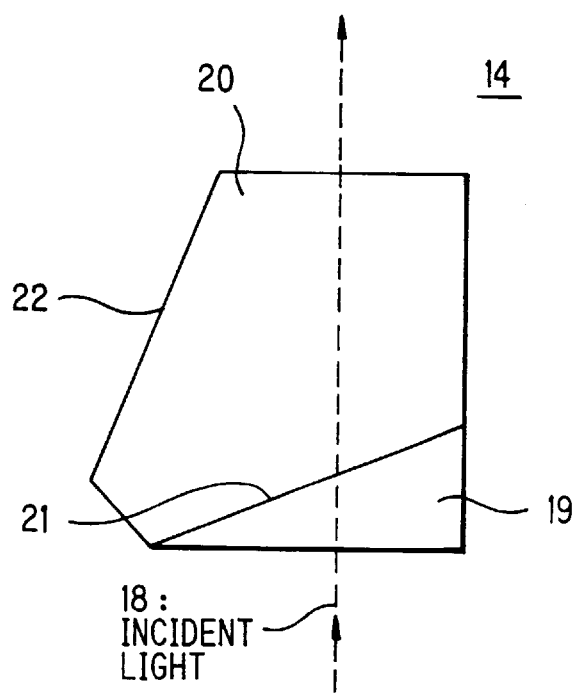

FIGS. 9A and 9B show a second composition of the optical coupling and dividing device 14 in the second embodiment shown in FIG. 7. The optical coupling and dividing device 14 is composed of a prism 19 and a prism 20 which are adhered through a dielectric multilayer film 21. The dielectric multilayer film 21 has a function that a light with 635 nm wavelength is all reflected and a light with 785 nm wavelength is all transmitted.

Therefore, as shown in FIG. 9A, an incident light 17 with 635 nm wavelength, which is emitted from the semiconductor laser of the module 1 and then enters the prism 20 of the optical coupling and dividing device 14, is reflected on a reflection film 22, then being all reflected on the dielectric multilayer film 21, being emitted from the prism 20 of the optical coupling and dividing device 14. On the other hand, as shown in FIG. 9B, an incident light 18 with 785 nm wavelength, which is emitted from the semiconductor laser of the module 2 and then enters the prism 19 of the optical coupling and dividing device 14, is all transmitted through toe dielectric multilayer film 21, being emitted from the prism 20 of the optical coupling and dividing device 14.

Figure 10A:
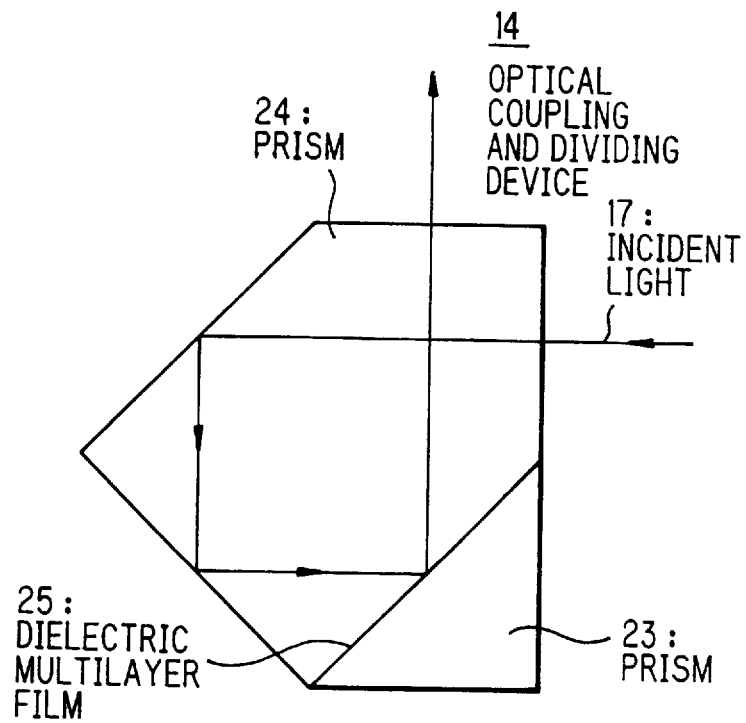
FIGS. 10A and 10B show a composition of a third example of optical coupling and dividing device used in the second embodiment.
Figure 10B:
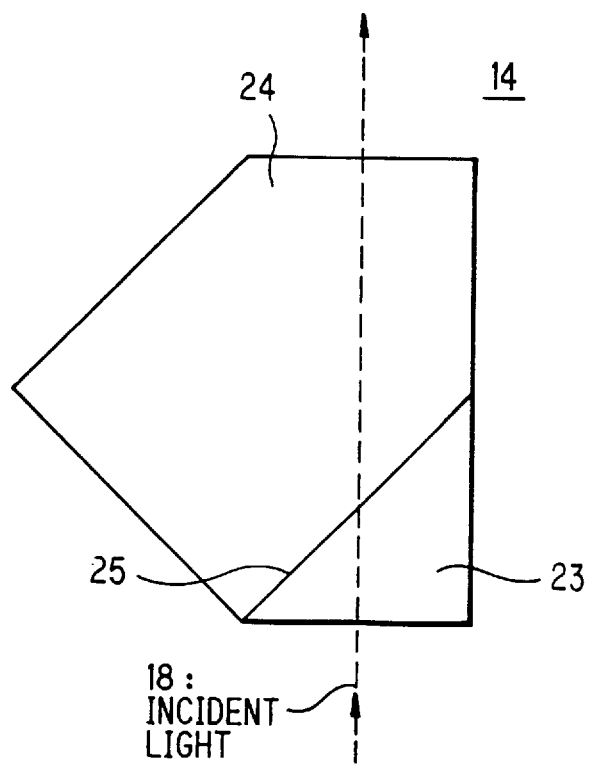

FIGS. 10A and 10B show a third composition of the optical coupling and dividing device 14 in the second embodiment shown in FIG. 7. The optical coupling and dividing device 14 is composed of a prism 23 and a prism 24 which are adhered through a dielectric multilayer film 25. The dielectric multilayer film 25 has a function that a light with 635 nm wavelength is all reflected and a light with 785 nm wavelength is all transmitted.

Therefore, as shown in FIG. 10A, an incident light 17 with 635 nm wavelength, which is emitted from the semiconductor laser of the module 1 and then enters the prism 24 of the optical coupling and dividing device 14, is totally reflected two times on boundary surfaces of the prism 24 and the air, then being all reflected on the dielectric multilayer film 25, and being emitted from the prism 24 of the optical coupling and dividing device 14. On the other hand, as shown in FIG. 10B, an incident light 18 with 785 nm wavelength, which is emitted from the semiconductor laser of the module 2 and then enters the prism 23 of the optical coupling and dividing device 14, is all transmitted through the dielectric multilayer film 25, being emitted from the prism 24 of the optical coupling and dividing device 14.

In the composition shown in FIG. 7, the distance from the module 1 to the optical coupling and dividing device 14 is longer than the distance from the module 2 to the optical coupling and dividing device 14. Here, when the optical coupling and dividing device 14 shown in FIGS. 9A to 10B is substituted for the optical coupling and dividing device 14 in FIG. 7, even if the distance from the module 1 to the optical coupling and dividing device 14 is equal to the distance from the module 2 to the optical coupling and dividing device 14, the effective optical path length from the module 1 to the collimator lens 4 as to the light with 635 nm wavelength can be longer than the effective optical path length from the module 2 to the collimator lens 4 as to the light with 785 nm wavelength.

In the first and second embodiments shown in FIGS. 5 and 7, the optical utilization ratio in both ways in the optical coupling and dividing devices 3 and 14 is 100% to both the wavelengths of 635 and 785 . Therefore, with respect to 635 nm wavelength, a reproduced signal from the disk 7 has a S/N ratio equal to that in an usual optical head device and a semiconductor laser of the module 1 is only required to have an output power equal to that in an usual optical head device, and the recording of the disk 7 can be performed as well as the reproducing. With respect to 785 nm wavelength, a reproduced signal from the disk 8 has a S/N ratio equal to that in a usual optical head device and a semiconductor laser of the module 2 is only required to have an output power equal to that in an usual optical head device, and the recording of the disk 8 can be performed as well as the reproducing. Furthermore, since the semiconductor laser of the module 2 has the 785 nm wavelength, even if the disk 8 is a rewritable-type compact disk, the reproducing can be performed.

Figure 11A:
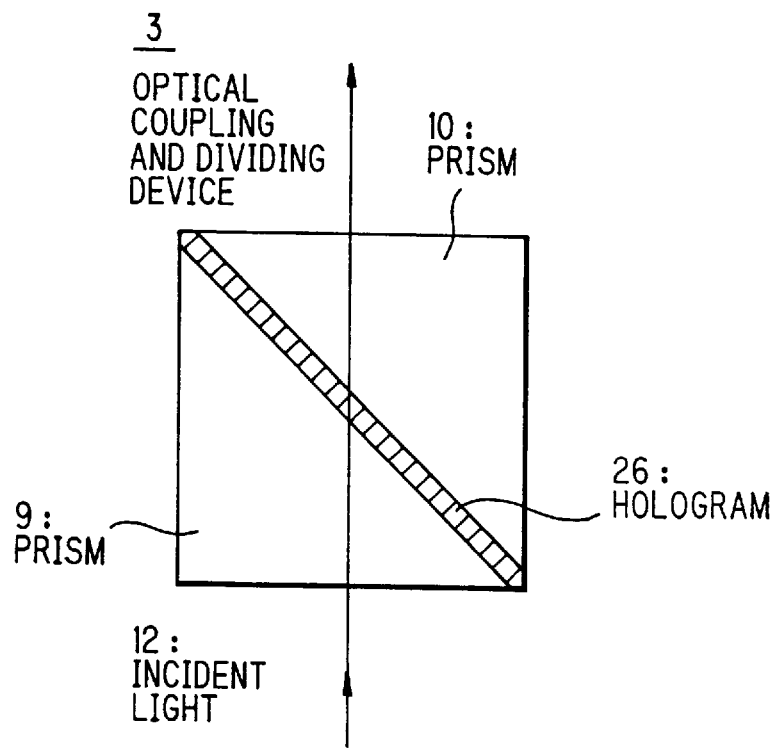
FIGS. 11A and 11B show a composition of another optical coupling and dividing device used in the first embodiment.
Figure 11B:
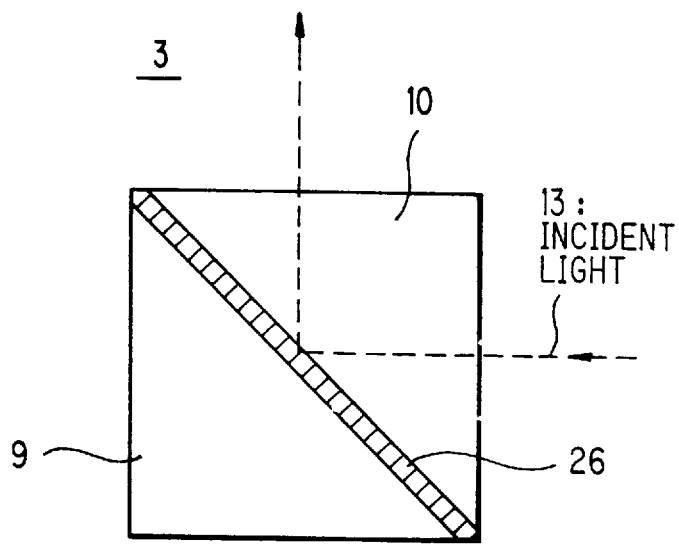

FIGS. 11A and 11B show another composition of the optical coupling and dividing device 3 used in the first embodiment in FIG. 5. The optical coupling and dividing device 3 is composed of a prism 9 and a prism 10 which are adhered through a hologram 26. In this composition, an incident light 12 with 635 nm wavelength, which is emitted from the semiconductor laser of the module 1 and then enters the prism 9 of the optical coupling and dividing device 3, as shown in FIG. 11A, is all transmitted through the hologram 26, then being emitted from the prism 10 of the optical coupling and dividing device 3. On the other hand, an incident light 13 with 785 nm wavelength, which is emitted from the semiconductor laser of the module 2 and then enters the prism 10 of the optical coupling and dividing device 3, as shown in FIG. 11B, is reflected and diffracted as a +1st-order diffraction light by the hologram 26, then being emitted from the prism 10 of the optical coupling and dividing device 3.

Figure 12A:
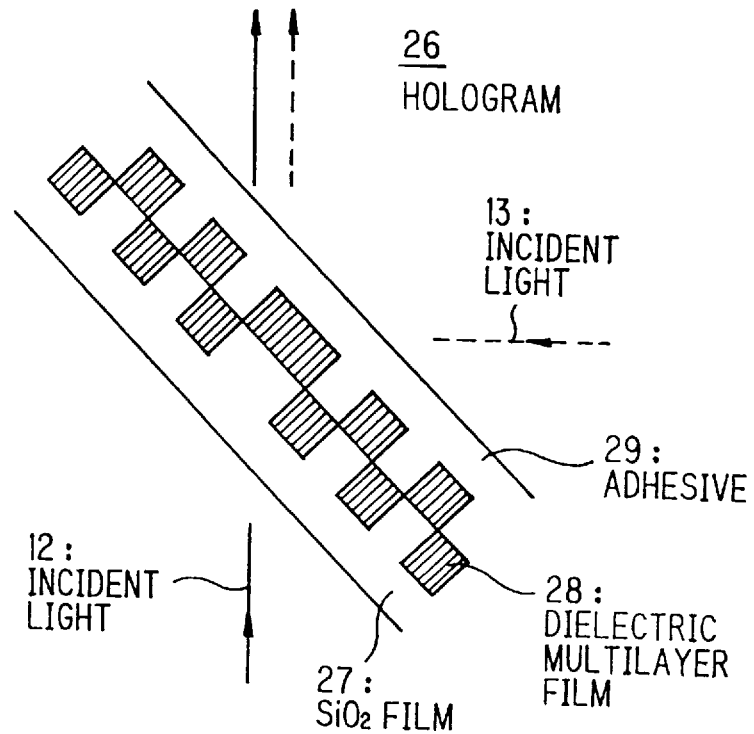
FIGS. 12A and 12B show compositions of a hologram used in the optical coupling and dividing device in FIGS. 11A and 11B, FIGS. 13A and 13B show a composition of a fourth example of optical coupling and dividing device used in the second embodiment.
Figure 12B:
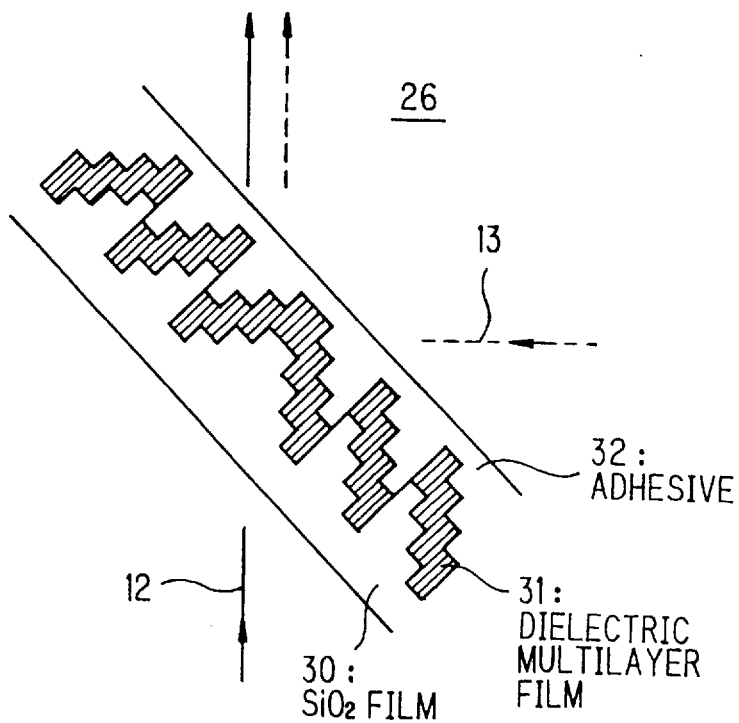

FIGS. 12A and 12B show compositions of the hologram 26 in FIGS. 11A and 11B. As shown in FIG. 12A, the hologram 26 is composed of a dielectric multilayer film 28 and a SiO2 film 27 as a hologram layer, which are formed on the oblique plane of the prism 9 with an adhesive 29 filled between them and the oblique plane of the prism 10. On the other hand, as shown in FIG. 12B, the hologram 26 may be composed of a dielectric multilayer film 31 and a SiO2 film 30 as a hologram layer, which are formed on the oblique plane of the prism 9 with an adhesive 32 filled between them and the oblique plane of the prism 10. The hologram 26 in FIG. 12B is different from that in FIG. 12A in cross-sectional forms of the SiO2 film 30 and dielectric multilayer film 31.

The dielectric multilayer films 28 and 31 have a function that a light with 635 nm wavelength is all transmitted through and a light with 785 nm wavelength is all reflected. The adhesives 29, 32 and the SiO2 films 27, 30 have like refractive indexes. By the combination of the SiO2 film 27 or 30, the dielectric multilayer film 28 or 31 and the adhesive 29 or 32, the light with 635 nm wavelength is all transmitted through and the light with 785 nm wiavelength is all reflected and diffracted on. The hologram 26 functions as a convex surface mirror to a +1st-order diffraction light.

In these compositions, an incident light 12 with 635 nm wavelength, which is emitted from the semiconductor laser of the module 1 and then enters the hologram 26, as shown in FIGS. 12A and 12B, is all transmitted through the SiO2 film 27 or 30, dielectric multilayer film 28 or 31 and adhesive 29 or 32, then being emitted from the hologram 26. On the other hand, an incident light 13 with 785 nm wavelength, which is emitted from the semiconductor laser of the module 2 and then enters the hologram 26, as shown in FIGS. 12A and 12B, is reflected and diffracted as a +1st-order diffraction light by the adhesive 29 or 32 and dielectric multilayer film 28 or 31, then being emitted from the hologram 26.

As shown in FIG. 12A, when the SiO2 film 27 has a rectangular section form, a diffraction efficiency to a +1st-order diffraction light is 40.5% at maximum. On the other hand, as shown in FIG. 12B, when the SiO2 film 30 has a step-like section form, a diffraction efficiency to a +1st-order diffraction light is increased, i.e., 81% at maximum in a four level step form and 95% at maximum in an eight level step form.

In the composition of the first embodiment shown in FIG. 5, the distance from the module 2 to the optical coupling and dividing device 3 is shorter than the distance from the module 1 to the optical coupling and dividing device 3. Here, by using the optical coupling and dividing device 3 as shown in FIGS. 11A and 11B, an apparent luminous point to the light with 785 nm wavelength becomes closer to the optical coupling and dividing device 3 than that to the light with 635 nm wavelength. Therefore, even if the distance from the module 1 to the optical coupling and dividing device 3 is equal to the distance from the module 2 to the optical coupling and dividing device 3, the effective optical path length from the module 2 to the collimator lens 4 as to the light with 785 nm wavelength can be shorter than the effective optical path length from the module 1 to the collimator lens 4 as to the light with 635 nm wavelength.

The optical utilization ratio in both ways in the optical coupling and dividing devices 3 shown in FIGS. 11A and 11B is 100% to 635 nm wavelength and 66% at maximum in a four level step form of the SiO2 film 30 or 90% at maximum in an eight level step form of the SiO2 film 30 to 785 nm wavelength. Therefore, with respect to the 635 nm wavelength, a reproduced signal from the disk 7 has a S/N ratio equal to that in a usual optical head device and a semiconductor laser of the module 1 is only required to have an output power equal to that in an usual optical head device, and the recording of the disk 7 can be performed as well as the reproducing.

With respect to 785 nm wavelength, if the semiconductor laser of the module 2 has a output power equal to that in an usual optical head device, the amount of light received by the optical detector of the module 2 is 66 to 90% as compared to that of a usual optical head device, but the S/N ratio of a reproduced signal from the disk 8 is not so reduced as compared to that in a usual optical head device. Besides, in order to make the amount of light received by the optical detector of the module 2 equal to that of a usual optical head device, the semiconductor laser of the module 2 is required to have an output power 1.1 to 1.5 times that in an usual optical head device. However, the requirement can be easily satisfied as compared to the conventional optical head device.

Figure 13A:
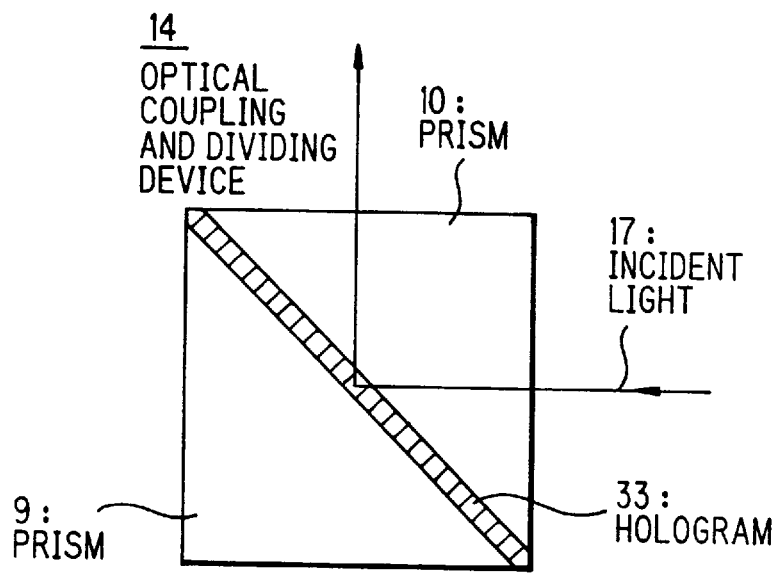
Figure 13B:
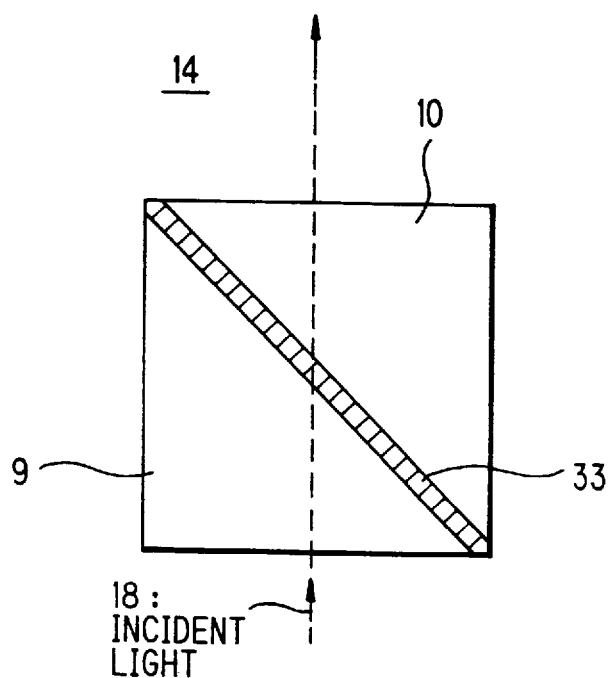

FIGS. 13A and 13B show a fourth composition of the optical coupling and dividing device 14 used in the second embodiment shown in FIG. 7. The optical coupling and dividing device 14 is composed of a prism 9 and a prism 10 which are adhered through a hologram 33. In this composition, an incident light 17 with 635 nm wavelength, which is emitted from the semiconductor laser of the module 1 and then enters the prism 10 of the optical coupling and dividing device 14, as shown in FIG. 13A, is reflected and diffracted as a +1st-order diffraction light by the hologram 33, then being emitted from the prism 10 of the optical coupling and dividing device 14. On the other hand, an incident light 18 with 785 nm wavelength, which is emitted from the semiconductor laser of the module 2 and then enters the prism 9 of the optical coupling and dividing device 14, as shown in FIG. 13B, is all transmitted through the hologram 33, then being emitted from the prism 10 of the optical coupling and dividing device 14.

Figure 14A:
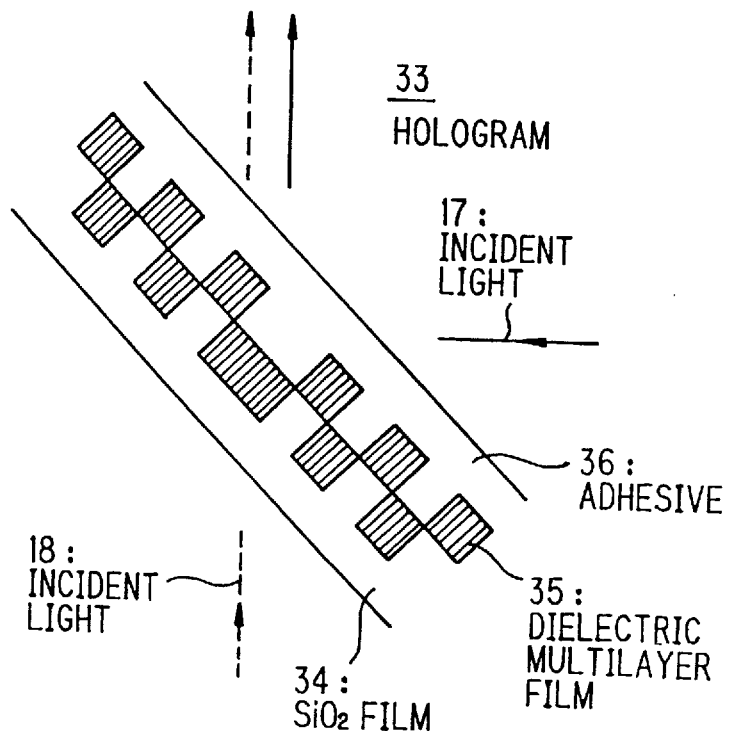
FIGS. 14A and 14B show compositions of a hologram used in the optical coupling and dividing device in FIGS. 13A and 13B.
Figure 14B:
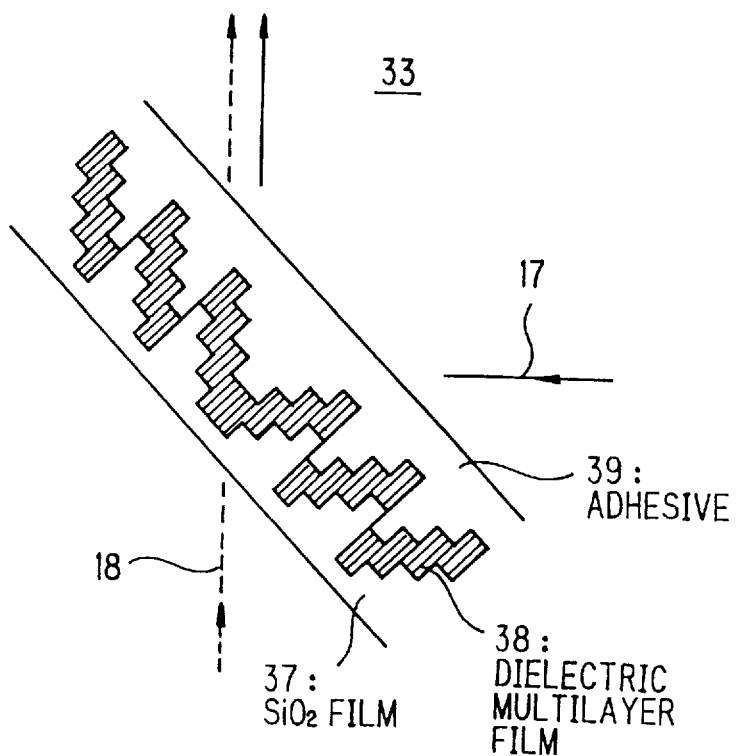

FIGS. 14A and 14B show compositions of the hologram 33 in FIGS. 13A and 13B. As shown in FIG. 14A, the hologram 33 is composed of a dielectric multilayer film 35 and a SiO2 film 34 as a hologram layer, which are formed on the oblique plane of the prism 9 with an adhesive 36 filled between them and the oblique plane of the prism 10. On the other hand, as shown in FIG. 14B, the hologram 33 may be composed of a dielectric multilayer film 38 and a SiO2 film 37 as a hologram layer, which are formed on the oblique plane of the prism 9 with an adhesive 39 filled between them and the oblique plane of the prism 10. The hologram 33 in FIG. 14B is different from that in FIG. 14A in cross-sectional forms of the SiO2 film 37 and dielectric multilayer film 38.

The dielectric multilayer films 35 and 38 have a function that a light with 635 nm wavelength is all reflected and a light with 785 nm wavelength is all transmitted. The adhesives 36, 39 and the SiO2 films 34, 37 have like refractive indexes. By the combination of the SiO2 film 34 or 37, the dielectric multilayer film 35 or 38 and the adhesive 36 or 39, the light with 635 nm wavelength is all reflected and diffracted and the light with 785 nm wavelength is all transmitted. The hologram 33 functions as a concave surface mirror to a +1st-order diffraction light.

In these compositions, an incident light 17 with 635 nm wavelength, which is emitted from the semiconductor laser of the module 1 and then enters the hologram 33, as shown in FIGS. 14A and 14B, is reflected and diffracted as a +1st-order diffraction light by the adhesive 36 or 39 and dielectric multilayer film 35 or 38, then being emitted from the hologram 33. On the other hand, an incident light 18 with 785 nm wavelength, which is emitted from the semiconductor laser of the module 2 and then enters the hologram 33, as shown in FIGS. 14A and 14B, is all transmitted through the SiO2 film 34 or 37, dielectric multilayer film 35 or 38 and adhesive 36 or 39, then being emitted from the hologram 33.

As shown in FIG. 14A, when the SiO2 film 34 has a rectangular section form, a diffraction efficiency to a +1st-order diffraction light is 40.5% at maximum. On the other hand, as shown in FIG. 14B, when the SiO2 film 37 has a step-like section form, a diffraction efficiency to a +1st-order diffraction light is increased, i.e., 81% at maximum in a four level step form and 95% at maximum in an eight level step form.

In the composition of the second embodiment shown in FIG. 7, the distance from the module 1 to the optical coupling and dividing device 14 is longer than the distance from the module 2 to the optical coupling and dividing device 14. Here, by using the optical coupling and dividing device 14 as shown in FIGS. 13A and 13B, an apparent luminous point to the light with 635 nm wavelength becomes farther from the optical coupling and dividing device 14 than that to the light with 785 nm wavelength. Therefore, even if the distance from the module 1 to the optical coupling and dividing device 14 is equal to the distance from the module 2 to the optical coupling and dividing device 14, the effective optical path length from the module 1 to the collimator lens 4 as to the light with 635 nm wavelength can be longer than the effective optical path length from the module 2 to the collimator lens 4 as to the light with 785 nm wavelength.

The optical utilization ratio in both ways in the optical coupling and dividing devices 14 shown in FIGS. 13A and 13B is 66% at maximum in a four level step form of the SiO2 film 30 or 90% at maximum in an eight level step form of the SiO2 film 30 to 635 nm wavelength and is 100% to 785 nm wavelength. Therefore, with respect to a 635 nm wavelength, if the semiconductor laser of the module 1 has an output power equal to that in a usual optical head device, the amount of light received by the optical detector of the module 1 is 66 to 90% as compared to that of a usual optical head device, but the S/N ratio of a reproduced signal from the disk 7 is not so reduced as compared to that in a usual optical head device. Besides, in order to make the amount of light received by the optical detector of the module 1 equal to that of a usual optical head device, the semiconductor laser of the module 1 is required to have an output power 1.1 to 1.5 times that in a usual optical head device. However, the requirement can be easily satisfied as compared to the conventional optical head device. On the other hand, with respect to a 785 nm wavelength, a reproduced signal from the disk 8 has a S/N ratio equal to that in a usual optical head device and a semiconductor laser of the module 2 is only required to have an output power equal to that in a usual optical head device, and the recording of the disk 8 can be performed as well as the reproducing.

Figure 15:
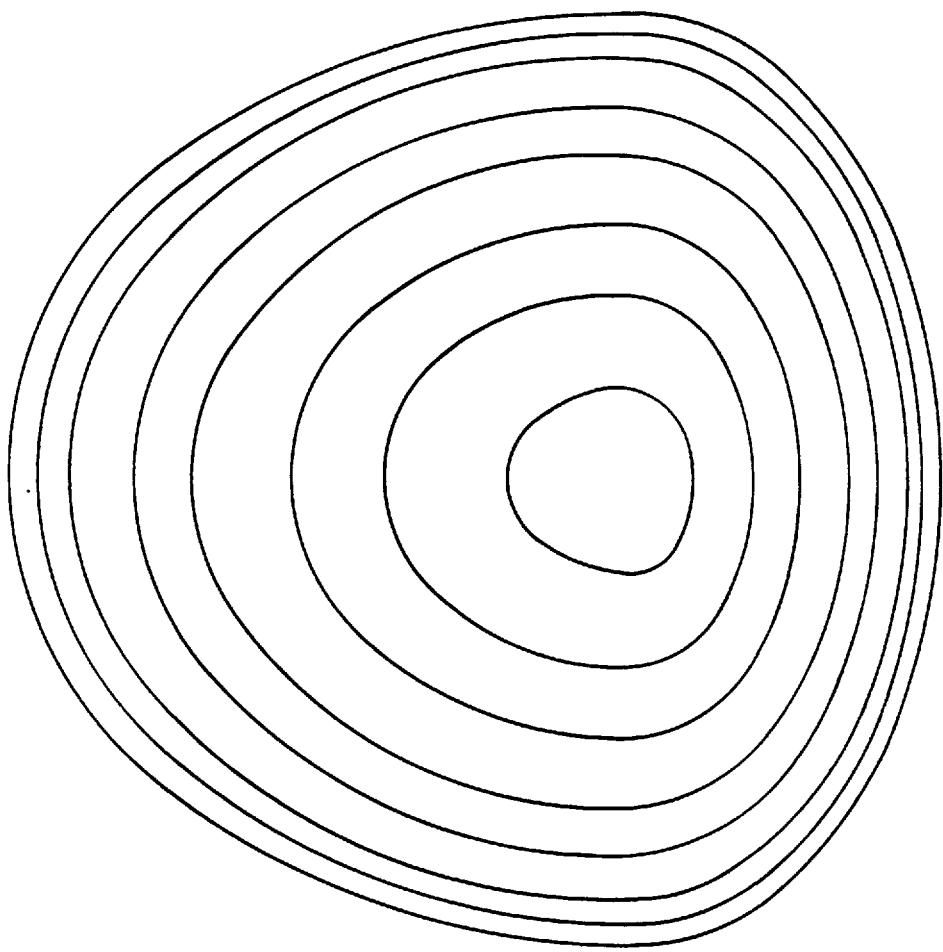
FIG. 15 shows a pattern of interference fringe of the holograms of the optical coupling and dividing devices in FIGS. 11A and 11B and FIGS. 13A and 13B, FIGS. 16A and 16B show a composition of an aperture control device used in the first and second embodiments.

FIG. 15 shows a pattern of interference fringe of the hologram 26 which is used in the optical coupling and dividing device 3 shown in FIGS. 11A and 11B and the hologram 33 which is used in the optical coupling and dividing device 14 shown in FIGS. 13A and 13B.

Figure 16A:
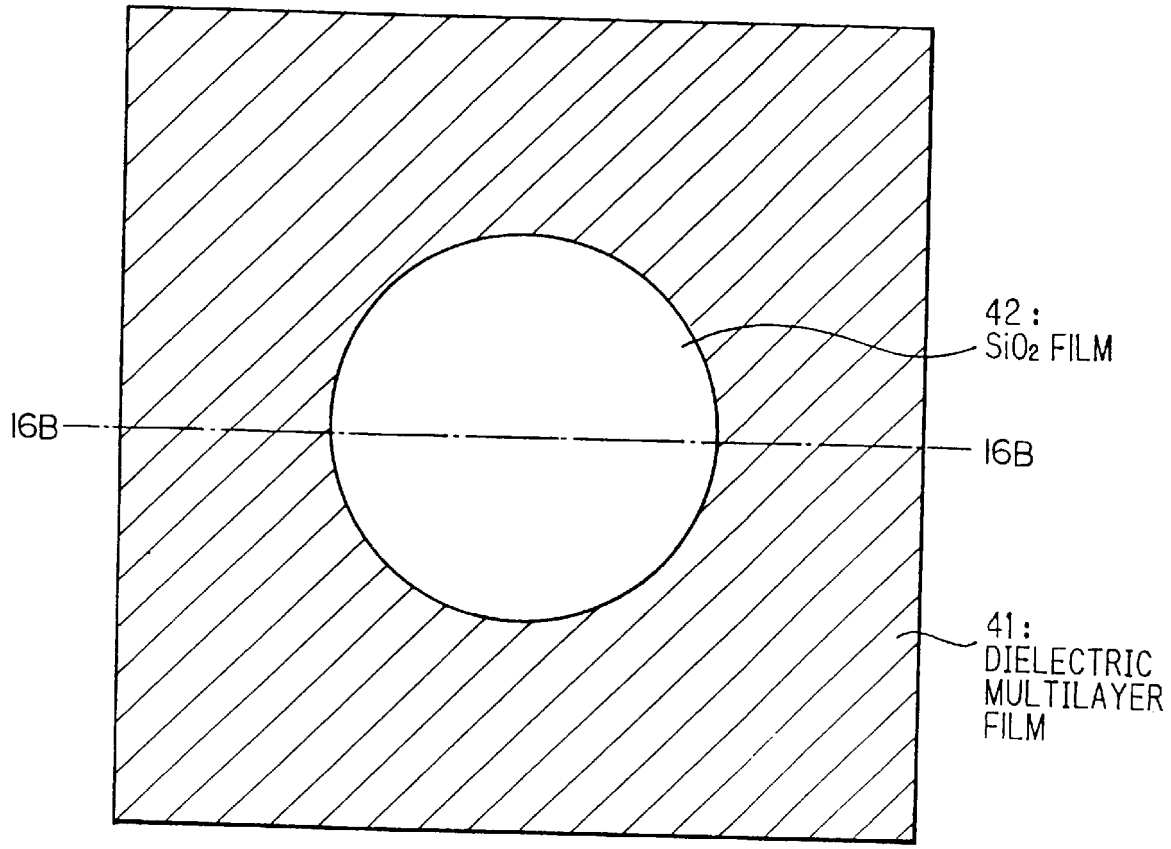
Figure 16B:
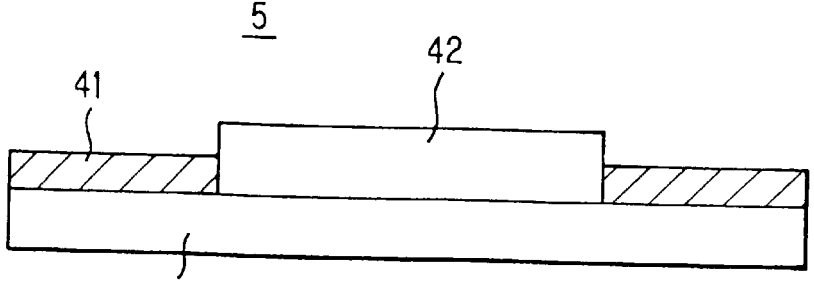

FIGS. 16A and 16B show a composition of the aperture control device 5 used in the first and second embodiments as shown in FIGS. 5 and 7, where FIG. 16A is a plan view thereof and FIG. 16B is a sectional view cut along the A—A' line in FIG. 16A. The aperture control device 5 is, as shown in FIGS. 16A and 16B, composed of a glass substrate 40, a dielectric multilayer film 41 which is formed on the outside of a circular region in the central part of the glass substrate 40, and a SiO2 film 42 as a phase compensating film which is formed on the inside of the circular region.

The diameter of the circular region is smaller than the effective diameters of the objective lens 6 used in the first embodiment as shown in FIG. 5 and the objective lens 15 used in the second embodiment as shown in FIG. 7. The dielectric multilayer film 41 has a function that a light with 635 nm wavelength is all transmitted through and a light with 785 nm wavelength is all reflected. The SiO2 film 42 has a function that adjusts a phase difference between a light transmitting through the dielectric multilayer film 14 on the outside of the circular region and the air and a light transmitting through the SiO2 film 42 on the inside of the circular region to be zero with respect to 635 nm wavelength.

Thus, the light with 635 nm wavelength is all transmitted through both the outside and the inside of the circular region of the aperture control device 5. On the other hand, the light with 785 nm wavelength is all reflected on the outside of the circular region and is all transmitted through the inside of the circular region.

Figure 17A:
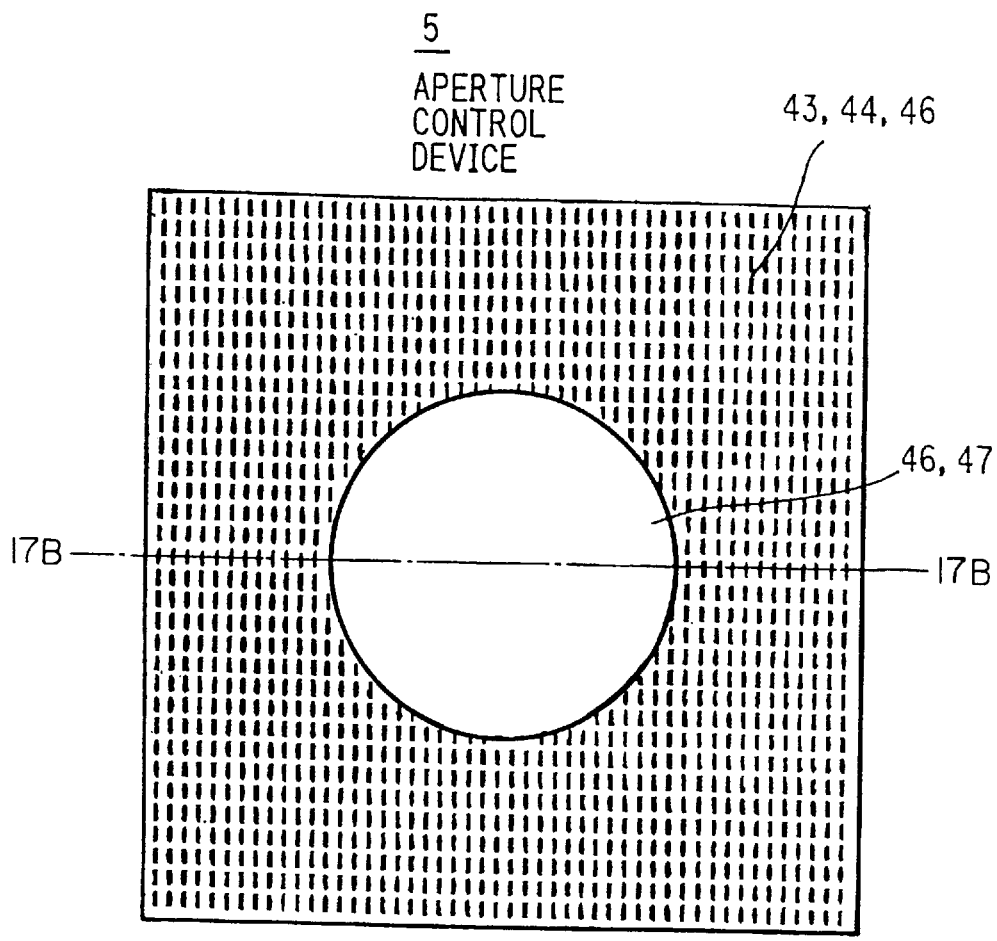
FIGS. 17A and 17B show a composition of another aperture control device used in the first and second embodiments.
Figure 17B:
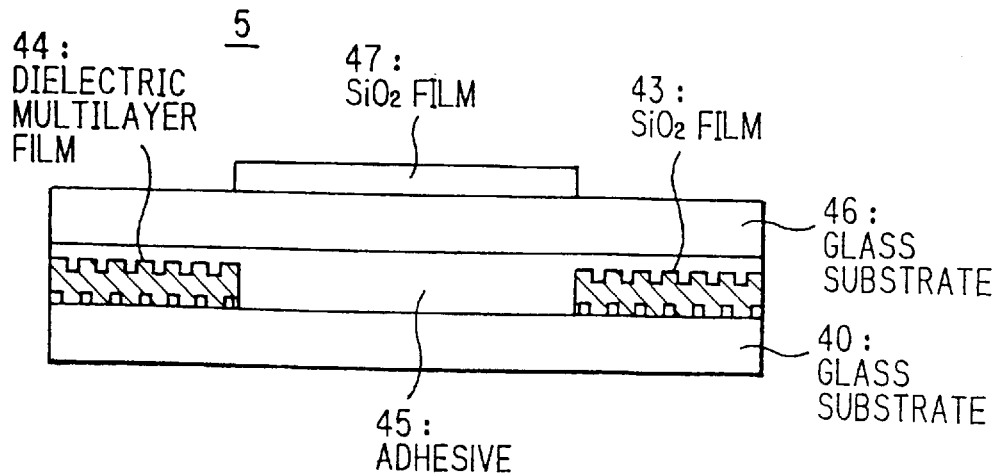

FIGS. 17A and 17B show another composition of the aperture control device 5 used in the first and second embodiments as shown in FIGS. 5 and 7, where FIG. 17A is a plan view thereof and FIG. 17B is a sectional view cut along the A—A' line in FIG. 17A. The aperture control device 5 is, as shown in FIGS. 17A and 17B, composed of a glass substrate 40 on the outside of a circular region in the central part of which a SiO2 film 43 and a dielectric multilayer film 44 are formed as a diffraction grating layer, and a glass substrate 46 on the inside of the circular region of which a SiO2 film 47 is formedfilm, phase compensating film, which are adhered to each other by an adhesive 45.

The diameter of the circular region is smaller than the effective diameters of the objective lens 6 used in the first embodiment as shown in FIG. 5 and the objective lens 15 used in the second embodiment as shown in FIG. 7. The dielectric multilayer film 44 has a function that a light with 635 nm wavelength is all transmitted through and a light with 785 nm wavelength is all reflected. The adhesive 45 and the SiO2 film 43 have like refractive indexes.

By the combination of the SiO2 film 43, dielectric multilayer film 44 and adhesive 45, the light with 635 nm wavelength is all transmitted through and the light with 785 nm wavelength is all reflected and diffracted. The SiO2 film 47 has a function that adjusts a phase difference between a light transmitting through the SiO2 film 43, dielectric multilayer film 44 and adhesive 45 on the outside of the circular region and the air and a light transmitting through the adhesive 45 and SiO2 film 47 on the inside of the circular region to be zero with respect to 635 nm wavelength.

Thus, the light with 635 nm wavelength is all transmitted through both the outside and the inside of the circular region of the aperture control device 5. On the other hand, the light with 785 nm wavelength is all reflected and diffracted on the outside of the circular region and is all transmitted through the inside of the circular region. The pattern of the SiO2, which is formed as straight lines shown in FIG. 17A, may be formed as another form such as concentric circles.

The effective numerical apertures of the objective lens 6 used in the first embodiment as shown in FIG. 5 and the objective lens 15 used in the second embodiment as shown in FIG. 7 are determined by the effective diameters of the objective lenses 6 and 15, respectively to the light with 635 nm wavelength and are determined by the diameter of the circular region of the aperture control device 5 shown in FIG. 16A or 17A to the light with 785 nm wavelength. Thus, a numerical aperture as to a digital video disk can be smaller than a numerical aperture as to a compact disk, for example, the former is 0.6 and the latter is 0.45.

Meanwhile, when only the objective lens 6 used in the first embodiment as shown in FIG. 5 or the objective lens 15 used in the second embodiment as shown in FIG. 7 is driven in the direction of tracking by an actuator, the light with 785 nm wavelength transmitting through the aperture control device 5 shown in FIG. 16A or 17A in a forward way cannot be all transmitted through the aperture control device 5 in a return way since the light axis is shifted from the center axis of the circular region of the aperture control device 5, therefore resulting in a loss in the amount of light. However, by integrally driving the aperture control device 5 with the objective lens 6 or 15 by an actuator, such loss in the amount of light can be prevented.

The dielectric multilayer film 11 of the optical coupling and dividing device 3 shown in FIGS. 6A and 6B, the dielectric multilayer film 16 of the optical coupling and dividing device 14 shown in FIGS. 8A and 8B, the dielectric multilayer film 21 of the optical coupling and dividing device 14 shown in FIGS. 9A and 9B, the dielectric multi-layer film 25 of the optical coupling and dividing device 14 shown in FIGS. 10A and 10B, the dielectric multilayer films 28, 31 of the hologram 26 shown in FIGS. 12A and 12B, the dielectric multilayer films 35, 38 of the hologram 33 shown in FIGS. 14A and 14B, the dielectric multilayer film 41 of the aperture control device 5 shown in FIG. 16B, and the dielectric multilayer film 44 of the aperture control device 5 shown in FIG. 17B can be made by forming an odd number of layers in which a high refractive index layer such as TiO2 and a low refractive index layer such as SiO2 are alternately deposited.

Here, if the refractive indexes, thicknesses and incident angles of the high refractive index layer and low refractive index layer are n1, n2, d1, d2 and θ1, θ2, respectively, $n1 d1/\cos\theta1 = n2 d2/\cos\theta2 = \lambda/4 (\lambda=785$ nm$)$ should be satisfied in the case that a light with 635 nm wavelength is all transmitted through and a light with 785 nm wavelength is all reflected, or, $n1 d1/\cos\theta1 = n2 d2/\cos\theta2 = \lambda/4 (\lambda=635$ nm$)$ should be satisfied in the case that a light with 635 nm wavelength is all reflected and a light with 785 nm wavelength is all transmitted.

Figure 18:
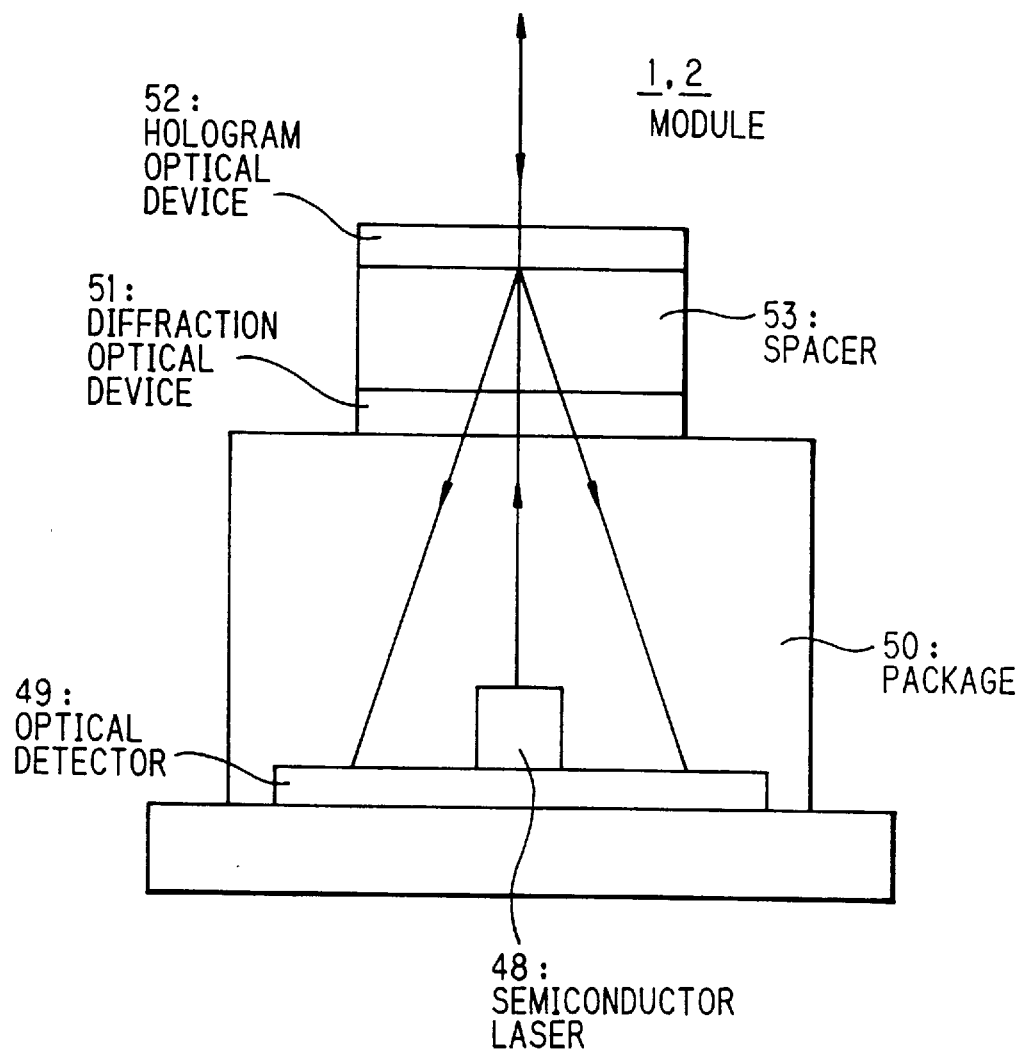
FIG. 18 shows a composition of a module used in the first and second embodiments.

FIG. 18 shows a composition of the modules 1 and 2 used in the first and second embodiments as shown in FIGS. 5 and 7. The module is composed of a semiconductor laser 48, an optical detector 49, a package 50 for packaging them, and a diffraction optical device 51 and a hologram optical device 52 which are disposed on the window of the package 50 with a spacer 53 inserted therebetween. The diffraction optical device 51 and the hologram optical device 52 have structures that SiO2 patterns are formed on glass substrates and have a function that a part of an incident light is transmitted through and a part of the incident light is diffracted.

In such a module, a light emitted from the semiconductor laser 48 is divided into a transmitted light and a ±1st-order diffraction light by the diffraction optical device 51, each of which is by around 50% transmitted through the hologram optical device 52, then being directed to the disk. The two lights reflected on the disk are diffracted by around 40% as a ±1st-order diffraction light on the hologram optical device 52, being transmitted through the diffraction optical device 51, being received by the optical detector 49.

Figure 19A:
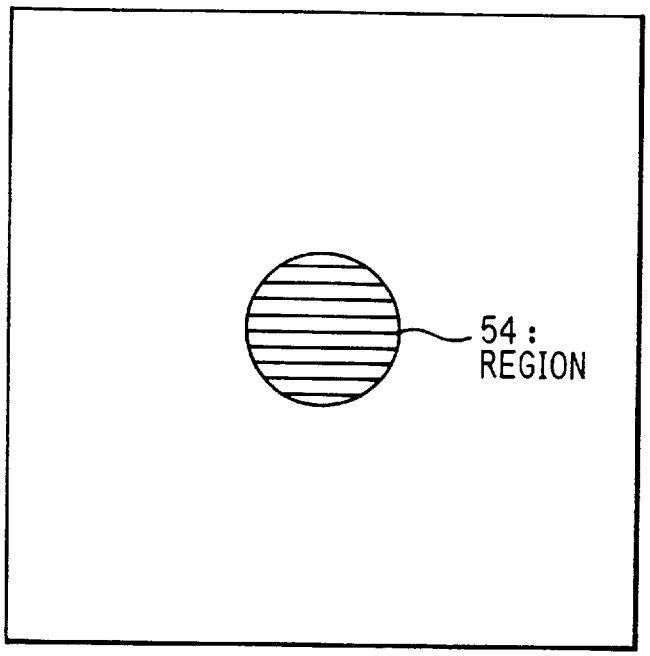
FIGS. 19A and 19B show a composition of a diffraction optical device used in the module in FIG. 18 and a patter of interference fringe of a hologram optical device used in the module in FIG. 18, respectively.
Figure 19B:
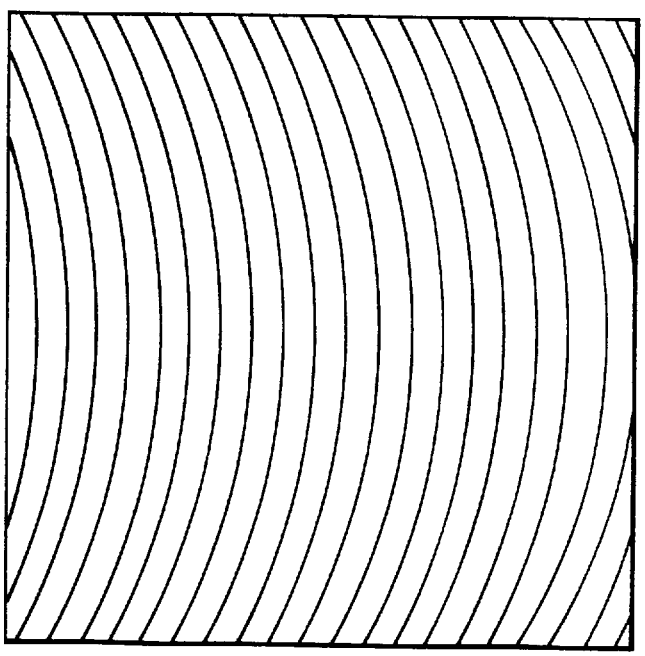

FIG. 19A shows a pattern of interference fringe of the diffraction optical device 51. The diffraction optical device 51 has the pattern only in a central region 54 thereof The light emitted from the semiconductor laser 48 is transmitted through the inside of the region 54, and the light reflected on the disk is transmitted through the outside of the region 54. FIG. 19B shows a pattern of interference fringe of the hologram optical device 52. T,e hologram optical device 52 has an off-axis concentric circle pattern, and it functions as a convex lens to a +1st-order diffraction light and as a concave lens to a −1st-order diffraction light.

FIGS. 20A and 20B show a pattern of light-receiving part of the optical detector 49 and locations of light spots on the light-receiving part in the case that the diffraction optical device 51 with the pattern of interference fringe shown in FIG. 19A and the hologram optical device 52 with the pattern of interference fringe shown in FIG. 19B are used, where FIG. 20A is a plan view and FIG. 20B is a side view of the central part in FIG. 20A. As shown in FIGS. 20A and 20B, the semiconductor laser 48 is disposed on the cotical detector 49 through a heat sink 55. A light laterally emitted from the semiconductor laser 48 is reflected on a mirror 56, being directed upward as shown in FIG. 20B.

Of the transmitted light through the diffraction optical device 51 in the forward way, the +1st-order diffraction light by the hologram optical device 52 in the return way forms a light spot 67 on light-receiving parts 57 to 59 which are divided into three parts, and the −1st-order diffraction light by the hologram optical device 52 in the return wave forms a light spot 68 on light-receiving parts 60 to 62 which are divided into three parts. Also, of the +1st-order diffraction light by the diffraction optical device 51 in the forward way, the +1st-order diffraction light by the hologram optical device 52 in the return way forms light spots 69, 70 on light-receiving parts 63, 64, respectively, and, of the −1st-order diffraction light by the diffraction optical device 51 in the forward way, the ±1st-order diffraction light by the hologram optical device 52 in the return way forms light spots 71, 72 on light-receiving parts 65, 66, respectively. The light-receiving parts 57 to 59, 63 and 65 are located behind the focusing point, and the light-receiving parts 60 to 62, 64 and 66 are located before the focusing point.

If the levels of electrical signals obtained by the photo-electric conversion of the light-receiving parts 57 to 66 are represented by V57 to V66, respectIvely, a focus error signal is obtained by the operation of $\{(V57+V59+V61)-(V58+V60+V62)\}$ on the known spot size method, and a track error signal is obtained by the operation of $\{(V63+V64)-(V65+V66)\}$ on the known three beam method. Also, a reproduction signal of the disk is obtained by the operation of $(V57+V58+V59+V60+V61+V62)$.

Figure 21:
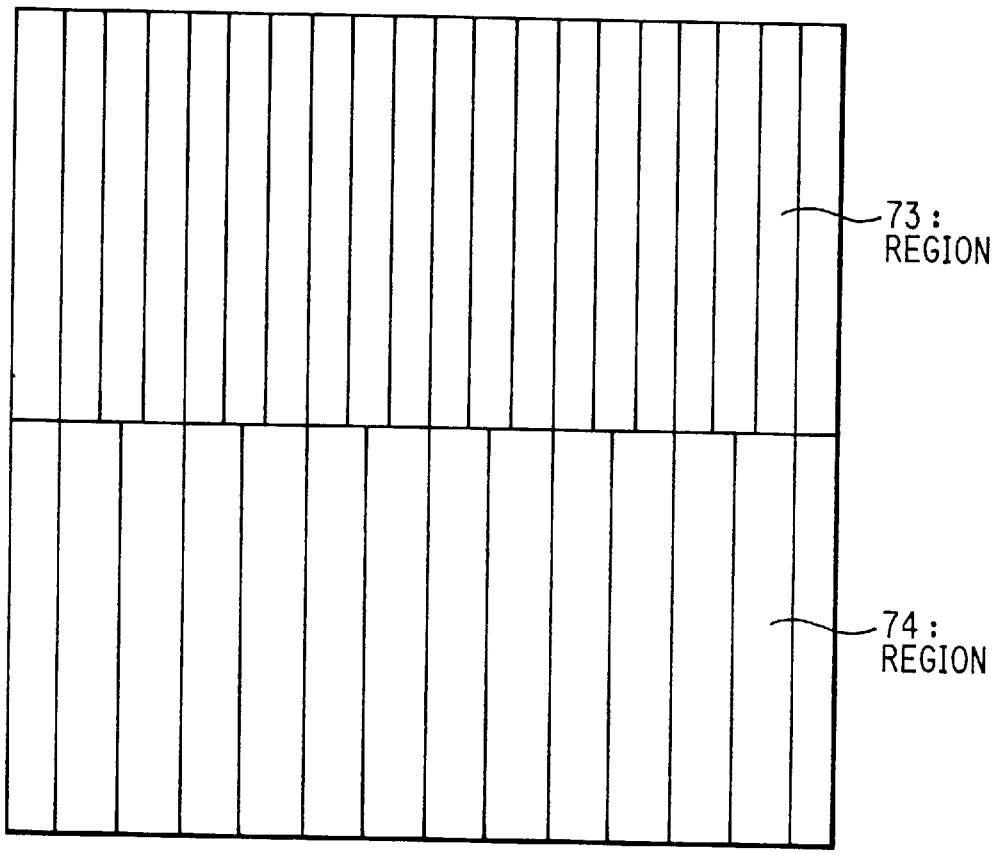
FIG. 21 shows a pattern of interference fringe of another hologram optical device used in the module in FIG. 18.

FIG. 21 shows another pattern of interference fringe of the hologram optical device 52. The hologram optical device 52 is divided into two regions 73, 74.

Figure 22:
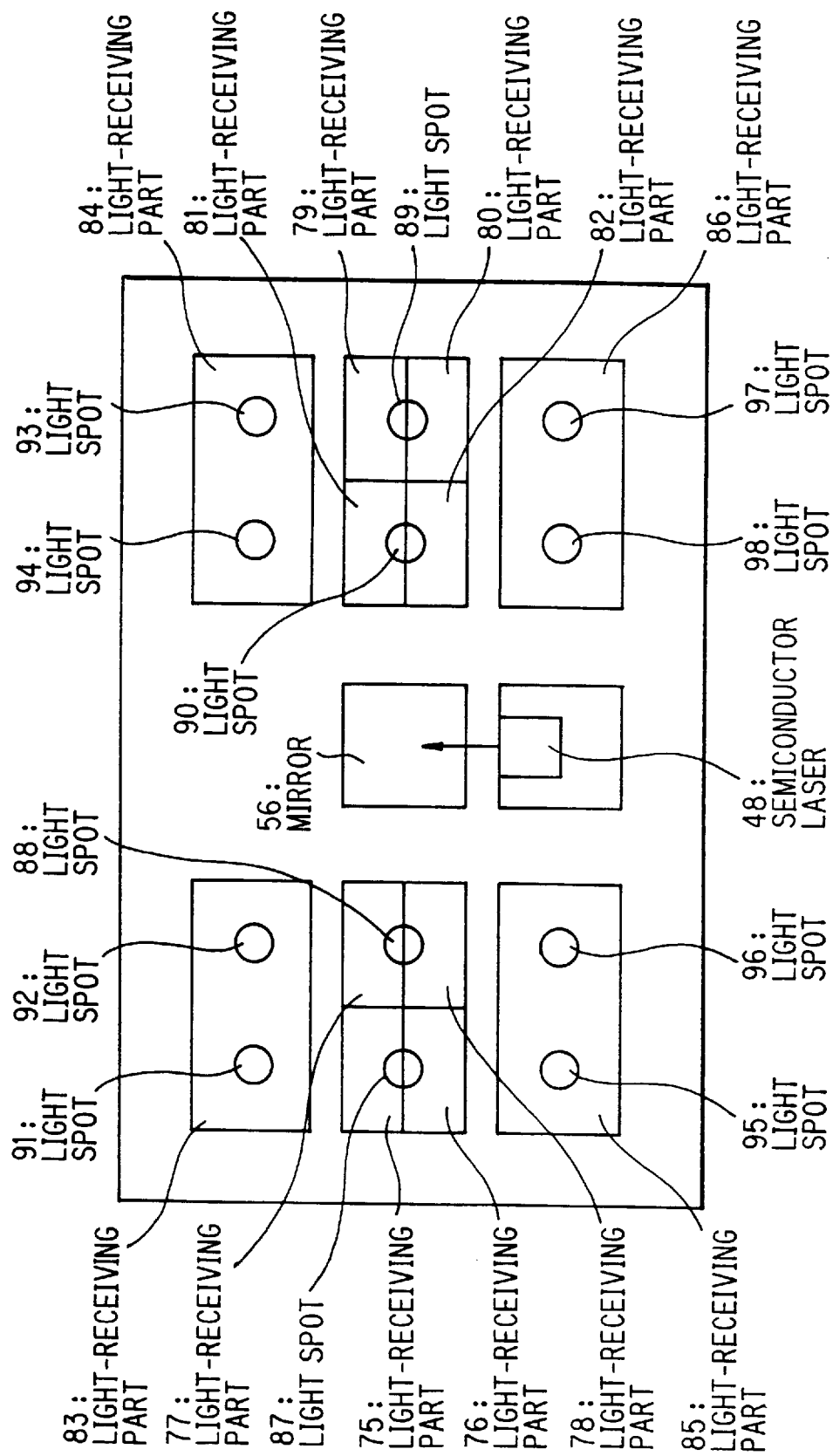
FIG. 22 shows a pattern of light-receiving parts of the optical detector in FIG. 18 and a location of light spots on the light-receiving parts in the case that the diffraction optical device and hologram optical device in FIGS. 19A and 21, respectively are used.

FIG. 22 shows a pattern of light-receiving part of the optical detector 49 and locations of light spots on the light-receiving part in the case that the diffraction optical device 51 with the interference fringe pattern shown in FIG. 19A and the hologram optical device 52 with the interference fringe pattern shown in FIG. 21 are used. The semiconductor laser 48 is disposed on the optical detector 49 as shown in FIG. 20B.

In FIG. 22, of the transmitted light through the diffraction optical device 51 in the forward way, the +1st-order diffraction light by the region 73 of the hologram optical device 52 in the return way forms a light spot 87 on the dividing line of light-receiving parts 75, 76 which are divided into two parts, and the +1st-order diffraction light by the region 74 of the hologram optical device 52 in the return way forms a light spot 88 on the dividing line of light-receiving parts 77, 78 which are divided into two parts. Also, of the transmitted light through the diffraction optical device 51 in the forward way, the −1st-order diffraction light by the region 73 of the hologram optical device 52 in the return way forms a light spot 89 on the dividing line of light-receiving parts 79, 80 which are divided into two parts, and the −1st-order diffraction light by the region 74 of the hologram optical device 52 in the return way forms a light spot 90 on the dividing line of light-receiving parts 81, 82 which are divided into two parts.

On the other hand, of the +1st-order diffraction light by the diffraction optical device 51 in the forward way, the +1st-order diffraction lights by the regions 73, 74 of the hologram optical device 52 in the return way form light spots 91, 92, respectively on a light-receiving part 83, and, the −1st-order diffraction lights by the regions 73, 74 of the hologram optical device 52 in the return way form light spots 93, 94, respectively on a light-receiving part 84. Also, of the −1st-order diffraction light by the diffraction optical device 51 in the forward way, the +1st-order diffraction lights by the regions 73, 74 of the hologram optical device 52 in the return way form light spots 95, 96, respectively on a light-receiving part 85, and the −1st-order diffraction lights by the regions 73, 74 form light spots 97, 98, respectively on a light-receiving part 86.

If the levels of electrical signals obtained by the photoelectric conversion of the light-receiving parts 75 to 86 are represented by V75 to V86, respectively, a focus error signal is obtained by the operation of $\{(V75+V78+V79+V82)−(V76+V77+V80+V81)\}$ by the known Foucault method, and a track error signal is obtained by the operation of $\{(V83+V84)−(V85+V86)\}$ by the known three beam method. Also, a reproduction signal of the disk is obtained by the operation of $(V75+V76+V77+V78+V79+V80+V81+V82)$.

An optical head device in the third preferred embodiment will be explained in FIG. 23, wherein like parts are indicated by like reference numerals as used in FIG. 5.

Figure 23:
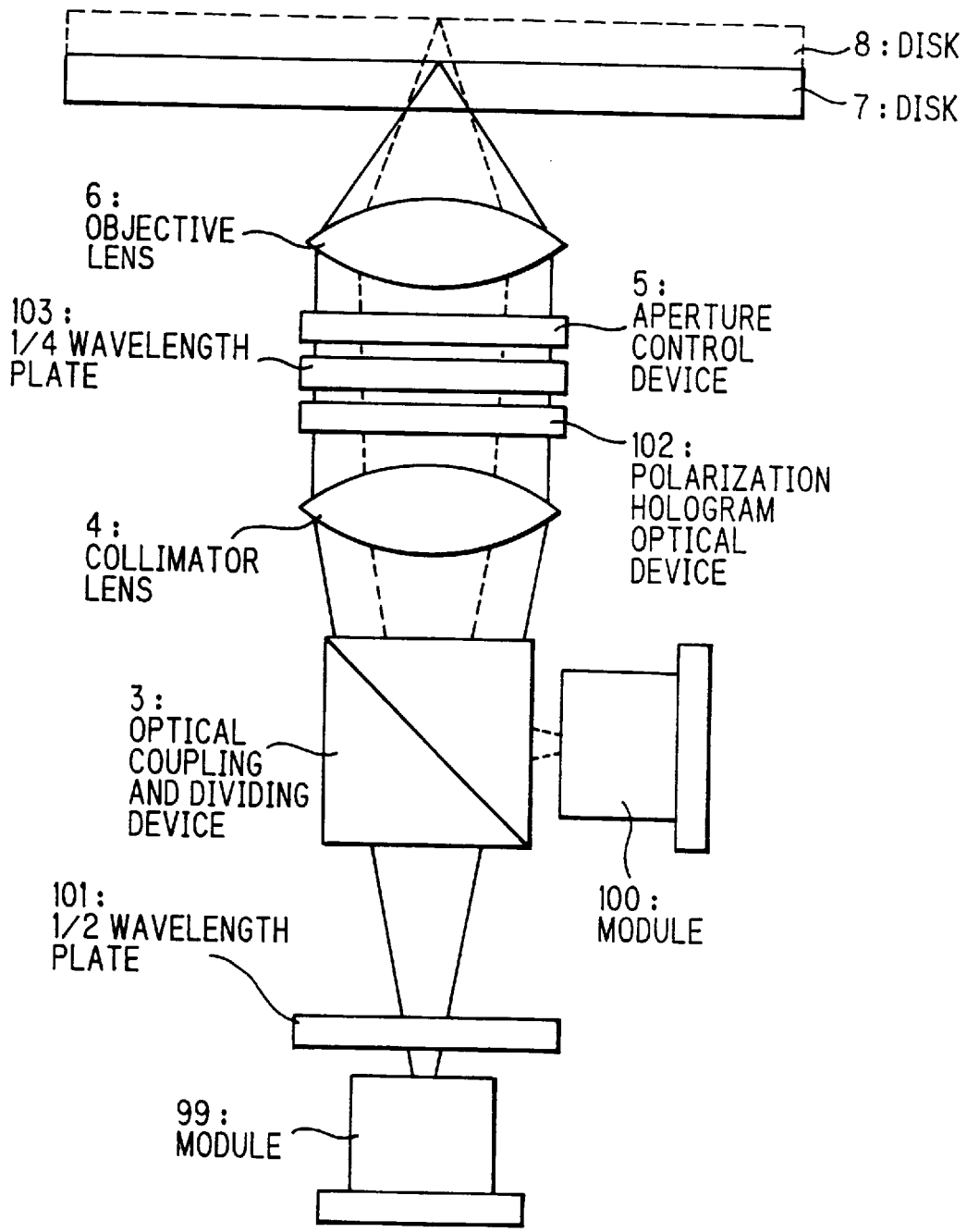
FIG. 23 shows a composition of an optical head device in a third preferred embodiment according to the invention.

In FIG. 23, both a. module 99 and a module 100, as explained after, include a semiconductor laser and an optical detector which receives light reflected on a disk. The semiconductor laser of the module 99 emits light with 635 nm wavelength, and the semiconductor laser of the module 100 emits light with 785 nm wavelength.

Light emitted from the semiconductor laser of the module 99 is transmitted through a ½ wavelength plate 101, an optical coupling and dividing device 3, a collimator lens 4, a polarization hologram optical device 102, a ¼ wavelength plate 103 and an aperture control device 5, entering an objective lens 6 as a collimated light, then being focused on a disk 7 such as a digital video disk with a substrate thickness of 0.6 mm. Light reflected on the disk 7 is reversely transmitted through the objective lens 6, aperture control device 5 and ¼ wavelength plate 103, being diffracted as a ± diffraction light by the polarization hologram optical device 102, then being transmitted through the collimator lens 4, optical coupling and dividing device 3 and ½ wavelength plate 101, being received by the optical detector of the module 99.

On the other hand, light emitted from the semiconductor laser of the module 100 is reflected on the optical coupling and dividing device 3, being transmitted through the collimator lens 4, polarization hologram optical device 102, ¼ wavelength plate 103 and aperture control device 5, entering the objective lens 6 as a divergent light, then being focused on a disk 8 such as a compact disk with Ea substrate thickness of 1.2 mm. Light reflected on the disk 8 is reversely transmitted through the objective lens 6, aperture control device 5 and ¼ wavelength plate 103, being diffracted as a ± diffraction light by the polarization hologram optical device 102, then being transmitted through the collimator lens 4 and optical coupling and dividing device 3, being received by the optical detector of the module 100. The polarization hologram optical device 102, ¼ wavelength plate 103 and aperture control device 5 can be integrally driven with the objective lens 6 in the directions of focusing and tracking by an actuator(not shown).

The optical coupling and dividing device 3 has the same composition as shown in FIGS. 6A and 6B, and the aperture control device 5 has the same composition as shown in FIGS. 16A and 16B or FIGS. 17A and 17B. The optical path length from the module 100 to the collimator lens 4 as to the light with 785 nm wavelength is shorter than the optical path length from the module 99 to the collimator lens 4 as to the light with 635 nm wavelength.

Here, if phase differences between lights transmitting through the line part and space part of the polarization hologram optical device 102 as to an ordinary light and an extraordinary light are represented by $\Phi_o$ and $\Phi_e$, respectively, since the polarization hologram optical device 102 is designed to give $\Phi_o=0$, $\Phi_e=\pi$ as to 635 nm wavelength, $\Phi_o=0$, $\Phi_e=0.81\pi$ are given as to 785 nm wavelength. Here, if transmissivities as to an ordinary light and an extraordinary light are represented by $\eta_{0o}$, $\eta_{0e}$, respectively, and, if ±1st-order diffraction efficiencies as to an ordinary light and an extraordinary light are represented by $\eta_{1o}$, $\eta_{1e}$, respectively, next equations are given:

$$\eta_{0o}=\cos^2(\Phi_o/2) \qquad (1)$$

$$\eta_{0e}=\cos^2(\Phi_e/2) \qquad (2)$$

$$\eta_{1o}=(8/\pi^2)\sin^2(\Phi_o/2) \qquad (3)$$

$$\eta_{1e}=(8/\pi^2)\sin^2(\Phi_e/2) \qquad (4)$$

Therefore, as to 635 nm wavelength, $\eta_{0o}=1$, $\eta_{0e}=0$, $\eta_{1o}=0$ and $\eta_{1e}=0.81$ are given, and, as to 785 nm wavelength, $\eta_{0o}=1$, $\eta_{0e}=0.09$, $\eta_{1o}=0$ and $\eta_{1e}=0.74$ are given.

On the other hand, if a phase difference between an ordinary light and an extraordinary light in the ¼ wavelength plate 103 is represented by $\Phi$, the ¼ wavelength plate 103 is designed to give $\Phi=\pi/2$ as to 635 nm wavelength, $\Phi=0.40\pi$ is given as to 785 nm wavelength. When a linearly polarized light enters the ¼ wavelength plate 103, the values of polarization components parallel and perpendicular to an incident light of the light transmitting through the ¼ wavelength plate 103 in the forward and return ways are represented by $\cos^2\Phi$, $\sin^2\Phi$, respectively. Therefore, as to 635 nm wavelength, $\cos^2\Phi=0$, $\sin^2\Phi=1$ are given, and, as to 785 nm wavelength, $\cos^2\Phi=0.09$, $\sin^2\Phi=0.91$ are given.

Accordingly, the Light emitted from the semiconductor laser of the module 99 is rotated by 90° polarization direction by the ½ wavelength plate 101, entering the polarization hologram optical device 102 as an ordinary light and all transmitted through it, then being converted from a linear polarization into a circular polarization by the ¼ wavelength plate 103, being directed to the disk 7. The light reflected on the disk 7 is converted from a circular polarization into a linear polarization by the ¼ wavelength plate 103, entering the polarization hologram optical device 102 as an extraordinary light and diffracted by 81% as a ±-order diffraction light, then being received by the optical detector of the module 99.

On the other hand the light emitted from the semiconductor laser of the module 100 enters the polarization hologram optical device 102 as an ordinary light and is all transmitted through it, then being converted from a linear polarization into an elliptic polarization by the ¼ wavelength plate 103, being directed to the disk 8. The light reflected on the disk 8 is converted from the elliptic polarization into another elliptic polarization by the ¼ wavelength plate 103, then entering the polarization hologram optical device 102. The values of ordinary and extraordinary light components of this elliptic polarization is 9%, 91%, respectively. Then, by 9% of the ordinary light and by 74% of the extraordinary light are diffracted as a ±-order diffraction light, being received by the optical detector of the module 100.

Though, in the third embodiment as shown in FIG. 23, the optical coupling and dividing device 3 uses the dielectric multilayer film 11 in which the light with 635 nm wavelength is all transmitted through and the light with 785 nm wavelength is all reflected, the optical coupling and dividing device 3 may use another dielectric multilayer film in which the light with 635 nm wavelength is all reflected on and the light with 785 nm wavelength is all transmitted through. In this case, the positions of the module 99 and module 100 need to be exchanged with each other.

An optical head device in the fourth preferred embodiment will be explained in FIG. 24, wherein like parts are indicated by like reference numerals as used in FIG. 7.

Figure 24:
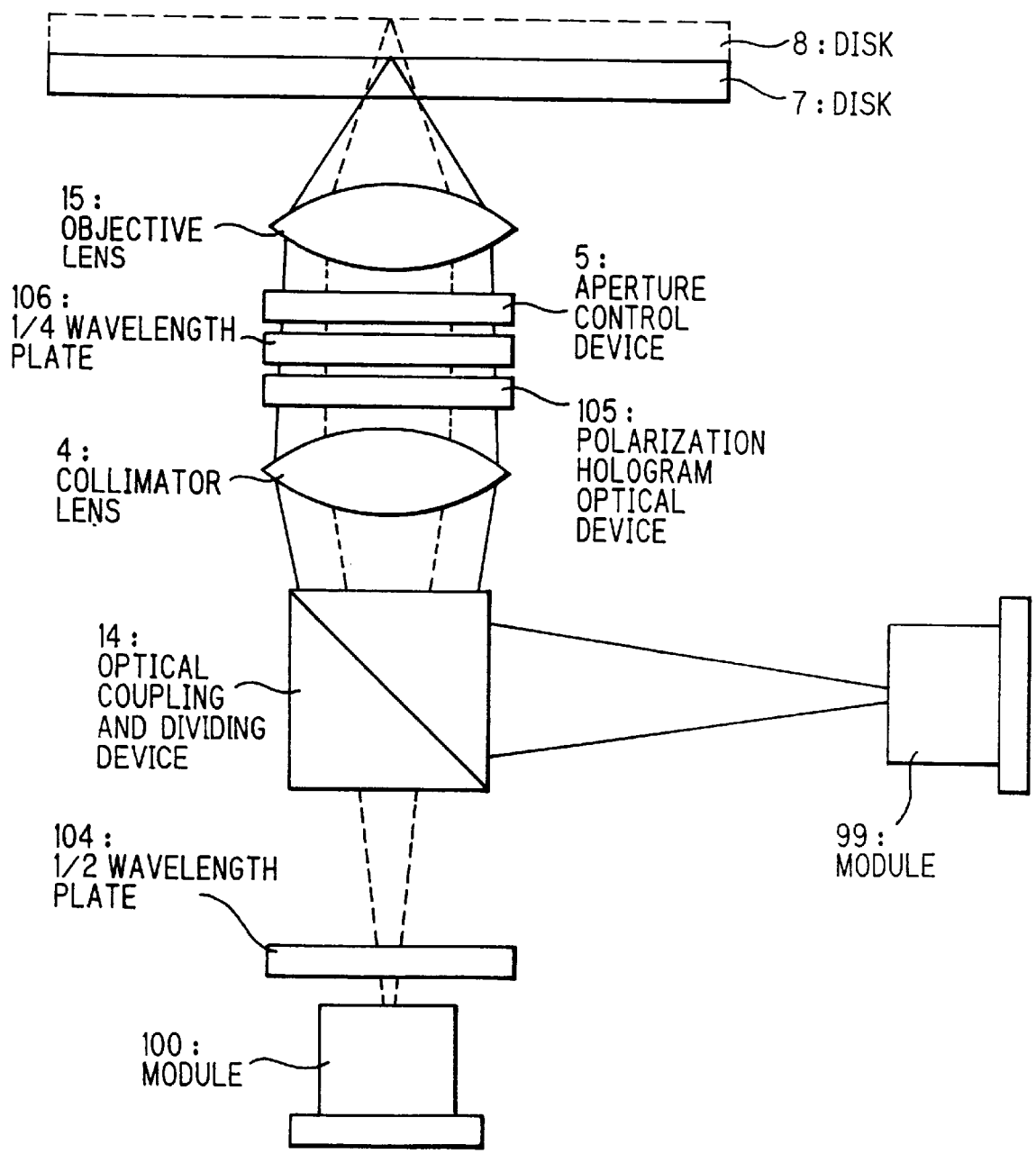
FIG. 24 shows a composition of an optical head device in a fourth preferred embodiment according to the invention.

In FIG. 24, both a module 99 and a module 100 include a semiconductor laser and an optical detector which receives light reflected on a disk. The semiconductor laser of the module 99 emits light with 635 nm wavelength, and the semiconductor laser of the module 100 emits light with 785 nm wavelength.

Light emitted from the semiconductor laser of the module 99 is reflected on an optical coupling and dividing device 14, being transmitted through a collimator lens 4, a polarization hologram optical device 105, a ¼ wavelength plate 106 and an aperture control device 5, entering an objective lens 15 as a convergent light, then being focused on a disk 7 such as a digital video disk with a substrate thickness of 0.6 mm. Light reflected on the disk 7 is reversely transmitted through the objective lens 15, aperture control device 5 and ¼ wavelength plate 106, being diffracted as a ± diffraction light by the polarization hologram optical device 105, then being transmitted through the collimator lens 4 and optical coupling and dividing device 14, being received by the optical detector of the module 99.

On the other hand, light emitted from the semiconductor laser of the module 100 is transmitted through a ½ wavelength plate 104, the optical coupling and dividing device 14, collimator lens 4, polarization hologram optical device 105, ¼ wavelength plate 106 and aperture control device 5, entering an objective lens 15 as a collimated light, then being focused on a disk 8 such as a compact disk with a substrate thickness of 1.2 mm. Light reflected on the disk 8 is reversely transmitted through the objective lens 15, aperture control device 5 and ¼ wavelength plate 106, being diffracted as a ± diffraction light by the polarization hologram optical device 105, then being transmitted through the collimator lens 4, optical coupling and dividing device 14 and ½ wavelength plate 102, being received by the optical detector of the module 100. The polarization hologram optical device 105, ¼ wavelength plate 106 and aperture control device 5 can be integrally driven with the objective lens 15 in the directions of focusing and tracking by an actuator(not shown).

The optical coupling and dividing device 14 has the same composition as shown in FIGS. 8A and 8B, and the aperture control device 5 has the same composition as shown in FIGS. 16A and 16B or FIGS. 17A and 17B. The optical path length from the module 99 to the collimator lens 4 as to the light with 635 nm wavelength is longer than the optical path length from the module 100 to the collimator lens 4 as to the light with 785 nm wavelength.

Here, if phase differences between lights transmitting through the line part and space part of the polarization hologram optical device 105 as to an ordinary light and an extraordinary light are represented by $\Phi_o$ and $\Phi_e$, respectively, since the polarization hologram optical device 105 is designed to give $\Phi_o=0$, $\Phi_e=\pi$ as to 785 nm wavelength, $\Phi_o=0$, $\Phi_e=1.24\pi$ are given as to 635 nm wavelength. Here, if transmissivities as to an ordinary light and an extraordinary light are represented by $\eta_{0o}$, $\eta_{0e}$, respectively, and, if ±1st-order diffraction efficiencies as to an ordinary light and an extraordinary light are represented by $\eta_{1o}$, $\eta_{1e}$, respectively, the aforementioned equations (1) to (4) are given.

Therefore, as to 635 nm wavelength, $\eta_{0o}=1$, $\eta_{0e}=0.13$, $\eta_{1o}=0$ and $\eta_{1e}=0.70$ are given, and, as to 785 nm wavelength, $\eta_{0o}=1$, $\eta_{0e}=0$, $\eta_{1o}=0$ and $\eta_{1e}=0.81$ are given.

On the other hand, if a phase difference between an ordinary light and an extraordinary light in the ¼ wavelength plate 106 is represented by $\Phi$, the ¼ wavelength plate 106 is designed to give $\Phi=\pi/2$ as to 785 nm wavelength, $\Phi=0.62\pi$ is given as to 635 nm wavelength. When a linearly polarized light enters the ¼ wavelength plate 106, the values of polarization components parallel and perpendicular to an incident light of the light transmitting through the ¼ wavelength plate 106 in the forward and return ways are represented by $\cos^2\Phi$, $\sin^2\Phi$, respectively. Therefore, as to 635 nm wavelength, $\cos^2\Phi=0.13$, $\sin^2\Phi=0.87$ are given, and, as to 785 nm wavelength, $\cos^2\Phi=0$, $\sin^2\Phi=1$ are given.

Accordingly, the Light emitted from the semiconductor laser of the module 99 enters the polarization hologram optical device 105 as an ordinary light and is all transmitted through it, then being converted from a linear polarization into an elliptic polarization by the ¼ wavelength plate 106, being directed to the disk 7. The light reflected on the disk 7 is converted from the elliptic polarization into another elliptic polarization by the ¼ wavelength plate 106, then entering the polarization hologram optical device 105. The values of ordinary and extraordinary light components of this elliptic polarization is 13%, 87%, respectively. Then, by 13% of the ordinary light and by 70% of the extraordinary light are diffracted as a ±-order diffraction light, being received by the optical detector of the module 99.

On the other hand, the light emitted from the semiconductor laser of the module 100 is rotated by 90° polarization direction by the ½ wavelength plate 104, entering the polarization hologram optical device 105 as an ordinary light and is all transmitted through it, then being converted from a linear polarization into a circular polarization by the ¼ wavelength plate 106, being directed to the disk 8. The light reflected on the disk 8 is converted from a circular polarization into a linear polarization by the ¼ wavelength plate 106, entering the polarization hologram optical device 105 as an extraordinary light and diffracted by 81% as a ±-order diffraction light, then being received by the optical detector of the module 100.

Though, in the fourth embodiment as shown in FIG. 24, the optical coupling and dividing device 14 uses the dielectric multilayer film 16 in which the light with 635 nm wavelength is all reflected and the light with 785 nm wavelength is all transmitted, the optical coupling and dividing device 14 may use another dielectric multilayer film in which the light with 635 nm wavelength is all transmitted through and the light with 785 nm wavelength is all reflected. In this case, the positions of the module 99 and module 100 need to be exchanged with each other.

Next, components used in the third and fourth embodiments as shown in FIGS. 23 and 24 will be detailed.

Figure 25:
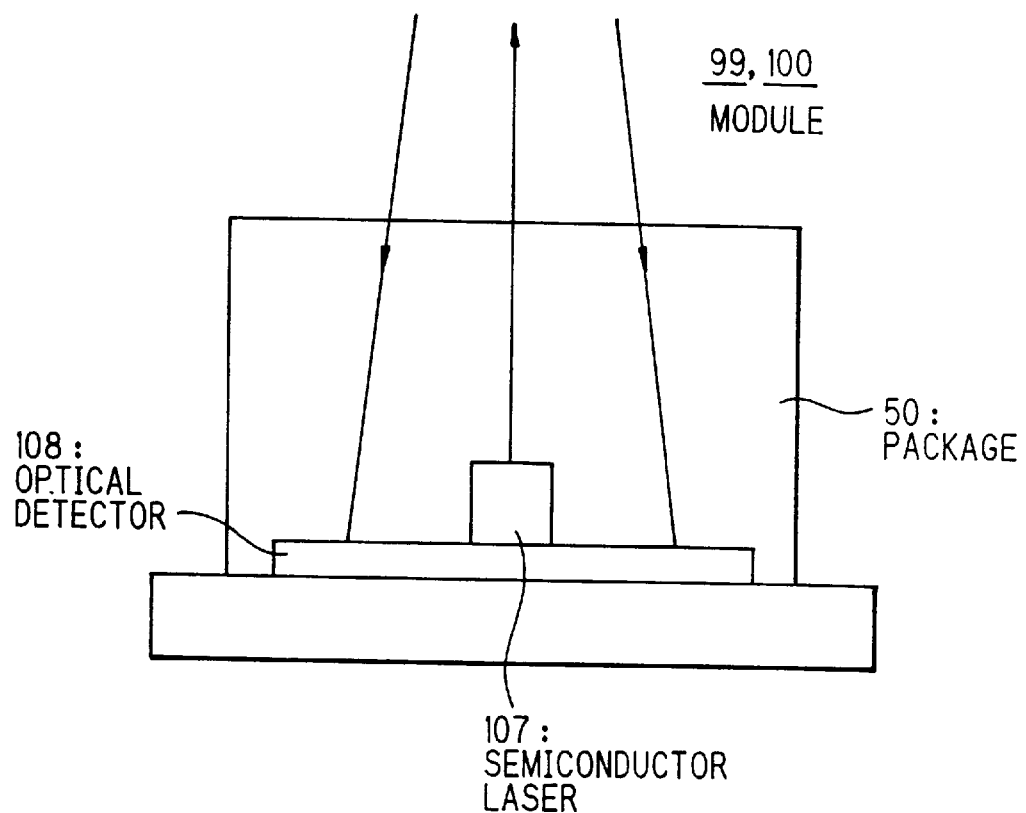
FIG. 25 shows a composition of a module used in the third and fourth embodiments.

FIG. 25 shows a composition of the modules 99 and 100. The module is composed of a semiconductor laser 107, an optical detector 108 and a package 50 for packaging them. The light emitted from the semiconductor laser 107 is transmitted through the polarization hologram optical device 102 or 105, being directed to the disk. The light reflected on the disk is diffracted as a ±-order diffraction light by the polarization hologram optical device 102 or 105, being received by the optical detector 108.

Figure 26A:
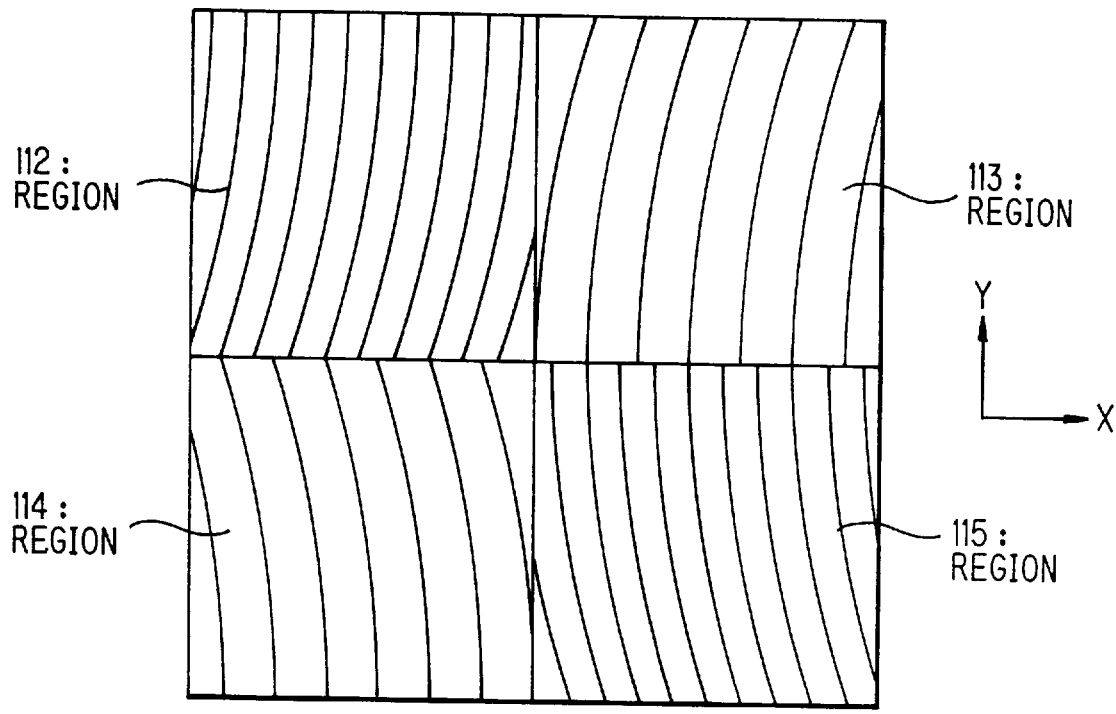
FIGS. 26A and 26B show a pattern of interference fringe and a cross-sectional form, respectively, of a polarization hologram optical device used in the third and fourth embodiments.
Figure 26B:
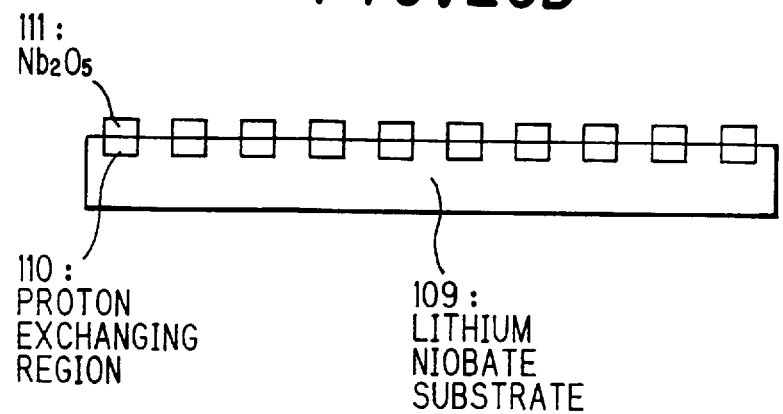

FIG. 26A shows a pattern of interference fringe of the polarization hologram optical devices 102, 105, and FIG. 26B is a sectional view thereof. As shown in FIG. 26B, the polarization hologram optical devices 102, 105 are a structure that a pattern of proton exchanging region and Nb2O5 111 is formed on a lithium niobate substrate 109 which has a birefringence characteristic.

The interference fringe pattern of the polarization hologram optical devices 102, 105 is, as shown in FIG. 26A, divided into four regions 112 to 115. Each of the regions has an off-axis concentric circle pattern. The regions 112, 115 function as a convex lens to a ±-order diffraction light and as a concave lens to −1st-order diffraction light, and the regions 113, 114 function as a concave lens to a +1st-order diffraction light and as a convex lens to −1st-order diffraction light. The optical axes of the polarization hologram optical devices 102, 105 are set in the directions of X, Y as shown in FIG. 26A.

Figure 27:
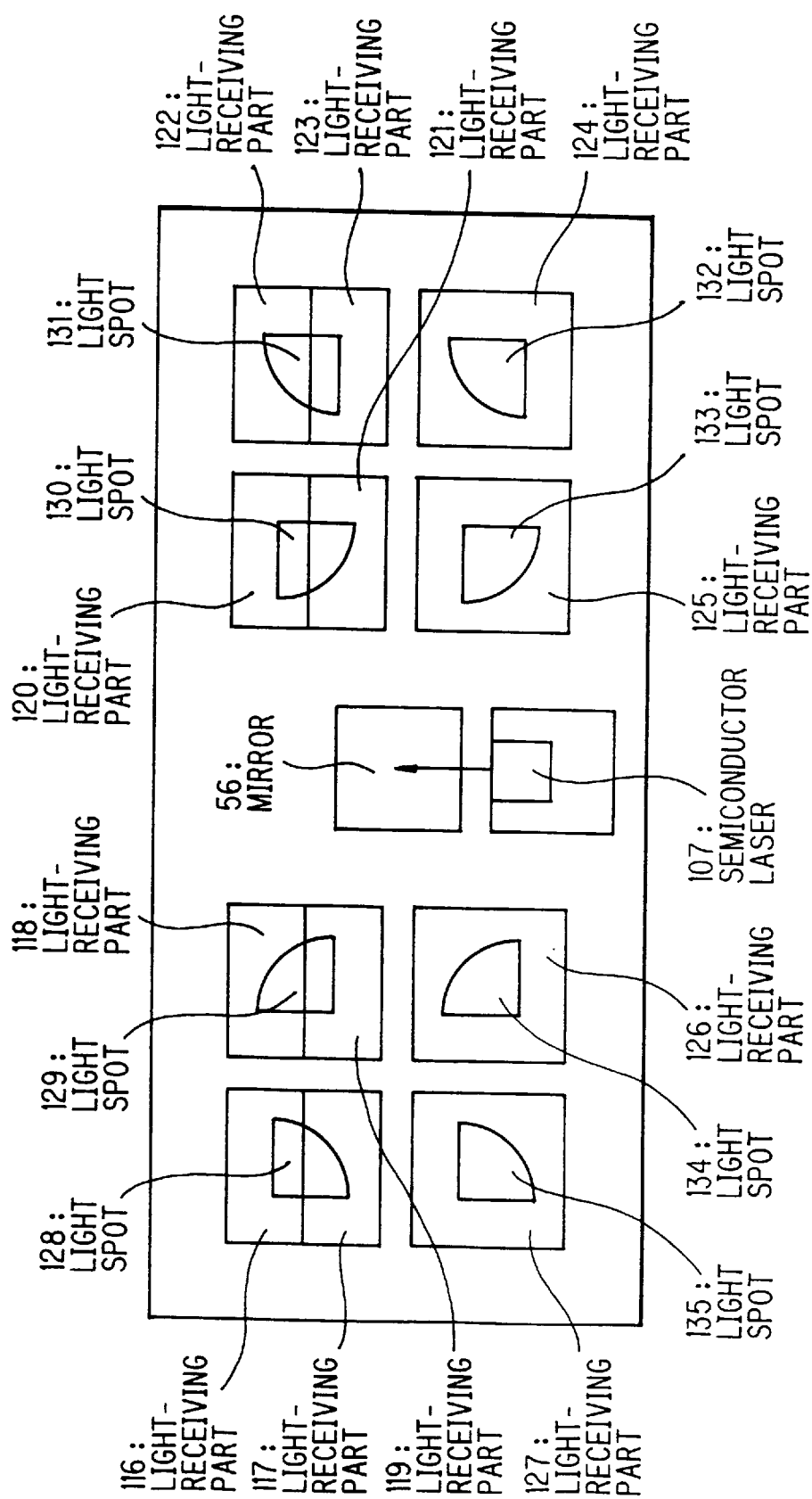
FIG. 27 shows a pattern of light-receiving parts of an optical detector in FIG. 25 and a location of light spots on the light-receiving parts in the case that the polarization hologram optical device in FIGS. 26A and 26B is used.

FIG. 27 shows a pattern of light-receiving part of the optical detector 108 and locations of light spots on the light-receiving part in the case that the polarization hologram optical device 102 or 105 with the interference fringe pattern shown in FIGS. 26A is used. The semiconductor laser 107 is disposed on the optical detector 108 as shown in FIG. 20B.

The +1st-order diffraction light by the region 112 of the polarization hologram optical device 102 or 105 forms a light spot 128 on the dividing line of light-receiving parts 116, 117 which are divided into two parts, and the −1st-order diffraction light by the region 112 forms a light spot 132 on a light-receiving part 124.

The +1st-order diffraction light by the region 113 of the polarization hologram optical device 102 or 105 forms a light spot 129 on the dividing line of light-receiving parts 118, 119 which are divided into two parts, and the −1st-order diffraction light by the region 113 forms a light spot 133 on a light-receiving part 125. The +1st-order diffraction light by the region 114 of the polarization hologram optical device 102 or 105 forms a light spot 130 on the dividing line of light-receiving parts 120, 121 and the −1st-order diffraction light by the region 114 forms a light spot 134 on a light-receiving part 126.

Also, the +1st-order diffraction light by the region 115 of the polarization hologram optical device 102, 105 forms a light spot 131 on the dividing line of light-receiving parts 122, 123 and the −1st-order diffraction light by the region 115 forms a light spot 135 on a light-receiving part 127. The light-receiving parts 116, 117, 122, 123, 125 and 126 are located behind the focusing point, and the light-receiving parts 118, 119, 120, 121, 124 and 127 are located before the focusing point.

If the levels of electrical signals obtained by the photoelectric conversion of the light-receiving parts 116 to 127 are represented by V116 to V127, respectively, a focus error signal is obtained by the operation of {(V116+V118+V121+V123)−(V117+V119+V120+V122)} on the known spot size method, and a track error signal is obtained by the operation of {(V124+V126)−(V125+V127)} by the known push-pull method. Also, a reproduction signal of the disk is obtained by the operation of (V124+V125+V126+V127). The track error signal is also obtained by the sample-holding of {(V124+V126)−(V125+V127)} at a falling point and a rising point of the reproduction signal of the disk by the known heterodyne method.

Figure 28:
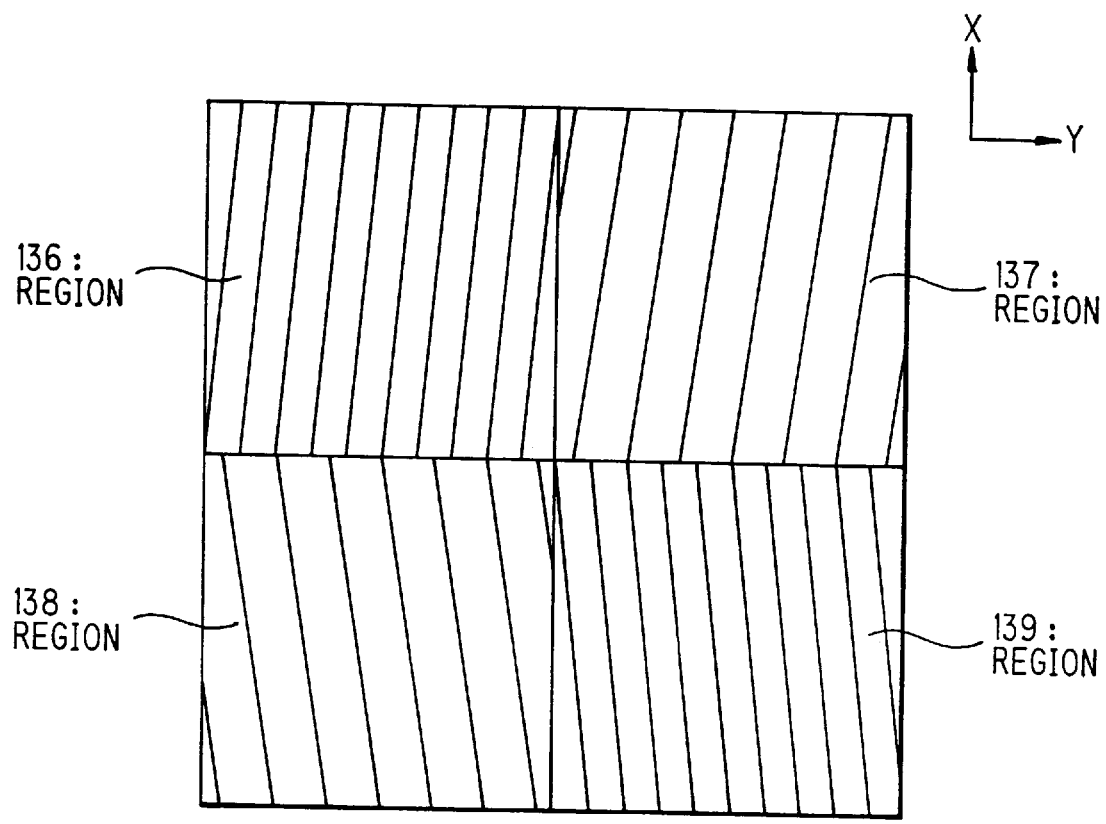
FIG. 28 shows a pattern of interference fringe of another polarization hologram optical device used in the third and fourth embodiments.

FIG. 28 shows another pattern of interference fringe of the polarization hologram optical devices 102, 105. The interference fringe pattern of the polarization hologram optical devices 102, 105 is, as shown in FIG. 28, divided into four regions 136 to 139. The optical axes of the polarization hologram optical devices 102, 105 are set in the directions of X, Y as shown in FIG. 28.

Figure 29:
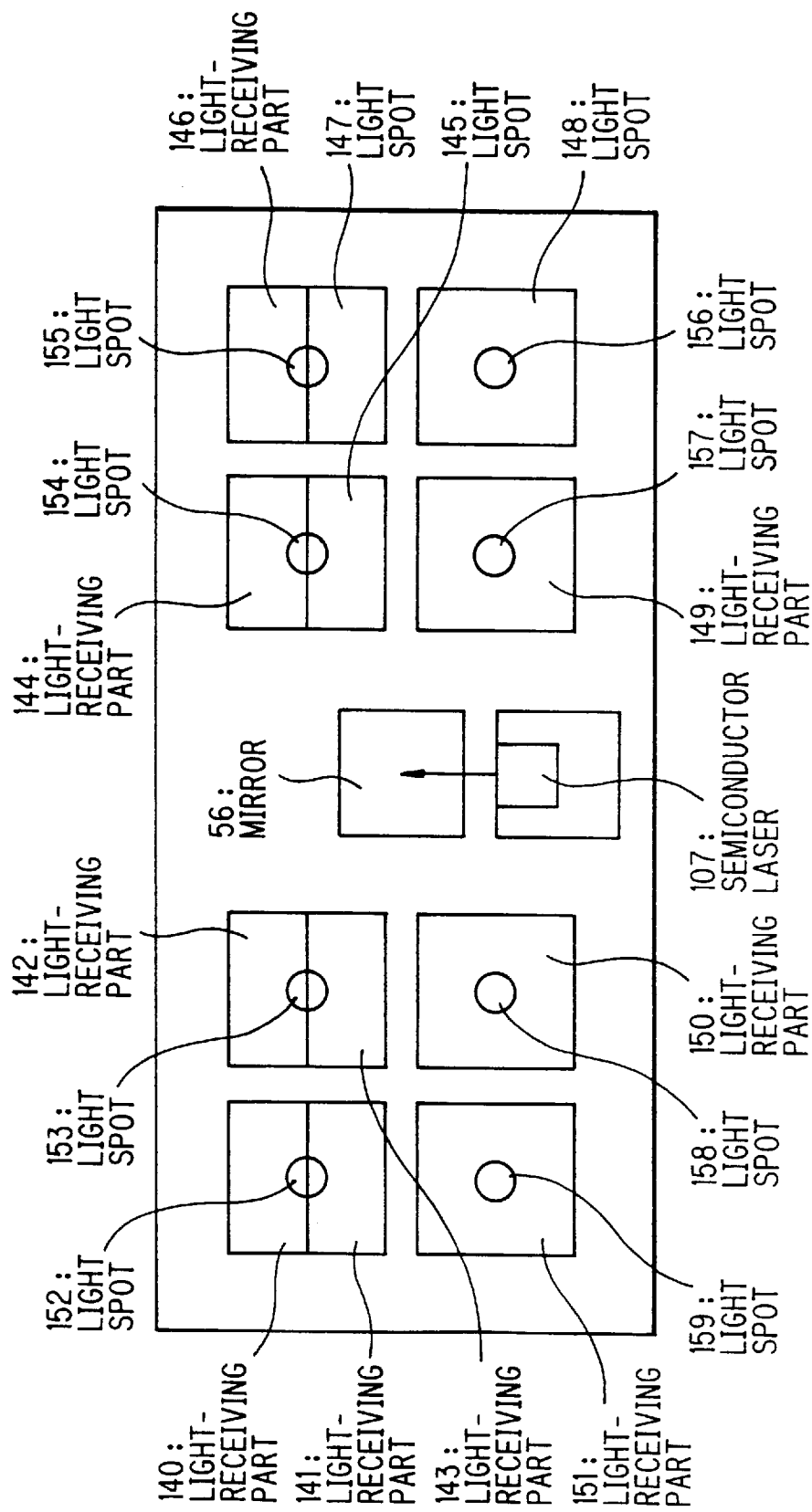
FIG. 29 shows a pattern of light-receiving parts of the optical detector in FIG. 25 and a location of light spots on the light-receiving parts in the case that the polarization hologram optical device in FIG. 28 is used.

FIG. 29 shows a pattern of light-receiving part of the optical detector 108 and locations of light spots on the light-receiving part in the case that the polarization hologram optical device 102 or 105 with the interference fringe pattern shown in FIGS. 28 is used. The semiconductor laser 107 is disposed on the optical detector 108 as shown in FIG. 20B.

The +1st-order diffraction light by the region 136 of the polarization hologram optical device 102 or 105 forms a light spot 152 on the dividing line of light-receiving parts 140, 141 which are divided into two parts, and the −1st-order diffraction light by the region 136 forms a light spot 156 on a light-receiving part 148.

The +1st-order diffraction light by the region 137 of the polarization hologram optical device 102 or 105 forms a light spot 153 on the dividing line of light-receiving parts 142, 143 which are divided into two parts, and the −1st-order diffraction light by the region 137 forms a light spot 157 on a light-receiving part 149. The +1st-order diffraction light by the region 138 of the polarization hologram optical device 102 or 105 forms a light spot 154 on the dividing line of light-receiving parts 144, 145 and the −1st-order diffraction light by the region 138 forms a light spot 158 on a light-receiving part 150.

Also, the +1st-order diffraction light by the region 139 of the polarization hologram optical device 102, 105 forms a light spot 155 on the dividing line of light-receiving parts 146, 147 and the −1st-order diffraction light by the region 139 forms a light spot 159 on a light-receiving part 151.

If the levels of electrical signals obtained by the photoelectric conversion of the light-receiving parts 140 to 151 are represented by V140 to V151, respectively, a focus error signal is obtained by the operation of {(V140+V142+V145+V147)−(V141+V143+V144+V146)} by the known Foucault method, and a track error signal is obtained by the operation of {(V148+V150)−(V149+V151)} by the known push-pull method. Also, a reproduction signal of the disk is obtained by the operation of (V148+V149+V150+V151). The track error signal is also obtained by the sample-holding of {(V148+V151)−(V149+V150)} at a falling point and a rising point of the reproduction signal of the disk on the known heterodyne method.

Though, in the first to fourth embodiments as shown in FIGS. 5, 7, 23 and 24, the two modules which include the semiconductor laser and optical detector are used to miniaturize the size, two pairs of blocks, in each pair of blocks a semiconductor laser and an optical detector being separately included, may be used.

An optical head device in the fifth preferred embodiment will be explained in FIG. 30. A module 100 includes a semiconductor laser and an optical detector which receives light reflected on a disk. A semiconductor laser 160 emits light with 635 nm wavelength, and the semiconductor laser of the module 100 emits light with 785 nm wavelength.

Light emitted from the semiconductor laser 160 is transmitted through an optical coupling and dividing/optical path control device 161, a collimator lens 4, a polarization hologram optical device 102, a ¼ wavelength plate 103 and an aperture control device 5, entering an objective lens 6 as a collimated light, then being focused on a disk 7 such as a digital video disk with a substrate thickness of 0.6 mm. Light reflected on the disk 7 is reversely transmitted through the objective lens 6, aperture control device 5 and ¼ wavelength plate 103, being diffracted as a ± diffraction light by the polarization hologram optical device 102, then being reversely transmitted through the collimator lens 4, being reflected by the optical coupling and dividing/optical path control device 161, being received by the optical detector of the module 100.

On the other hand, light emitted from the semiconductor laser of the module 100 is reflected by the optical coupling and dividing/optical path control device 161, then being transmitted through the collimator lens 4, polarization hologram optical device 102, ¼ wavelength plate 103 and aperture control device 5, entering the objective lens 6 as a divergent light, then being focused on a disk 8 such as a compact disk with a substrate thickness of 1.2 mm. Light reflected on the disk 8 is reversely transmitted through the objective lens 6, aperture control device 5 and ¼ wavelength plate 103, being diffracted as a ± diffraction light by the polarization hologram optical device 102, then being reversely transmitted through the collimator lens 4 and optical coupling and dividing/optical path control device 161, being received by the optical detector of the module 100. The polarization hologram optical device 102, ¼ wavelength plate 103 and aperture control device 5 can be integrally driven with the objective lens 6 in the directions of focusing and tracking by an actuator(not shown).

The aperture control device 5 has the same composition as shown in FIGS. 16A, 16B or FIGS. 17A, 17B. The polarization hologram optical device 102 and ¼ wavelength plate 103 function as those in the third embodiment as shown in FIG. 23.

Figure 30:
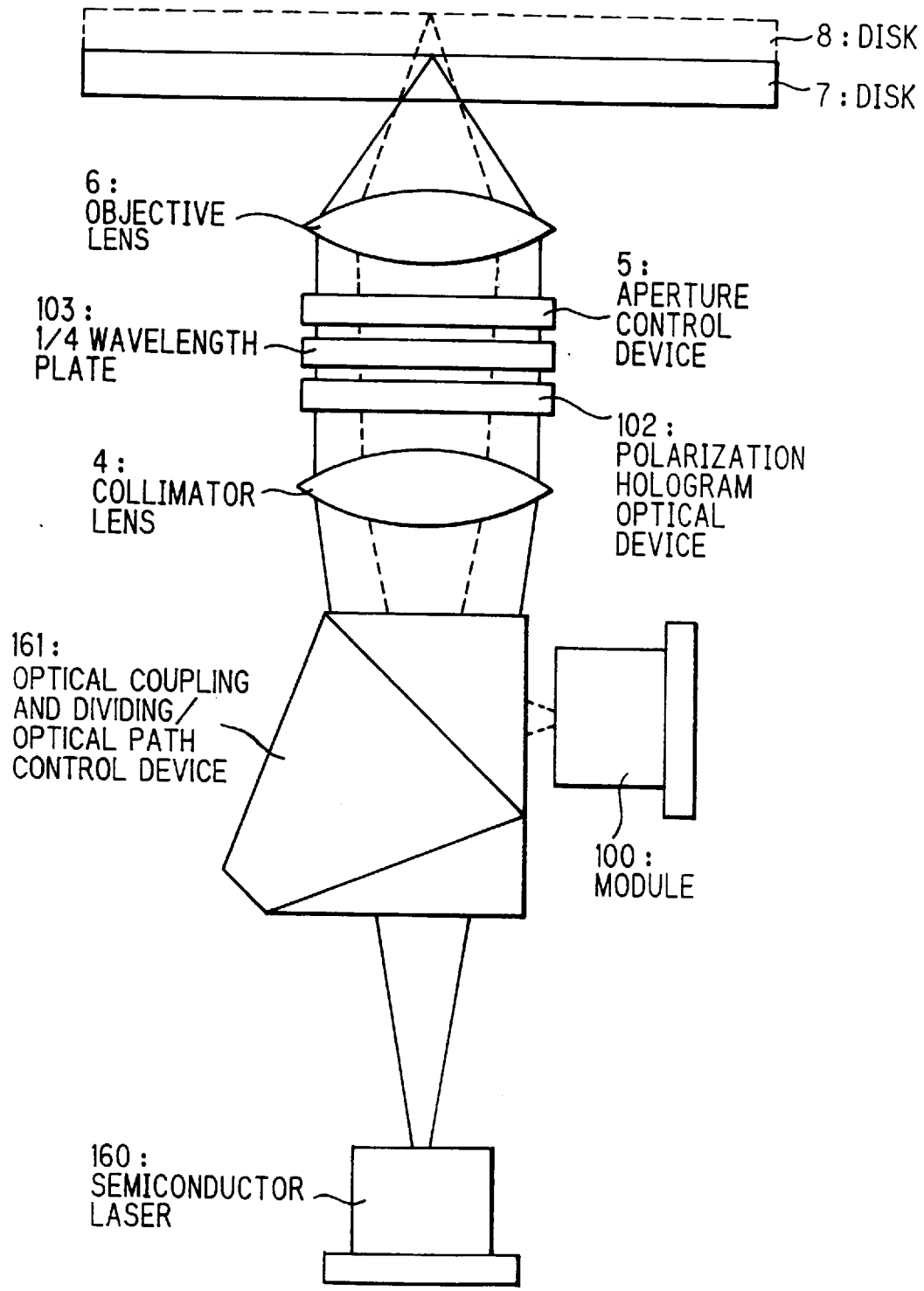
FIG. 30 shows a composition of an optical head device in a fifth preferred embodiment according to the invention.
Figure 31A:
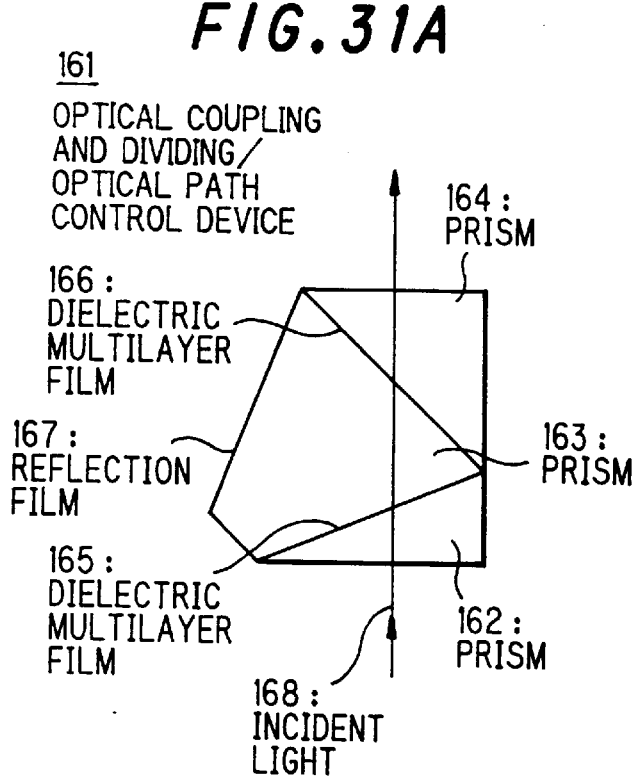
FIGS. 31A to 31C show a composition of an optical coupling and dividing/optical path control device used in the fifth embodiment.
Figure 31B:
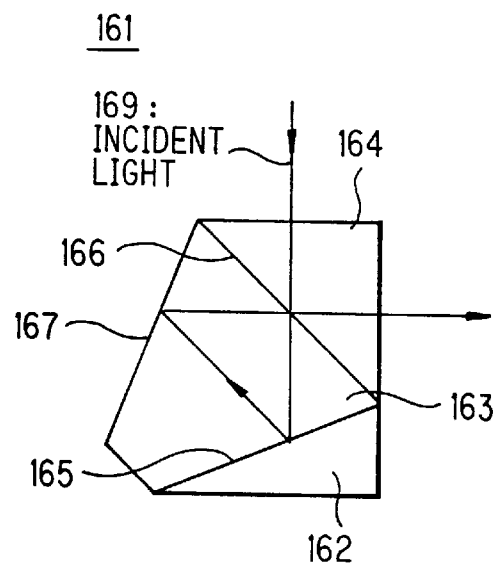
Figure 31C:
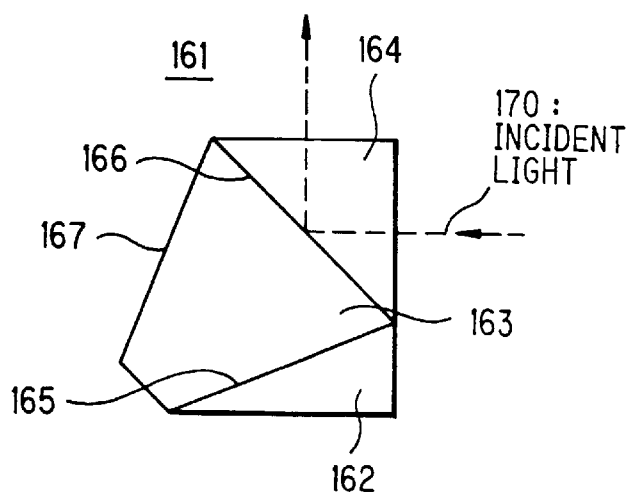

FIGS. 31A to 31C show a composition of the optical coupling and dividing/optical path control device 161 used in the fifth embodiment as shown in FIG. 30. As shown in FIGS. 31A to 31C, the optical coupling and dividing/optical path control device 161 is composed of prisms 162, 163 and 164, which are adhered through dielectric multilayer films 165, 166. The dielectric multilayer film 165 has a function that, of an incident light with 635 nm wavelength, a P-polarization component is all transmitted through and a S-polarization component is all reflected. The dielectric multilayer film 166 has a function that a light with 635 nm wavelength is all transmitted through and a light with 785 nm wavelength is all reflected.

An incident light 168 with 635 nm wavelength, which is emitted from the semiconductor laser 160 and then enters the prism 162 of the optical coupling and dividing/optical path control device 161, as shown in FIG. 31A, is projected as a P-polarized light onto the dielectric multilayer film 165 and all transmitted through it, further being all transmitted through the dielectric multilayer film 166, then being emitted from the prism 164 of the optical coupling and dividing/optical path control device 161. Also, an incident light 169 with 635 nm wavelength, which is reflected by the disk 7 and then enters the prism 164 of the optical coupling and dividing/optical path control device 161, as shown in FIG. 31B, is all transmitted through the dielectric multilayer film 166 and projected as a S-polarized light onto the dielectric multilayer film 165 and is all reflected on it, being all reflected by a reflection film 167, again being transmitted through the dielectric multilayer film 166, then being emitted from the prism 164 of the optical coupling and dividing/optical path control device 161.

On the other hand, an incident light 170 with 785 nm wavelength, which is emitted from the semiconductor laser of the module 100 and then enters the prism 164 of the optical coupling and dividing/optical oath control device 161, as shown in FIG. 31C, is all reflected by the dielectric multilayer film 166, then being emitted from the prism 164. An incident light with 785 nm wavelength, which is reflected by the disk 8 and then enters the prism 164 of the optical coupling and dividing/optical path control device 161, reversely passes through the same path as the incident light 170, being emitted from the prism 164.

An optical head device in the sixth preferred embodiment will be explained in FIG. 32. In the sixth embodiment, the optical coupling and dividing/optical path control device 161 used in the fifth embodiment as shown in FIG. 30 is replaced by an optical coupling and dividing/optical path control device 171.

Figure 33A:
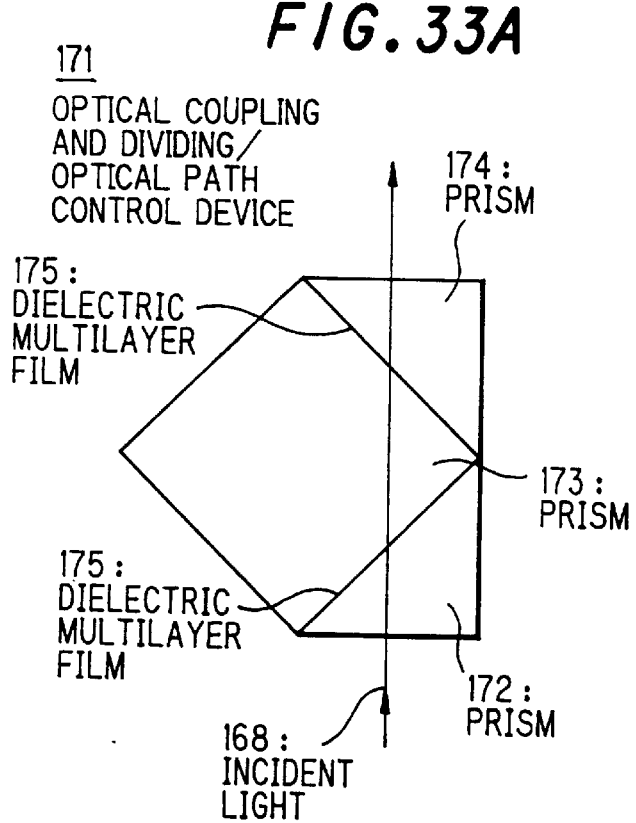
FIGS. 33A to 33C show a composition of an optical coupling and dividing/optical path control device used in the sixth embodiment.
Figure 33B:
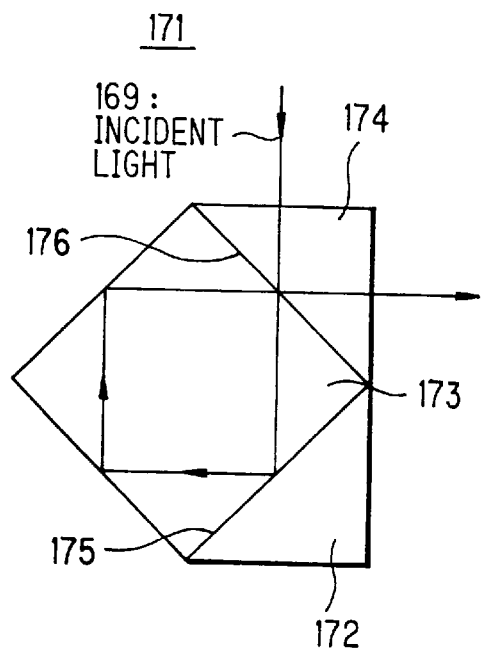
Figure 33C:
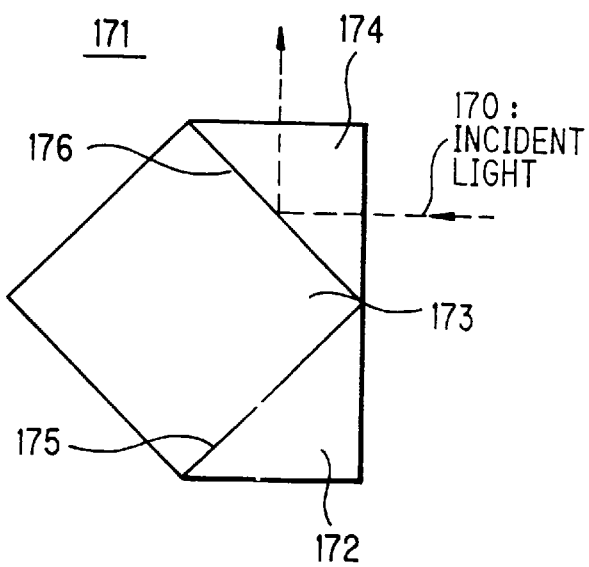

FIGS. 33A to 33C show a composition of the optical coupling and dividing/optical path control device 171. As shown in FIGS. 33A to 33C, the optical coupling and dividing/optical path control device 171 is composed of prisms 172, 173 and 174, which are adhered through dielectric multilayer films 175, 176. The dielectric multilayer film 175 has a function that, of an incident light with 635 nm wavelength, a P-polarization component is all transmitted through and a S-polarization component is all reflected. The dielectric multilayer film 176 has a function that a light with 635 nm wavelength is all transmitted through and a light with 785 nm wavelength is all reflected.

An incident light 168 with 635 nm wavelength, which is emitted from the semiconductor laser 160 and then enters the prism 172 of the optical coupling and dividing/optical path control device 171, as shown in FIG. 33A, is projected as a P-polarized light onto the dielectric multilayer film 175 and all transmitted through it, further being all transmitted through the dielectric multilayer film 176, then being emitted from the prism 174 of the optical coupling and dividing/optical path control device 171. Also, an incident light 169 with 635 nm wavelength, which is reflected by the disk 7 and then enters the prism 174 of the optical coupling and dividing/optical path control device 171, as shown in FIG. 33B, is all transmitted through the dielectric multilayer film 176 and projected as a S-polarized light onto the dielectric multilayer film 175 and is all reflected on it, being totally reflected two times on boundary surfaces of the prism 173 and the air, again being all transmitted through the dielectric multilayer film 176, then being emitted from the prism 174 of the optical coupling and dividing/optical path control device 171.

On the other hand, an incident light 170 with 785 nm wavelength, which is emitted from the semiconductor laser of the module 100 and then enters the prism 174 of the optical coupling and dividing/optical path control device 171, as shown in FIG. 33C, is all reflected by the dielectric multilayer film 176, then being emitted from the prism 174. An incident light with 785 nm wavelength, which is reflected by the disk 8 and then enters the prism 174 of the optical coupling and dividing/optical path control device 171, reversely passes through the same path as the incident light 170, being emitted from the prism 174.

Figure 32:
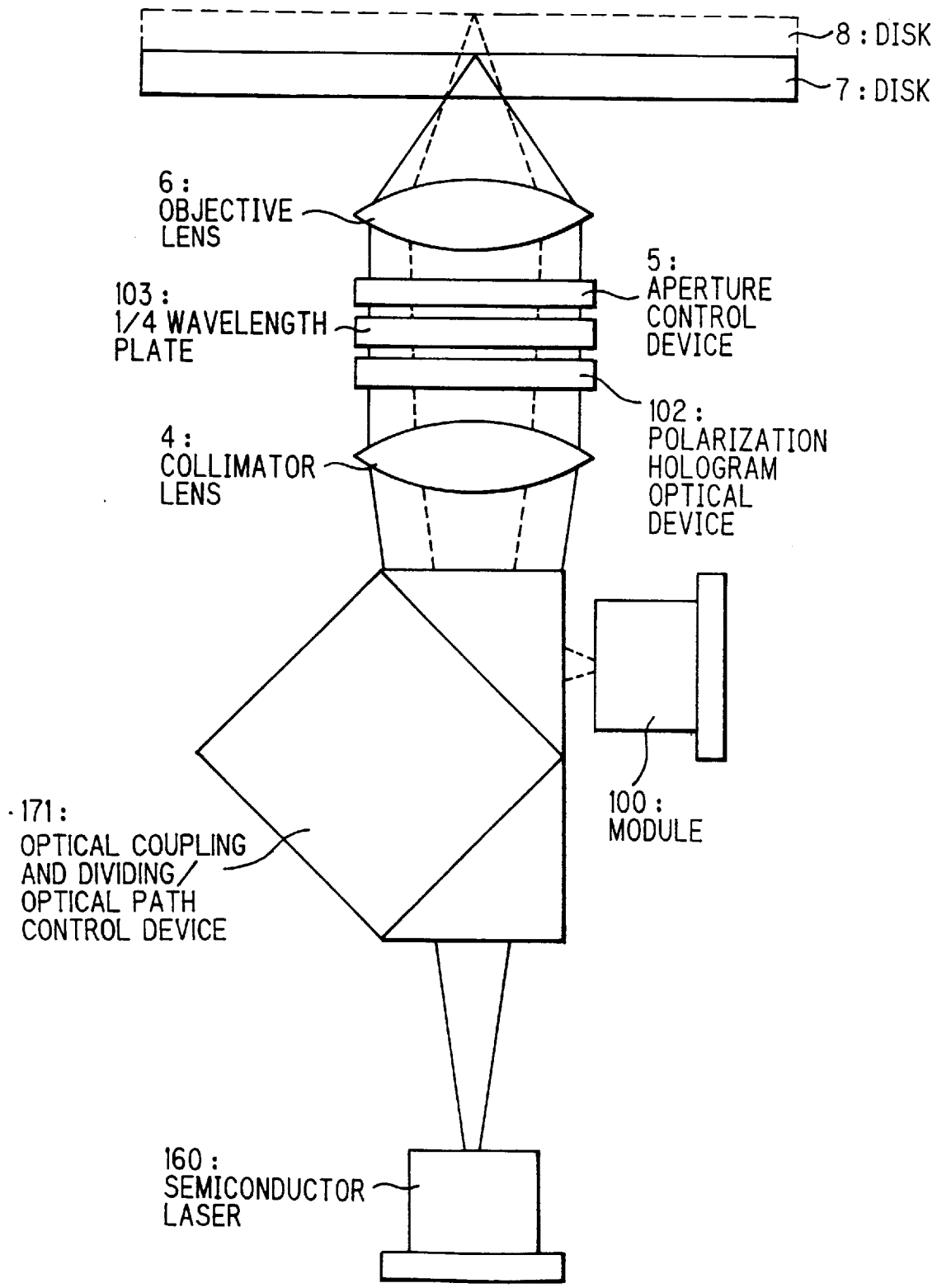
FIG. 32 shows a composition of an optical head device in a sixth preferred embodiment according to the invention.

In the fifth and sixth embodiments as shown in FIGS. 30 and 32, the distance from the module 100 to the optical coupling and dividing/optical path control device 161 or 171 is shorter than the distance from the semiconductor laser 160 to the optical coupling and dividing/optical path control device 161 or 171. Here, by using the optical coupling and dividing/optical path control device 161 as shown in FIGS. 31A to 31C or the optical coupling and dividing/optical path control device 171 as shown in FIGS. 33A to 33C, the effective optical path length from the semiconductor laser 160 to the collimator lens 4 as to the light with 635 nm wavelength can be equal to the effective optical path length from the module 100 to the collimator lens 4 as to the light with 635 nm wavelength, and the effective optical path length from the module 100 to the collimator lens 4 as to the light with 785 nm wavelength can be shorter than these effective optical path lengths.

An optical head device in the seventh preferred embodiment will be explained in FIG. 34. A module 99 includes a semiconductor laser and an optical detector which receives light reflected on a disk. The semiconductor laser of the module 99 emits light with 635 nm wavelength, and a semiconductor laser 177 emits light with 785 nm wavelength.

Light emitted from the semiconductor laser of the module 99 is reflected by an optical coupling and dividing/optical path control device 178, being transmitted through a collimator lens 4, a polarization hologram optical device 105, a ¼ wavelength plate 106 and an aperture control device 5, entering an objective lens 15 as a convergent light, then being focused on a disk 7 such as a digital video disk with a substrate thickness of 0.6 mm. Light reflected on the disk 7 is reversely transmitted through the objective lens 15, aperture control device 5 and ¼ wavelength plate 106, being diffracted as a ± diffraction light by the polarization hologram optical device 105, then being reversely transmitted through the collimator lens 4 and the optical coupling and dividing/optical path control device 178, being received by the optical detector of the module 99.

On the other hand, light emitted from the semiconductor laser 177 is transmitted through the optical coupling and dividing/optical path control device 178, collimator lens 4, polarization hologram optical device 105, ¼ wavelength plate 106 and aperture control device 5, entering the objective lens 15 as a collimated light, then being focused on a disk 8 such as a compact disk with a substrate thickness of 1.2 mm. Light reflected on the disk 8 is reversely transmitted through the objective lens 15, aperture control device 5 and ¼ wavelength plate 106, being diffracted as a ± diffraction light by the polarization hologram optical device 105, then being reversely transmitted through the collimator lens 4, being reflected by the optical coupling and dividing/optical path control device 178, being received by the optical detector of the module 99. The polarization hologram optical device 105, ¼ wavelength plate 106 and aperture control device 5 can be integrally driven with the objective lens 15 in the directions of focusing and tracking by an actuator(not shown).

The aperture control device 5 has the same composition as shown in FIGS. 16A, 16B or FIGS. 17A, 17B. The polarization hologram optical device 105 and ¼ wavelength plate 106 function as those in the fourth embodiment as shown in FIG. 24.

Figure 34:
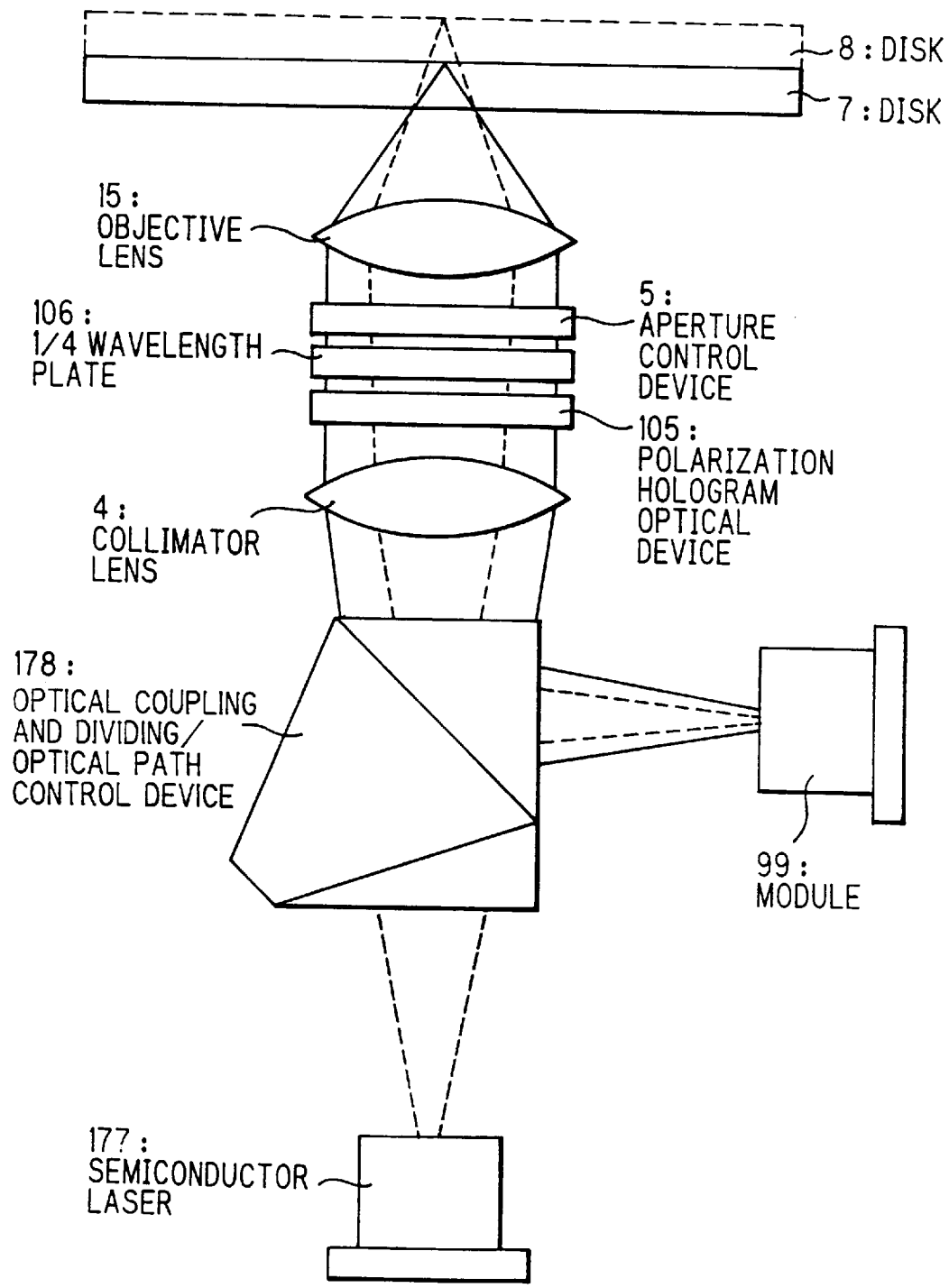
FIG. 34 shows a composition of an optical head device in a seventh preferred embodiment according to the invention.
Figure 35A:
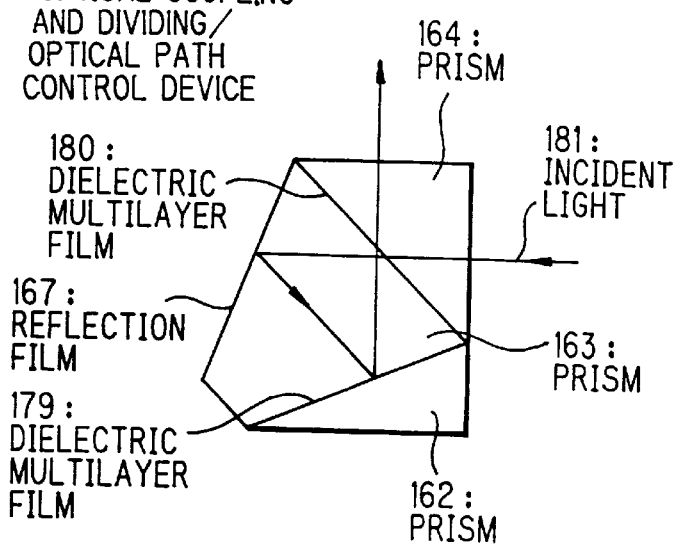
FIGS. 35A to 35C show a composition of an optical coupling and dividing/optical path control device used in the seventh embodiment.
Figure 35B:
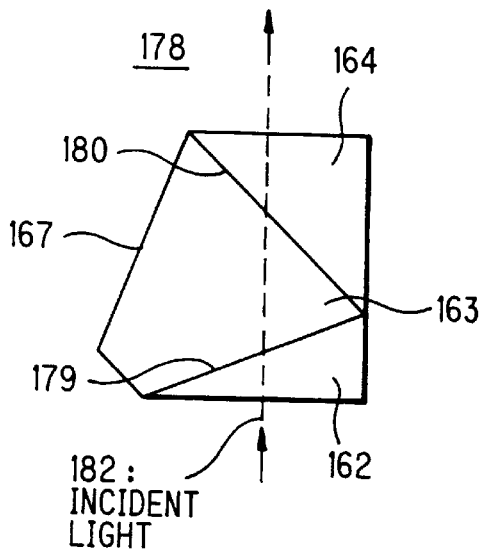
Figure 35C:
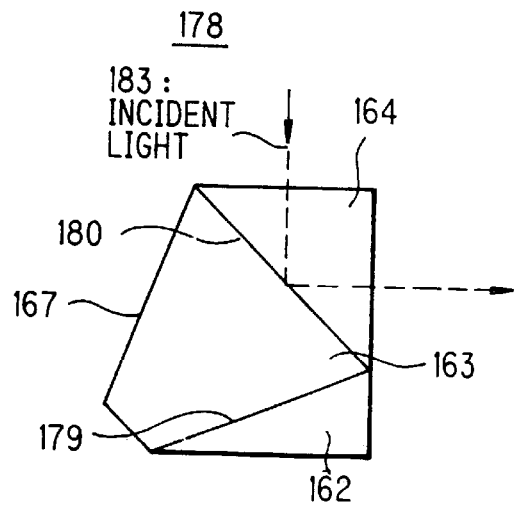

FIGS. 35A to 35C show a composition of the optical coupling and dividing/optical path control device 178 used in the seventh embodiment as shown in FIG. 34. As shown in FIGS. 35A to 35C, the optical coupling and dividing/optical path control device 178 is composed of prisms 162, 163 and 164, which are adhered through dielectric multilayer films 179, 180. The dielectric multilayer film 179 has a function that a light with 635 nm wavelength is all reflected and a light with 785 nm wavelength is all transmitted through. The dielectric multilayer film 180 has a function that a light with 635 nm wavelength is all transmitted through and, of an incident light with 785 nm wavelength, a P-polarization component is all transmitted through and a S-polarization component is all reflected.

An incident light 181 with 635 nm wavelength, which is emitted from the semiconductor laser of the module 99 and then enters the prism 164 of the optical coupling and dividing/optical path control device 178, as shown in FIG. 35A, is all transmitted through a dielectric multilayer film 180, being all reflected by a reflection film of the prism 163 and the dielectric multilayer film 179, again being transmitted through the dielectric multilayer film 180, then being emitted from the prism 164. An incident light with 635 nm wavelength, which is reflected by the disk 7 and then enters the prism 164 of the optical coupling and dividing/optical path control device 178, reversely passes through the same path as the incident light 181, being emitted from the prism 164 of the optical coupling and dividing/optical path control device 178.

On the other hand, an incident light 182 with 785 nm wavelength, which is emitted from the semiconductor laser 177 and then enters the prism 162 of the optical coupling and dividing/optical path control device 178, as shown in FIG. 33B, is all transmitted through the dielectric multilayer film 179, further being projected as a P-polarized light onto the dielectric multilayer film 180 and all transmitted through it, then being emitted from the prism 164. Also, an incident light 183 with 785 nm wavelength, which is reflected by the disk 8 and then enters the prism 164 of the optical coupling and dividing/optical path control device 178, as shown in FIG. 33C, is projected as a S-polarized light onto the dielectric multilayer film 180 and is all reflected on it, then being emitted from the prism 164.

An optical head device in the eighth preferred embodiment will be explained in FIG. 36. In the eighth embodiment, the optical coupling and dividing/optical path control device 178 used in the seventh embodiment as shown in FIG. 34 is replaced by an optical coupling and dividing/optical path control device 184.

Figure 37A:
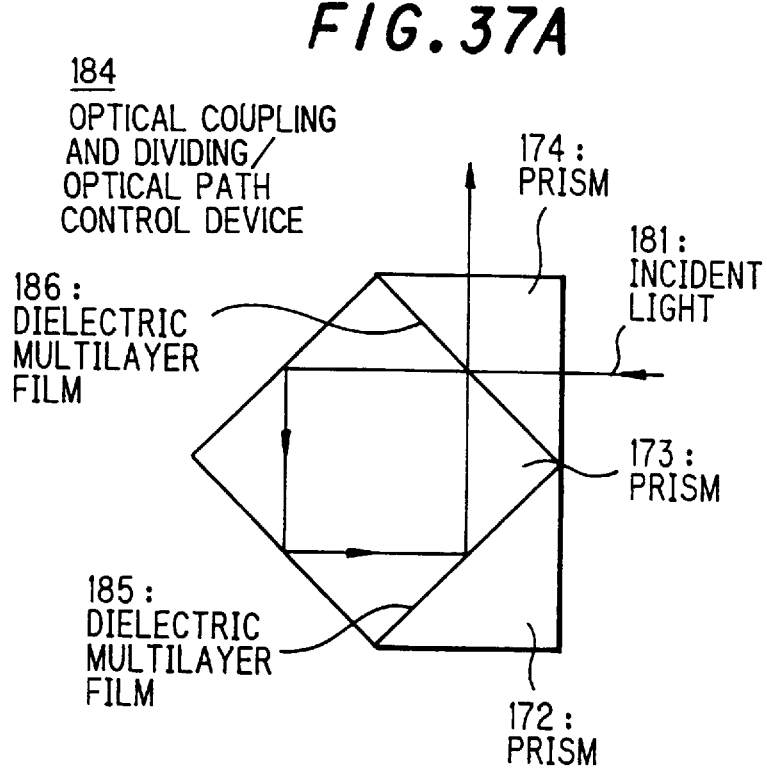
FIGS. 37A to 37C show a composition of an optical coupling and dividing/optical path control device used in the eighth embodiment.
Figure 37B:
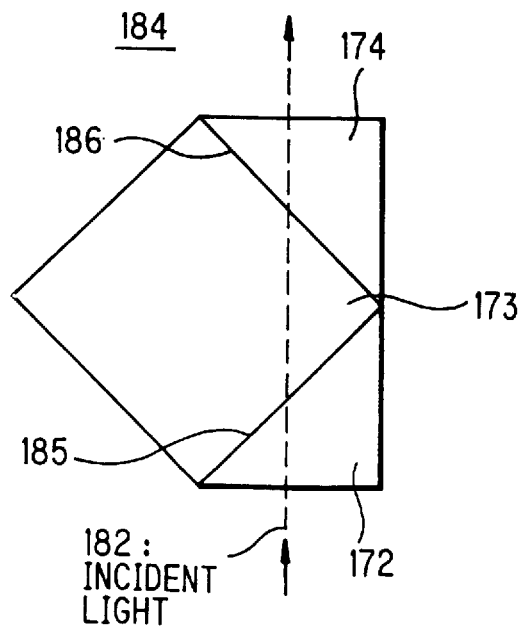
Figure 37C:
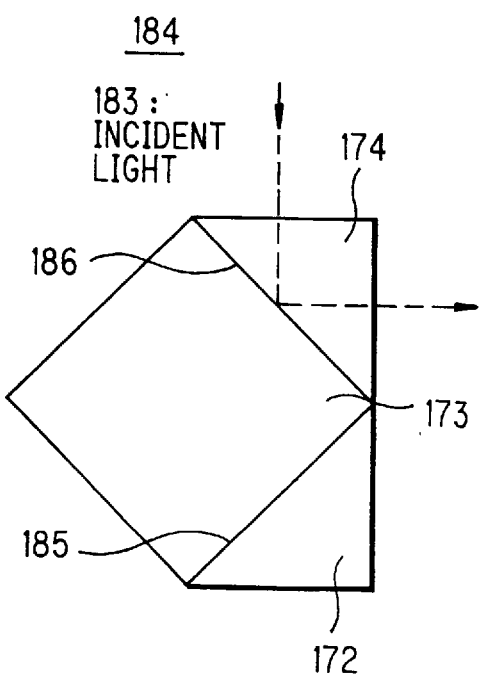

FIGS. 37A to 37C show a composition of the optical coupling and dividing/optical path control device 184. As shown in FIGS. 37A to 37C, the optical coupling and dividing/optical path control device 184 is composed of prisms 172, 173 and 174, which are adhered through dielectric multilayer films 185, 186. The dielectric multilayer film 185 has a function that a light with 635 nm wavelength is all reflected and a light with 785 nm wavelength is all transmitted. The dielectric multilayer film 186 has a function that a light with 635 nm wavelength is all transmitted through and, of an incident light with 785 nm wavelength, a P-polarization component is all transmitted through and a S-polarization component is all reflected on.

An incident light 181 with 635 nm wavelength, which is emitted from the semiconductor laser of the module 99 and then enters the prism 174 of the optical coupling and dividing/optical path control device 184, as shown in FIG. 37A, is all transmitted through the dielectric multilayer film 186, being totally reflected two times on boundary surfaces of the prism 173 and the air, then being reflected by the dielectric multilayer film 185, again being all transmitted through the 186, being emitted from the optical coupling and dividing/optical path control device 184. Also, the light with 635 nm wavelength, which is reflected by the disk 7 and then enters the prism 174 of the optical coupling and dividing/optical path control device 184, reversely passes through the same path as the incident light 181, being emitted from the prism 174 of the optical coupling and dividing/optical path control device 184.

On the other hand, an incident light 182 with 785 nm wavelength, which is emitted from the semiconductor laser 177 and then enters the prism 172 of the optical coupling and dividing/optical path control device 184, as shown in FIG. 33B, is all transmitted through the dielectric multilayer films 185 and the prism 173, being projected as a P-polarized light onto the dielectric multilayer film 186 and all transmitted through it, then being emitted from the prism 174 of the optical coupling and dividing/optical path control device 184. Also, an incident light with 785 nm wavelength, which is reflected by the disk 8 and then enters the prism 174 of the optical coupling and dividing/optical path control device 184, as shown in FIG. 37C, is projected as a S-polarized light onto the dielectric multilayer film 186 and is all reflected on it, then being emitted from the prism 174.

Figure 36:
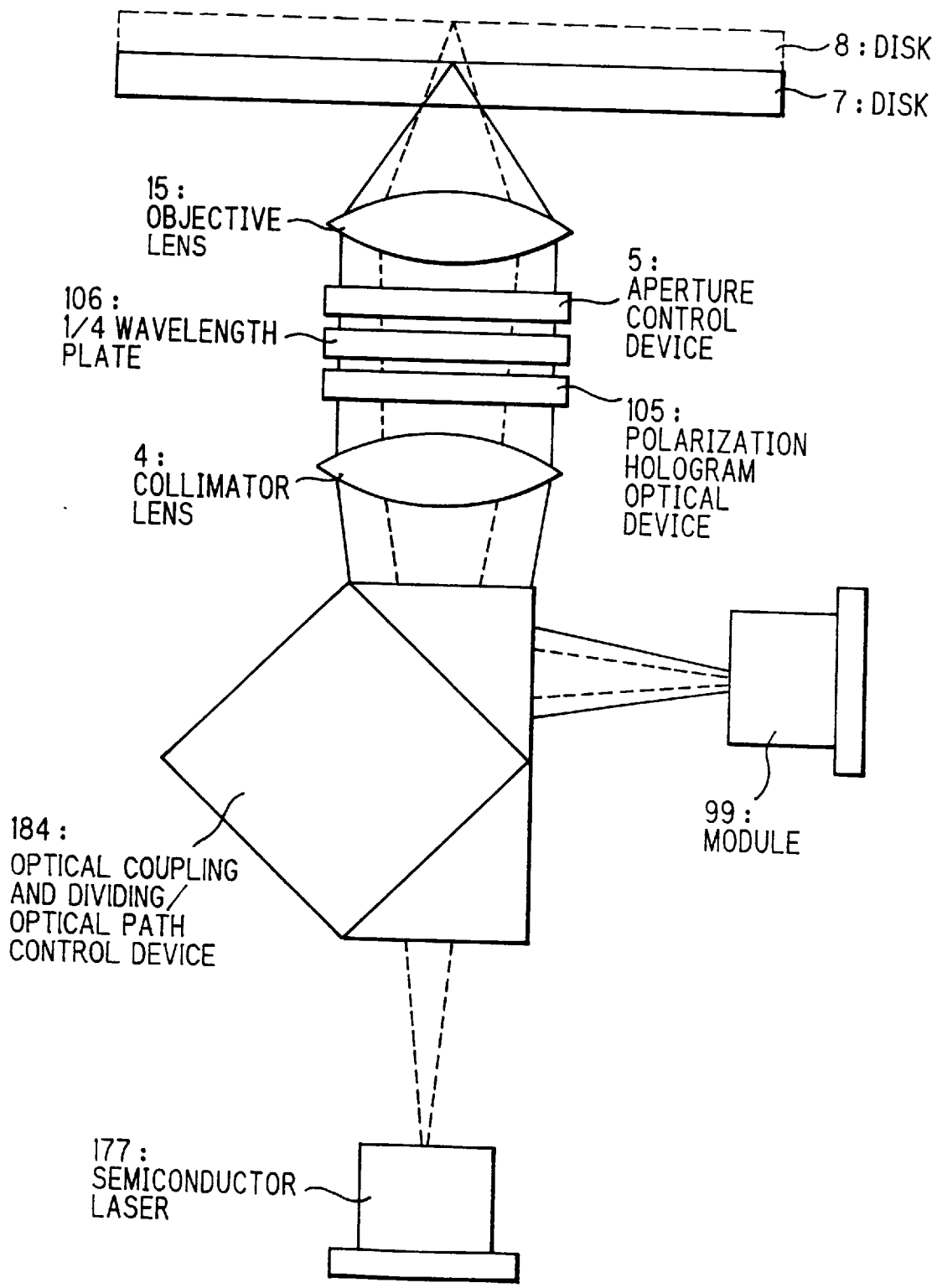
FIG. 36 shows a composition of an optical head device in an eighth preferred embodiment according to the invention.

In the seventh and eighth embodiments as shown in FIGS. 34 and 36, the distance from the semiconductor laser 177 to the optical coupling and dividing/optical path control device 178 or 184 is equal to the distance from the module 99 to the optical coupling and dividing/optical path control device 178 or 184. Here, by using the optical coupling and dividing/optical path control device 178 as shown in FIGS. 35A to 35C or the optical coupling and dividing/optical path control device 184 as shown in FIGS. 37A to 37C, the effective optical path length from the semiconductor laser 177 to the collimator lens 4 as to the light with 785 nm wavelength can be equal to the effective optical path length from the module 99 to the collimator lens 4 as to the light with 785 nm wavelength, and the effective optical path length from the module 99 to the collimator lens 4 as to the light with 635 nm wavelength can be longer than these effective optical path lengths.

Figure 38A:
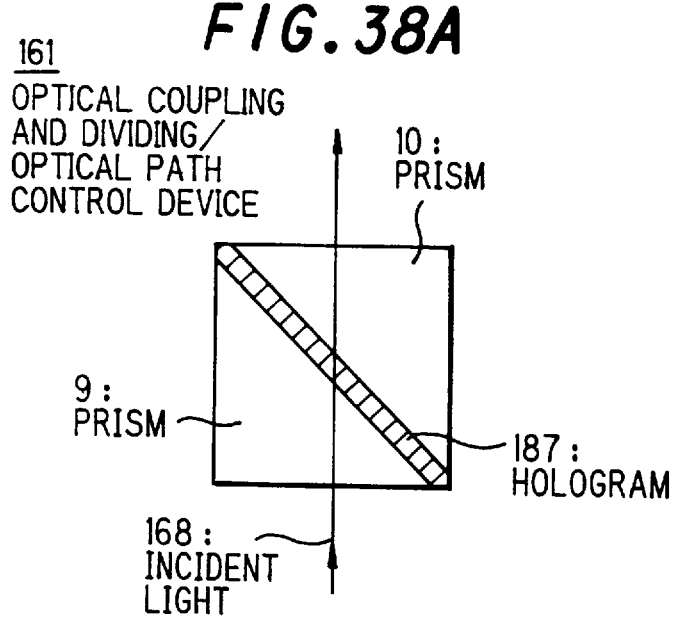
FIGS. 38A to 38C show another composition of the optical coupling and dividing/optical path control device used in the fifth embodiment.
Figure 38B:
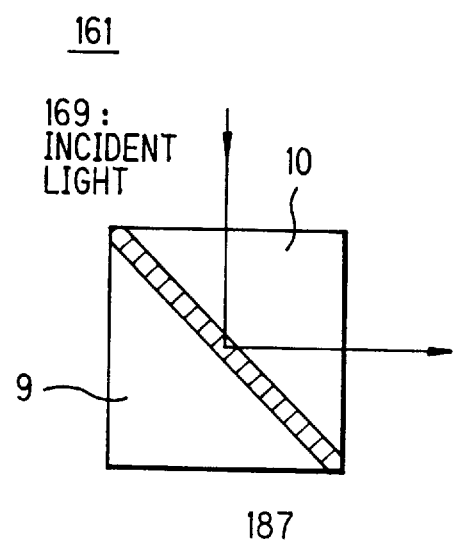
Figure 38C:
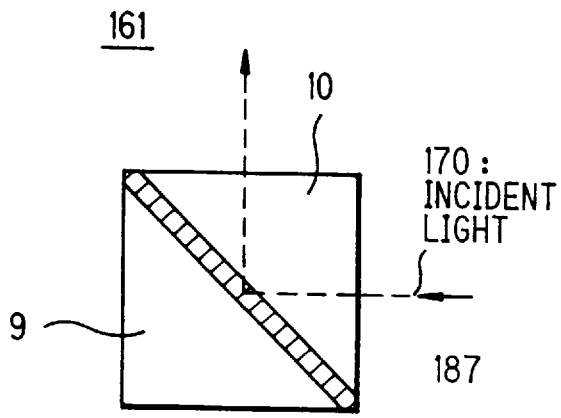

FIGS. 38A to 38C show another composition of optical coupling and dividing/optical path control device 161 used in the fifth embodiment as shown in FIG. 30. As shown in FIGS. 38A to 38C, the optical coupling and dividing/optical path control device 161 is composed of prisms 9, 10 which are adhered through a hologram 187.

An incident light 168 with 635 nm wavelength, which is emitted from the semiconductor laser 160 and then enters the prism 9 of the optical coupling and dividing/optical path control device 161, as shown in FIG. 38A, is projected as a P-polarization light onto the hologram 187 and all transmitted through it, being emitted from the optical coupling and dividing/optical path control device 161. Also, an incident light 169 with 635 nm wavelength, which is reflected by the disk 7 and then enters the prism 10 of the optical coupling and dividing/optical path control device 161, as shown in FIG. 38B, is projected as a S-polarization light onto the hologram 187, thereby being reflected and diffracted as a +1st-order diffraction light, being emitted from the optical coupling and dividing/optical path control device 161.

On the other hand, an incident light 170 with 785 nm wavelength, which is emitted from the semiconductor laser of the module 100 and then enters the prism 10 of the optical coupling and dividing/optical path control device 161, as shown in FIG. 38C, is all reflected by the hologram 187, being emitted from the prism 10. The light with 785 nm wavelength, which is reflected by the disk 8 and then enters the prism 10 of the optical coupling and dividing/optical path control device 161, reversely passing through the same path as the incident light 170, being emitted from the prism 10.

Figure 39A:
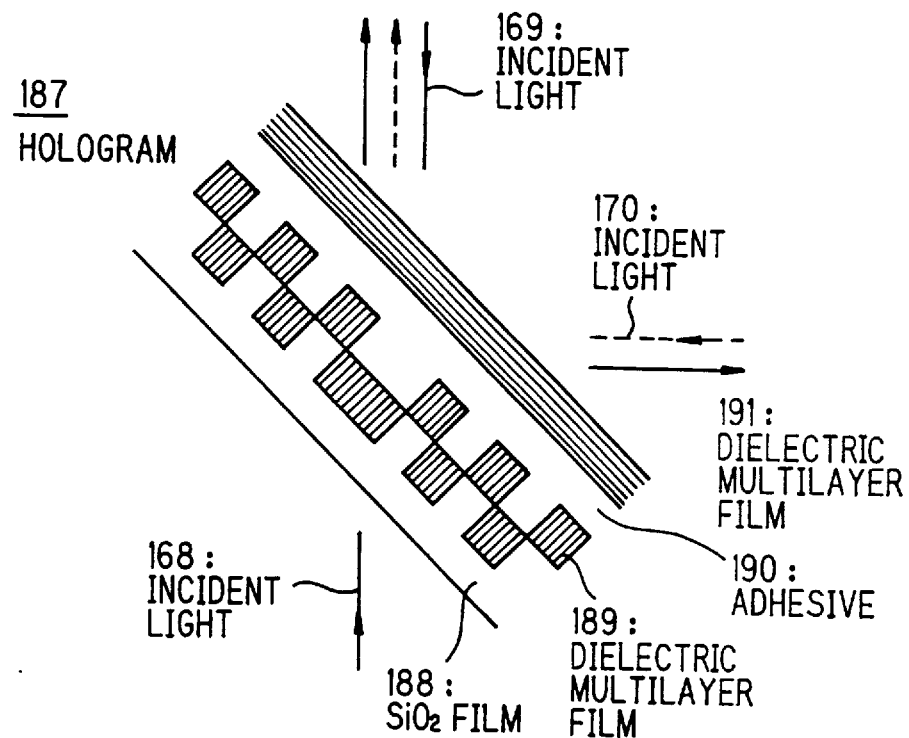
FIGS. 39A and 39B show compositions of a hologram of the optical coupling and dividing/optical path control device in FIGS. 38A to 38C, FIGS. 40A to 40C show another composition of the optical coupling and dividing/optical path control device used in the seventh embodiment.
Figure 39B:
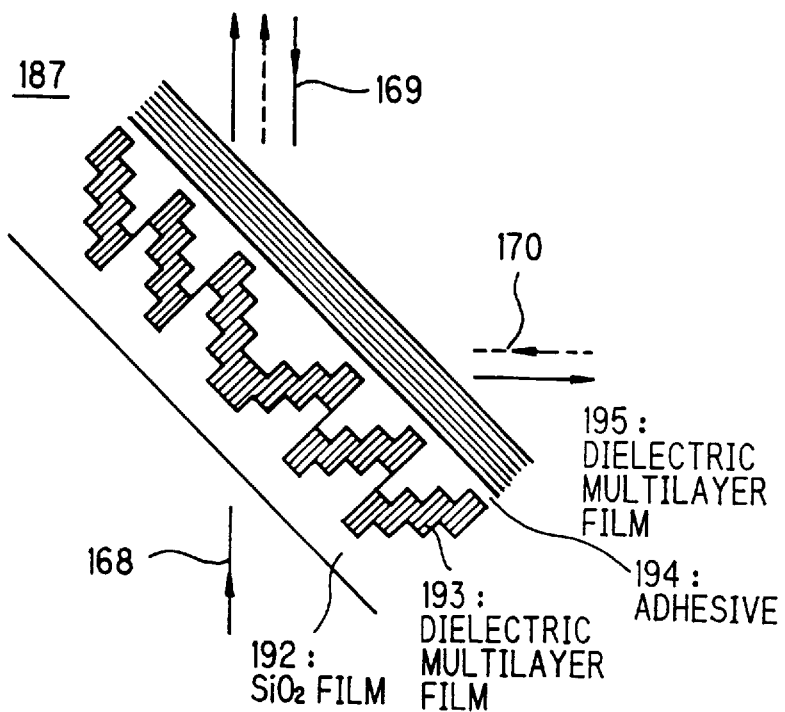

FIGS. 39A and 39B show compositions of the hologram 187 shown in FIGS. 38A to 38C. The hologram 187 is, as shown in FIG. 39A, composed of a SiO2 film 188 as a hologram layer, a dielectric multilayer film 189 which are formed on the oblique plane of the prism 9, a dielectric multilayer film 191 which is formed on the oblique plane of the prism 10, and an adhesive 190 filled therebetween. On the other hand, as shown in FIG. 39B, the hologram 187 may be composed of a SiO2 film 192 as a hologram layer, a dielectric multilayer film 193 which are formed on the oblique plane of the prism 9, a dielectric multilayer film 195 which is formed on the oblique plane of the prism 10, and an adhesive 194 filled therebetween.

The dielectric multilayer films 189 and 193 have a function that, of a light with 635 nm wavelength, a P-polarization component is all transmitted through and a S-polarization component is all reflected. On the other hand, the dielectric multilayer films 191 and 195 have a function that a light with 635 nm wavelength is all transmitted through and a light with 785 nm wavelength is all reflected. The adhesives 190, 194 and the SiO2 films 188, 192 have like refractive indexes. By the combination of the SiO2 film 188 or 192, the dielectric multilayer film 189 or 193 and the adhesive 190 or 194, of a light with 635 nm wavelength, a P-polarization component is all transmitted through and a S-polarization component is all reflected and diffracted. The hologram 187 functions an concave surface mirror to a +1st-order diffraction light.

In these compositions, an incident light 168 with 635 nm wavelength, which is emitted from the semiconductor laser 160 and then enters the hologram 187, as shown in FIGS. 39A and 39B, is projected as a P-polarization light onto the SiO2 film 188 or 192, dielectric multilayer film 189 or 193 and adhesive 190 or 194 and all transmitted through them, then being transmitted through the dielectric multilayer film 191 or 195, being emitted from the hologram 187. An incident light 169, which is reflected on the disk 7 and then enters the hologram 187, is all transmitted through the dielectric multilayer film 191 or 195 and is then projected as a S-polarization light onto the adhesive 190 or 194 and dielectric multilayer film 189 or 193, being reflected and diffracted as a +1st-order diffraction light, again being all transmitted through the dielectric multilayer film 191 or 195, being emitted from the hologram 187.

On the other hand, an incident light 170 with 785 nm wavelength, which is emitted from the semiconductor laser of the module 100 and then enters the hologram 187, is all reflected on the dielectric multilayer film 191 or 195, then being emitted from the hologram 187. The light with 785 nm wavelength, which is reflected on the disk 8 and enters hologram 187, reversely passes through the same path as the incident light 170, being emitted from the hologram 187.

As shown in FIG. 39A, when the SiO2 film 188 has a rectangular section form, a diffraction efficiency to a +1st-order diffraction light is 40.5% at maximum. On the other hand, as shown in FIG. 39B, when the SiO2 film 192 has a step-like section form, a diffraction efficiency to a +1st-order diffraction light is increased, i.e., 81% at maximum in a four level step form and 95% at maximum in an eight level step form.

In the composition of the fifth embodiment as shown in FIG. 30, the distance from the module 100 to the optical coupling and dividing/optical path control device 161 is shorter than the distance from the semiconductor laser 160 to the optical coupling and dividing/optical path control device 161. Here, by using the optical coupling and dividing/optical path control device 161 as shown in FIGS. 38A to 38C, a focused point to the light with 635 nm wavelength reflected on the disk 7 becomes closer to the optical coupling and dividing/optical path control device 161 than that to the light with 785 nm wavelength reflected on the disk 8. Therefore, the effective optical path length from the semiconductor laser 160 to the collimator lens 4 as to the light with 635 nm wavelength can be equal to the effective optical path length from the module 100 to the collimator lens 4 as to the light with 635 nm wavelength, and the effective optical path length from the module 100 to the collimator lens 4 as to the light with 785 nm wavelength can be shorter than these effective optical path lengths.

Figure 40A:
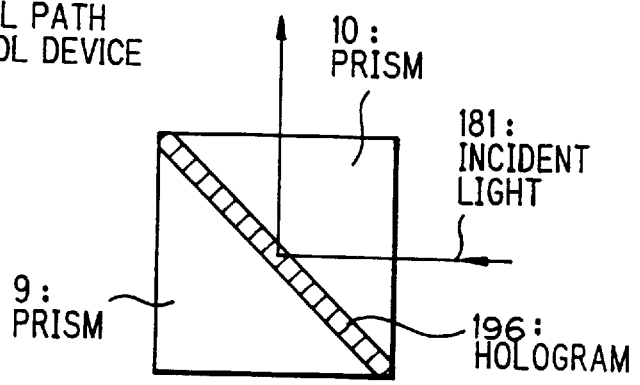
Figure 40B:
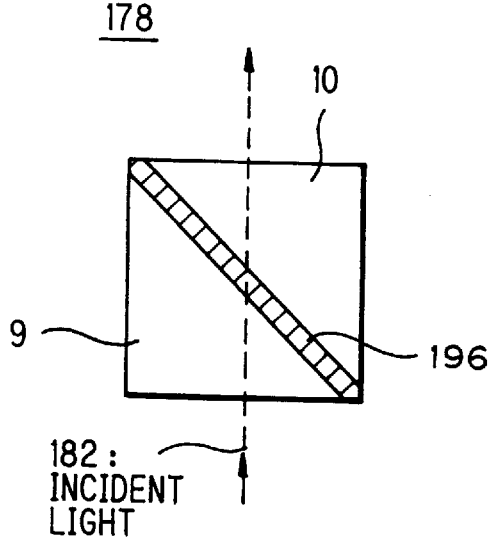
Figure 40C:
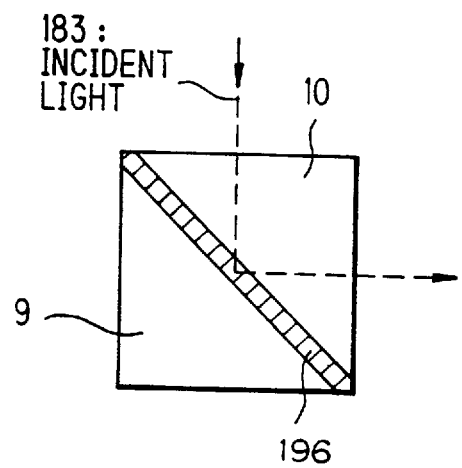

FIGS. 40A to 40C show another composition of the optical coupling and dividing/optical path control device 178 used in the seventh embodiment as shown in FIG. 34. This optical coupling and dividing/optical path control device 178 is, as shown in FIGS. 40A to 40C, composed of prisms 9, 10 which are adhered through a hologram 196.

An incident light 181 with 635 nm wavelength, which is emitted from the semiconductor laser of the module 99 and then enters the prism 10 of the optical coupling and dividing/optical path control device 178, as shown in FIG. 40A, is reflected and diffracted as a +1st-order diffraction light by the hologram 196, being emitted from the prism 10. The light with 635 nm wavelength, which is reflected on the disk 7 and enters the prism 10 of the optical coupling and dividing/optical path control device 178, reversely passes through the same path as the incident light, being emitted from the prism 10.

On the other hand, an incident light with 785 nm wavelength, which is emitted from the semiconductor laser 177 and then enters prism 9 of the optical coupling and dividing/optical path control device 178, as shown in FIG. 40B, is projected as a P-polarization light onto the hologram 196 and all transmitted through it, then being transmitted through the prism 10, being emitted from the hologram 187. An incident light 183, which is reflected on the disk 8 and then enters the prism 10 of the optical coupling and dividing/optical path control device 178, as shown in FIG. 40C, is projected as a S-polarization light onto the hologram 196 and is all reflected on it, being emitted from the prism 10.

Figure 41A:
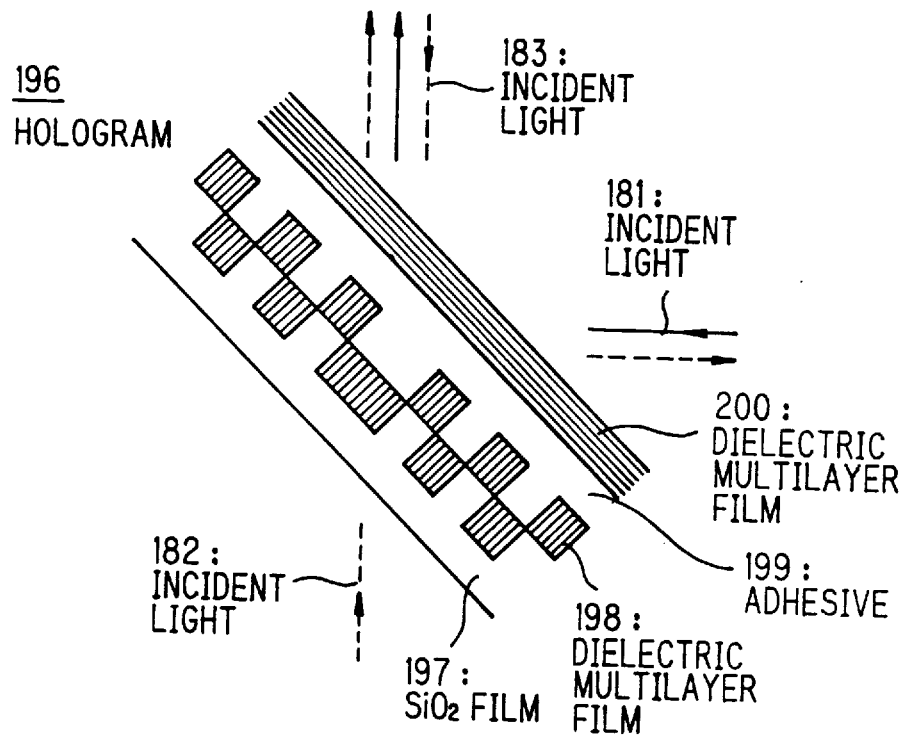
FIGS. 41A and 41B show compositions of a hologram of the optical coupling and dividing/optical path control device in FIGS. 40A to 40C.
Figure 41B:
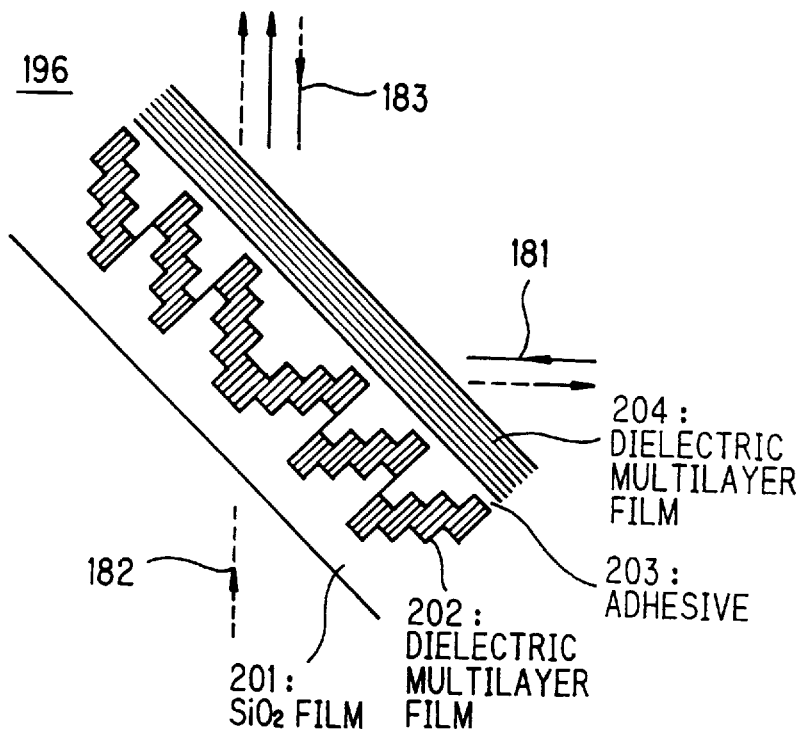

FIGS. 41A and 41B show compositions of the hologram 196 shown in FIGS. 40A to 40C. The hologram 196 is, as shown in FIG. 41A, composed of a SiO2 film 197 as a hologram layer, a dielectric multilayer film 198 which are formed on the oblique plane of the prism 9, a dielectric multilayer film 200 which is formed on the oblique plane of the prism 10, and an adhesive 199 filled therebetween. On the other hand, as shown in FIG. 41B, the hologram 196 may be composed of a SiO2 film 201 as a hologram layer, a dielectric multilayer film 202 which are formed on the oblique plane of the prism 9, a dielectric multilayer film 204 which is formed on the oblique plane of the prism 10, and an adhesive 203 filled therebetween.

The dielectric multilayer films 198 and 202 have a function that a light with 635 nm wavelength is all reflected on and a light with 785 nm wavelength is all transmitted through. On the other hand, the dielectric multilayer films 200 and 204 have a function that a light with 635 nm wavelength is all transmitted through and, of a light with 785 nm wavelength, a P-polarization component is all transmitted through and a S-polarization component is all reflected on. The adhesives 199, 203 and the SiO2 films 197, 201 have like refractive indexes. By the combination of the SiO2 film 197 or 201, the dielectric multilayer film 198 or 202 and the adhesive 199 or 203, a light with 635 nm wavelength is all reflected and diffracted on and a light with 785 nm wavelength is all transmitted through. The hologram 196 functions an concave surface mirror to a +1st-order diffraction light.

In these compositions, an incident light 181 with 635 nm wavelength, which is emitted from the semiconductor laser of the module 99 and then enters the hologram 196, as shown in FIGS. 41A and 41B, is all transmitted through the dielectric multilayer film 200 or 204, being reflected and diffracted as a +1st-order diffraction light by the adhesive 199 or 203 and dielectric multilayer film 198 or 202, again being all transmitted through the dielectric multilayer film 200 or 204, being emitted from the hologram 196. The light with 635 nm wavelength, which is reflected on the disk 7 and then enters the hologram 196, reversely passes through the same path as the incident light 181, being emitted from the hologram 196.

On the other hand, an incident light 182 with 785 nm wavelength, which is emitted from the semiconductor laser 177 and then enters the hologram 196, as shown in FIGS. 41A and 41B, is all transmitted through the SiO2 film 197 or 201, the dielectric multilayer film 198 or 202 and the adhesive 199 or 203, then being projected as a P-polarization light onto the dielectric multilayer film 200 or 204 and all transmitted through it, then being emitted from the hologram 196. An incident light 183 with 785 nm wavelength, which is reflected on the disk 8 and enters the hologram 196, is projected as a S-polarization light onto the dielectric multilayer film 200 or 204 and all reflected on it, then being emitted from the hologram 196.

As shown in FIG. 41A, when the SiO2 film 197 has a rectangular section form, a diffraction efficiency to a +1st-order diffraction light is 40.5% at maximum. On the other hand, as shown in FIG. 41B, when the SiO2 film 201 has a step-like section form, a diffraction efficiency to a +1st-order diffraction light is increased, i.e., 81% at maximum in a four level step form and 95% at maximum in an eight level step form.

In the composition of the seventh embodiment as shown in FIG. 34, the distance from the semiconductor laser 177 to the optical coupling and dividing/optical path control device 178 is equal to the distance from the semiconductor laser of the module 99 to the optical coupling and dividing/optical path control device 178. Here, by using the optical coupling and dividing/optical path control device 178 as shown in FIGS. 40A to 40C, a focused point to the light with 635 nm wavelength reflected on the disk 7 becomes closer to the optical coupling and dividing/optical path control device 178 than that to the light with 785 nm wavelength reflected on the disk 8. Therefore, the effective optical path length from the semiconductor laser 177 to the collimator lens 4 as to the light with 785 nm wavelength can be equal to the effective optical path length from the module 99 to the collimator lens 4 as to the light with 785 nm wavelength, and the effective optical path length from the module 99 to the collimator lens 4 as to the light with 635 nm wavelength can be longer than these effective optical path lengths.

Though, in the respective embodiments as shown in FIGS. 5, 23, 30, 32, the lens system composed of the collimator lens 4 and objective lens 6 is used, a lens system composed of only an objective lens may be used therein. Also, though, in the respective embodiments as shown in FIGS. 7, 27, 34, 36, the lens system composed of the collimator lens 4 and objective lens 6 is used, a lens system composed of only an objective lens may be used therein.

An optical head device in the ninth preferred embodiment will be explained in FIG. 42. A module 100 includes a semiconductor laser and an optical detector which receives light reflected on a disk. A semiconductor laser 160 emits light with 635 nm wavelength, and the semiconductor laser of the module 100 emits light with 785 rim wavelength.

Light emitted from the semiconductor laser 160 is transmitted through a collimator lens 205, an optical coupling and dividing device 206, a polarization hologram optical device 102, a ¼ wavelength plate 103 and an aperture control device 5, entering an objective lens 6 as a collimated light, then being focused on a disk 7 such as a digital video disk with a substrate thickness of 0.6 mm. Light reflected on the disk 7 is reversely transmitted through the objective lens 6, aperture control device 5 and ¼ wavelength plate 103, being diffracted as a ± diffraction light by the polarization hologram optical device 102, then being reflected by the optical coupling and dividing device 206, being transmitted through a collimator lens 4, being reflected by an optical path control device 207, being received by the optical detector of the module 100.

On the other hand, light emitted from the semiconductor laser of the module 100 is transmitted through the collimator lens 4, then being reflected by the optical coupling and dividing device 206, being transmitted through the polarization hologram optical device 102, ¼ wavelength plate 103 and aperture control device 5, entering the objective lens 6 as a divergent light, then being focused on a disk 8 such as a compact disk with a substrate thickness of 1.2 mm. Light reflected on the disk 8 is reversely transmitted through the objective lens 6, aperture control device 5 and ¼ wavelength plate 103, being diffracted as a ± diffraction light by the polarization hologram optical device 102, then reversely passing through the optical coupling and dividing device 206, collimator lens 4 and optical path control device 207, being received by the optical detector of the module 100.

The polarization hologram optical device 102, ¼ wavelength plate 103 and aperture control device 5 can be integrally driven with the objective lens 6 in the directions of focusing and tracking by an actuator(not shown).

The aperture control device 5 has the same composition as shown in FIGS. 16A, 16B or FIGS. 17A, 17B. The polarization hologram optical device 102 and ¼ wavelength plate 103 function as those in the third embodiment as shown in FIG. 23.

Figure 42:
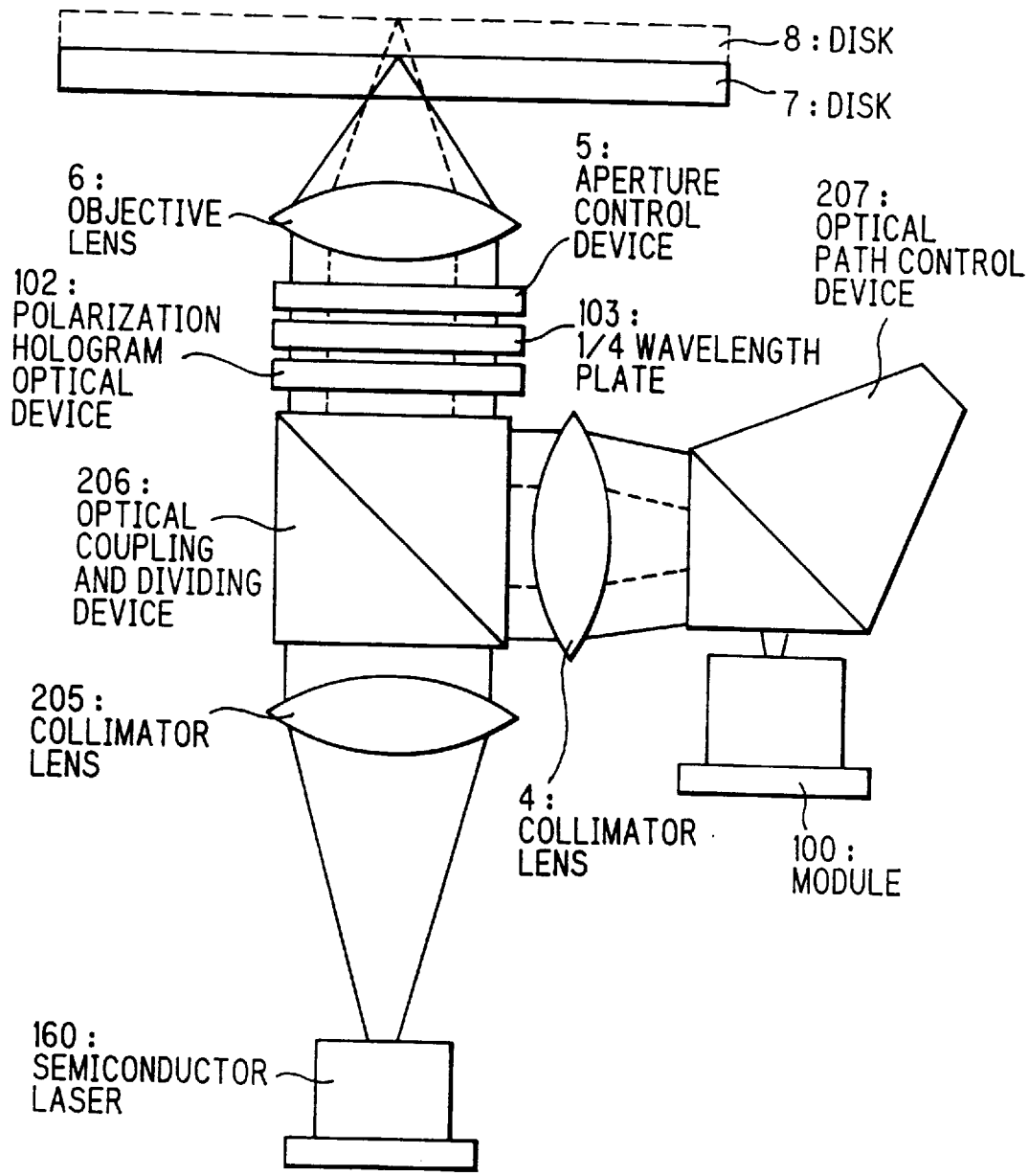
FIG. 42 shows a composition of an optical head device in a ninth preferred embodiment according to the invention.
Figure 43A:
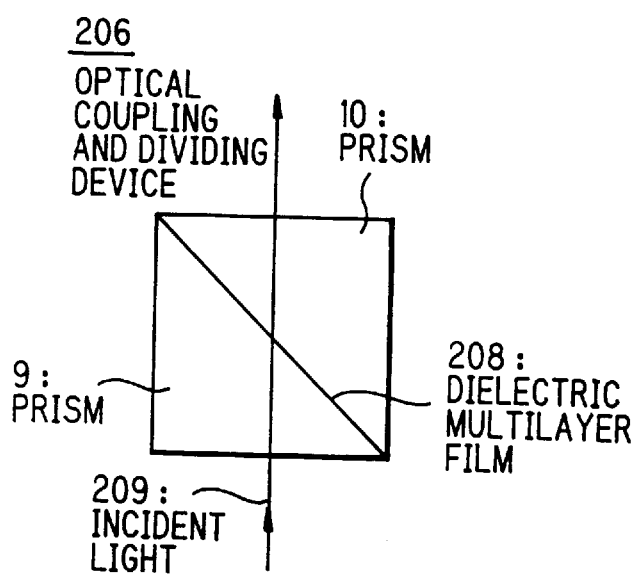
FIGS. 43A to 43C show a composition of an optical coupling and dividing device used in the ninth embodiment.
Figure 43B:
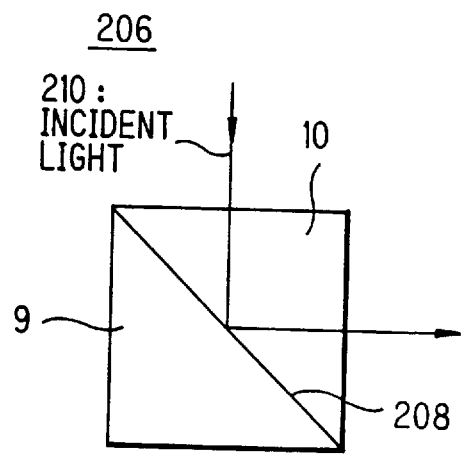
Figure 43C:
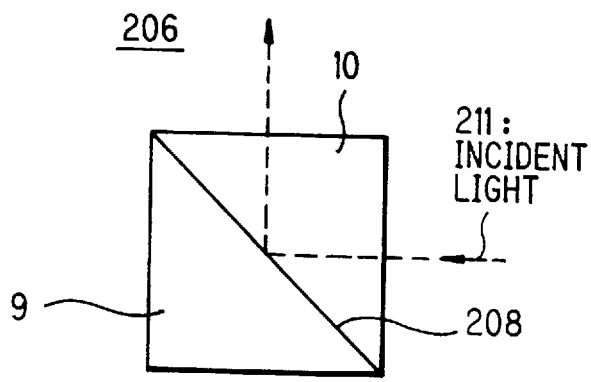

FIGS. 43A to 43C show a composition of the optical coupling and dividing device 206 used in the ninth embodiment as shown in FIG. 42. As shown in FIGS. 43A to 43C, the optical coupling and dividing device 206 is composed of a prism 9 and a prism 10 which are adhered through E dielectric multilayer film 208. The dielectric multilayer film 208 has a function that, of a light with 635 nm wavelength, a P-polarization component is all transmitted through and a S-polarization component is all reflected and a light with 785 nm wavelength is all reflected.

Therefore, as shown in FIG. 43A, an incident light 209 with 635 nm wavelength, which is emitted from the semiconductor laser 160 and then enters the prism 9 of the optical coupling and dividing device 206, is projected as a P-polarization light onto the dielectric multilayer film 208 and all transmitted through it, being emitted from the prism 10. An incident light 210 with 635 nm wavelength, which is reflected on the disk 7 and then enters prism 10 of the optical coupling and dividing device 206, as shown in FIG. 43B, is projected as a S-polarization light onto the dielectric multilayer film 208 and all reflected on it, being emitted from the prism 10.

On the other hand, an incident light 211 with 785 nm wavelength, which is emitted from the semiconductor laser of the module 100 and then enters the prism 10 of the optical coupling and dividing device 206, as shown in FIG. 43C, is all reflected by the dielectric multilayer film 208, then being emitted from the prism 10. The light with 785 nm wavelength, which is reflected on the disk 8 and then enters prism 10 of the optical coupling and dividing device 206, reversely passes through the same path as the incident light 211, being emitted from the prism 10.

Figure 44A:
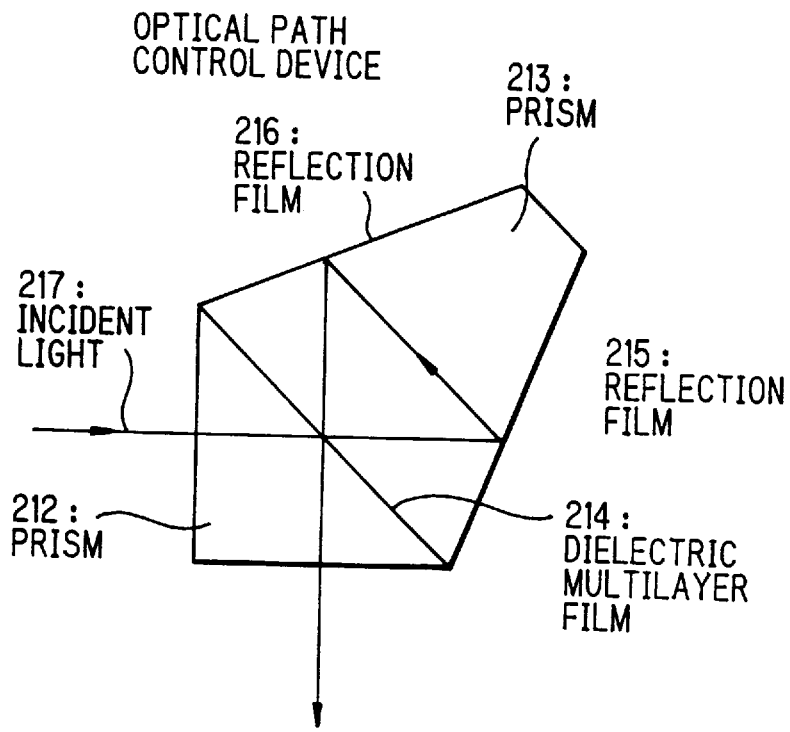
FIGS. 44A and 44B show a composition of an optical path control device used in the ninth embodiment.
Figure 44B:
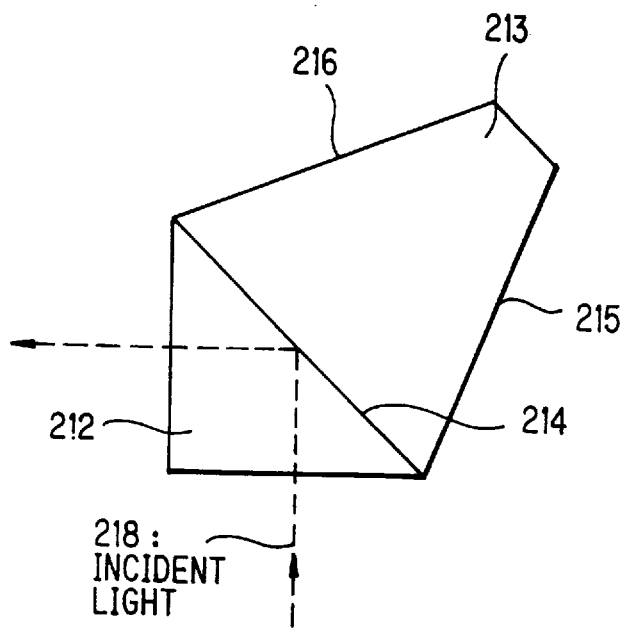

FIGS. 44A and 44B show a composition of the optical path control device 207 used in the ninth embodiment as shown in FIG. 42. As shown in FIGS. 44A and 44B, the optical path control device 207 is composed of prisms 212, 213 which are adhered through a dielectric multilayer film 214. The dielectric multilayer film 214 is a function that a light with 635 nm wavelength is all transmitted through and a light with 785 nm wavelength is all reflected on.

An incident light 217 with 635 nm wavelength, which is reflected on the disk 7 and then enters the prism 212 of the optical path control device 207, as shown in FIG. 44A, is all transmitted through the dielectric multilayer film 214, then being all reflected on a reflection film 215 and a reflection film 216, again being all transmitted through the dielectric multilayer film 214, being emitted from the prism 212.

On the other hand, an incident light 218 with 785 nm wavelength, which is emitted from the semiconductor laser of the module 100 and then enters the prism 212 of the optical path control device 207, as shown in FIG. 44B, is all reflected on the dielectric multilayer film 214, being emitted from the prism 212. The light with 785 nm wavelength, which is reflected on the disk 8 and then enters the prism 212 of the optical path control device 207, reversely passes through the same path as the incident light 218, being emitted from the prism 212.

An optical head device in the tenth preferred embodiment will be explained in FIG. 45. In the tenth embodiment, the optical path control device 207 in the ninth embodiment as shown in FIG. 42 is replaced by an optical path control device 219.

Figure 45:
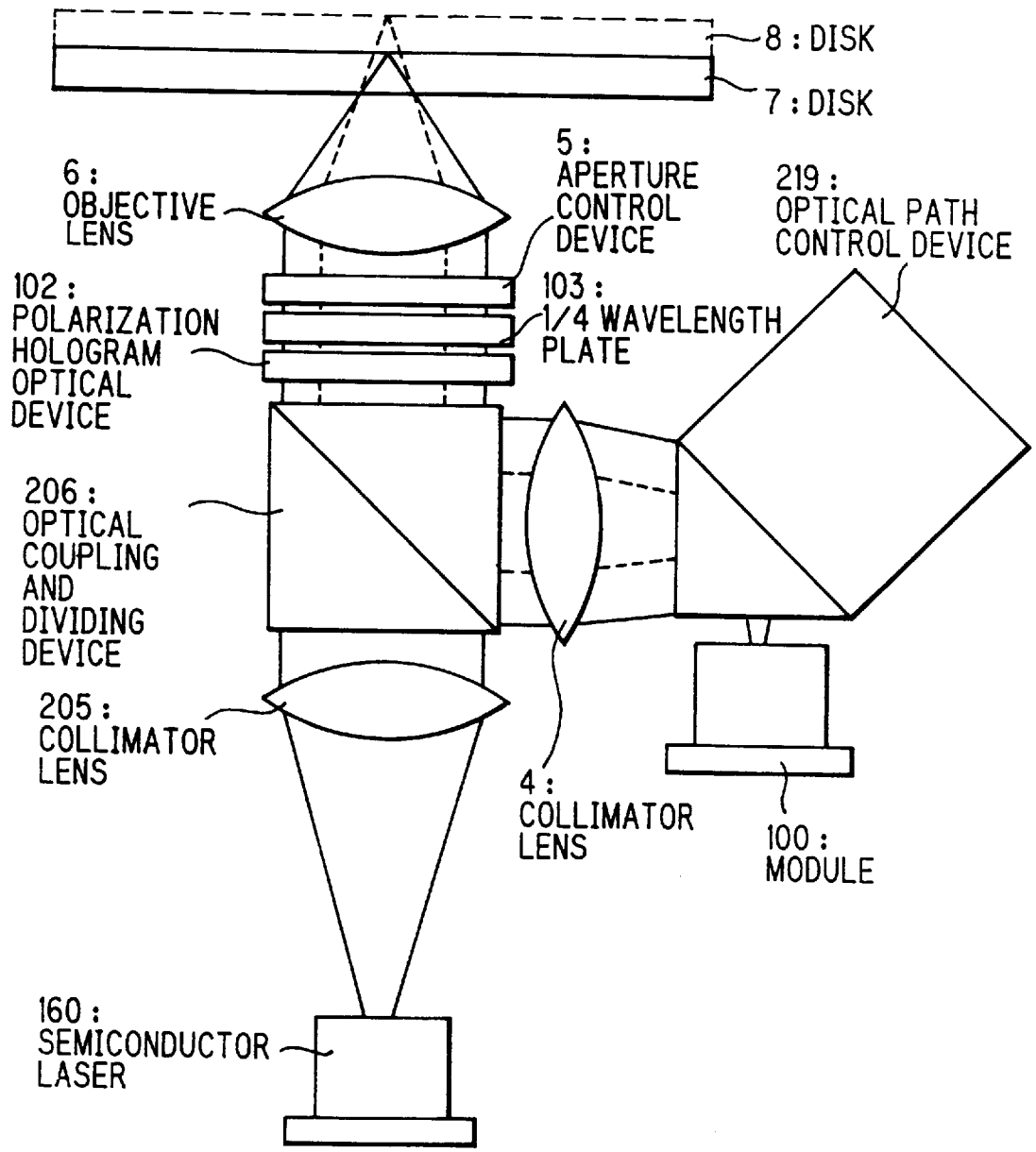
FIG. 45 shows a composition of an optical head device in a tenth preferred embodiment according to the invention.
Figure 46A:
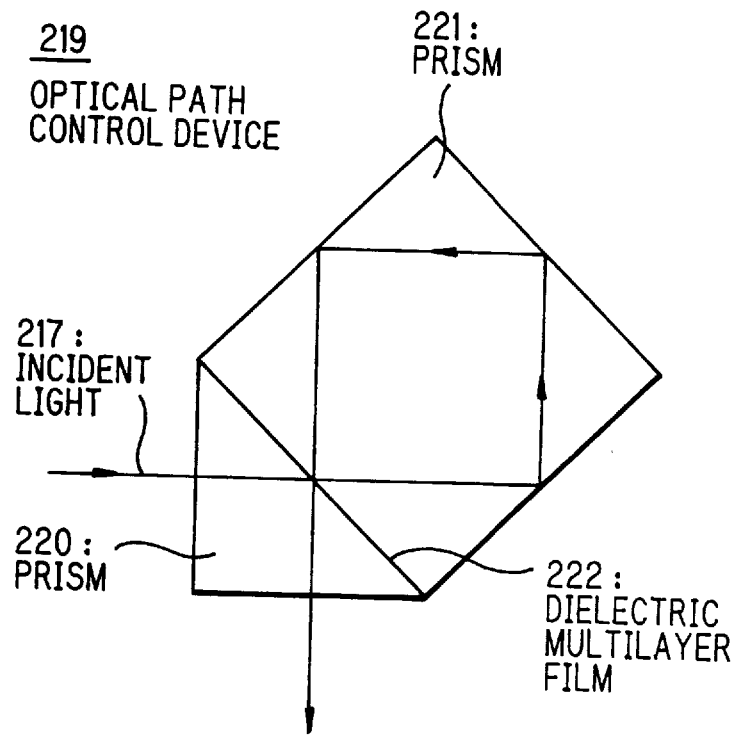
FIGS. 46A and 46B show a composition of an optical path control device used in the tenth embodiment.
Figure 46B:
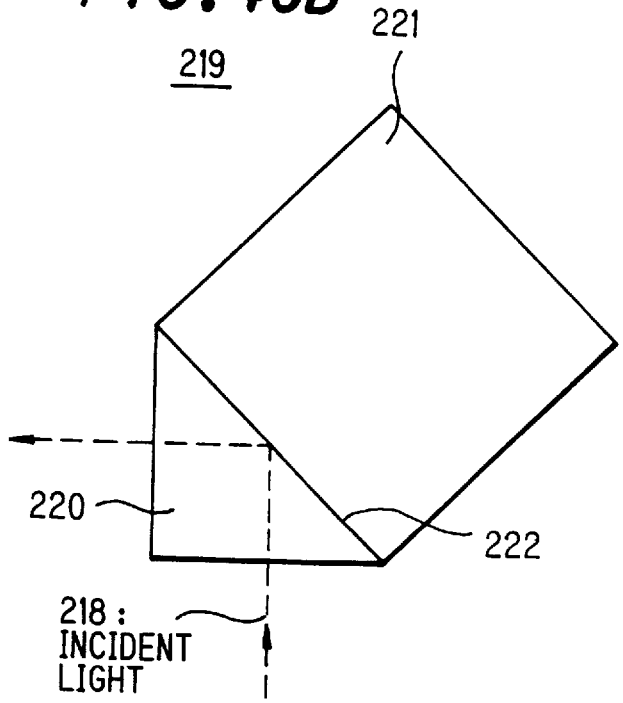

FIGS. 46A and 46B show a composition of the optical path control device 219 used in the tenth embodiment as shown in FIG. 45. As shown in FIGS. 46A and 46B, the optical path control device 219 is composed of prisms 220, 221 which are adhered through a dielectric multilayer film 222. The dielectric multilayer film 222 is a function that a light with 635 nm wavelength is all transmitted through and a light with 785 nm wavelength is all reflected.

An incident light 217 with 635 nm wavelength, which is reflected on the disk 7 and then enters the prism 220 of the optical path control device 219, is all transmitted through the dielectric multilayer film 222, then being totally reflected three times on boundary surfaces of the prism 221 and the air, again being all transmitted through the dielectric multilayer film 222, being emitted from the prism 220.

On the other hand, an incident light 218 with 785 nm wavelength, which is emitted from the semiconductor laser of the module 100 and then enters the prism 220 of the optical path control device 219, is all reflected on the dielectric multilayer film 222, being emitted from the prism 220. The light with 785 nm wavelength, which is reflected on the disk 8 and then enters the prism 220 of the optical path control device 219, reversely passes through the same path as the incident light 218, being emitted from the prism 220.

In the ninth and tenth embodiments as shown in FIGS. 42 and 45, the distance from the semiconductor laser 160 to the collimator lens 205 is equal to the focal distance of the collimator lens 205, and the distance from the module 100 to the collimator lens 4 is shorter than the focal distance of the collimator lens 4. In this composition, by using the optical path control device 207 as shown in FIGS. 44A and 44B or the optical path control device 219 as shown in FIGS. 46A and 46B, the effective optical path length from the module 100 to the collimator lens 4 as to 635 nm wavelength light can be equal to the focal distance of the collimator 4, and the effective optical path length from the module 100 to the collimator lens 4 as to 785 nm wavelength light can be shorter than the focal distance.

Though, in the ninth and tenth embodiments as shown in FIGS. 42 and 45, the optical coupling and dividing device 206 uses the dielectric multilayer film 208 in which, of the light with 635 nm wavelength, the P-polarization component is all transmitted through and the S-polarization component is all reflected and the light with 785 nm wavelength is all reflected, the optical coupling and dividing device 206 may use another dielectric multilayer film in which, of the light with 635 nm wavelength, the P-polarization component is all transmitted through and the S-polarization component is all reflected and the light with 785 nm wavelength is all transmitted through. In this case, the positions of the block which is composed of the semiconductor laser 160 and collimator lens 205 and the block which is composed of the module 100, optical path control device 207 or 219 and collimator lens 4 need to be exchanged with each other, and the light with 635 nm wavelength emitted from the semiconductor laser 160 needs to be projected as a S-pilarization light onto the dielectric multilayer film of the optical coupling and dividing device.

An optical head device in the eleventh preferred embodiment will be explained in FIG. 47. A module 99 includes a semiconductor laser and an optical detector which receives light reflected on a disk. The semiconductor laser of the module 99 emits light with 635 nm wavelength, and a semiconductor laser 177 emits light with 785 nm wavelength.

Light emitted from the semiconductor laser of the module 99 is reflected by an optical path control device 207, being transmitted through a collimator lens 4, being reflected by an optical coupling and dividing device 223, being transmitted through a polarization hologram optical device 105, a ¼ wavelength plate 106 and an aperture control device 5, entering an objective lens 15 as a convergent light, then being focused on a disk 7 such as a digital video disk with a substrate thickness of 0.6 mm. Light reflected on the disk 7 is reversely transmitted through the objective lens 15, aperture control device 5 and ¼ wavelength plate 106, being diffracted as a ± diffraction light by the polarization hologram optical device 105, reversely passing through the optical coupling and dividing device 223, collimator lens 4 and optical path control device 207, being received by the optical detector of the module 99.

On the other hand, light emitted from the semiconductor laser 177 is transmitted through the collimator lens 205, optical coupling and dividing device 223, polarization hologram optical device 105, ¼ wavelength plate 106 and aperture control device 5, entering the objective lens 15 as a collimated light, then being focused on a disk 8 such as a compact disk with a substrate thickness of 1.2 mm. Light reflected on the disk 8 is reversely transmitted through the objective lens 15, aperture control device 5 and ¼ wavelength plate 106, being diffracted as a ± diffraction light by the polarization hologram optical device 105, then being reflected by the optical coupling and dividing device 223, being transmitted through the collimator lens 4, being reflected by the optical path control device 207, being received by the optical detector of the module 99.

The polarization hologram optical device 105, ¼ wavelength plate 106 and aperture control device 5 can be integrally driven with the objective lens 15 in the directions of focusing and tracking by an actuator(not shown).

The aperture control device 5 has the same composition as shown in FIGS. 16A, 16B or FIGS. 17A, 17B. The polarization hologram optical device 105 and ¼ wavelength plate 106 function as those in the fourth embodiment as shown in FIG. 24.

Figure 47:
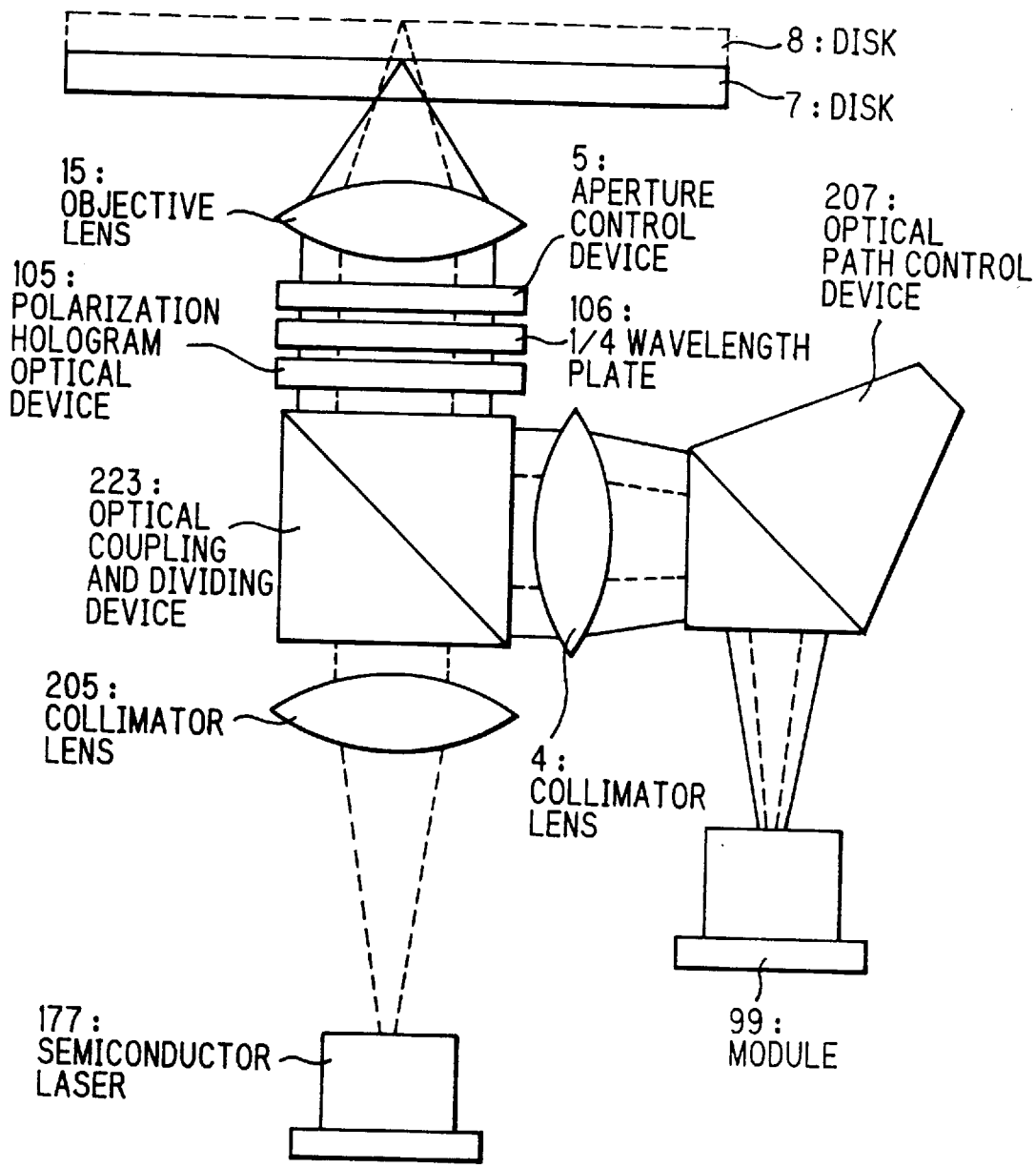
FIG. 47 shows a composition of an optical head device in an eleventh preferred embodiment according to the invention.
Figure 48A:
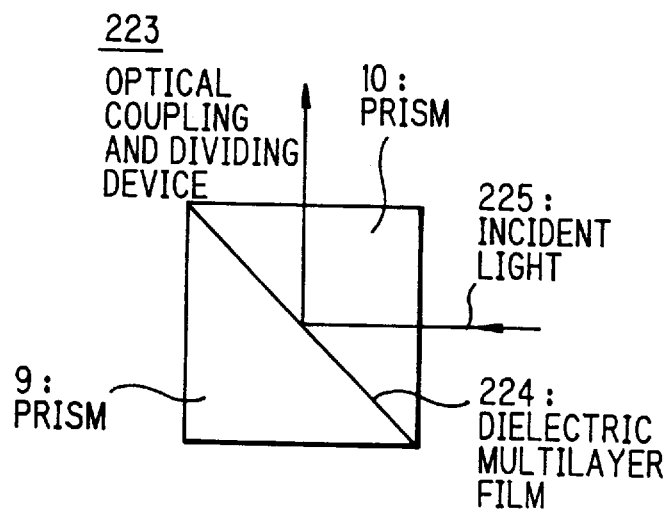
FIGS. 48A to 48C show a composition of an optical coupling and dividing device used in the eleventh embodiment.
Figure 48B:
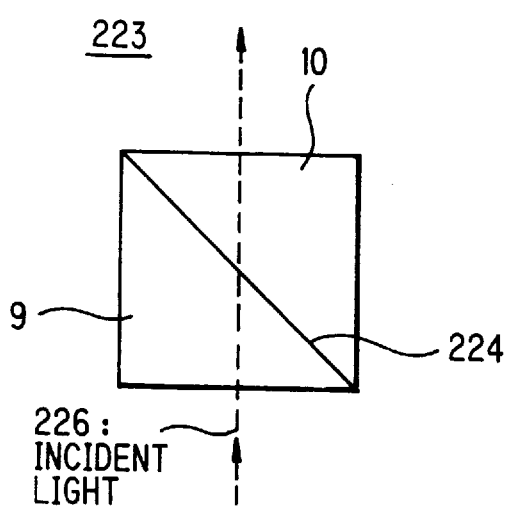
Figure 48C:
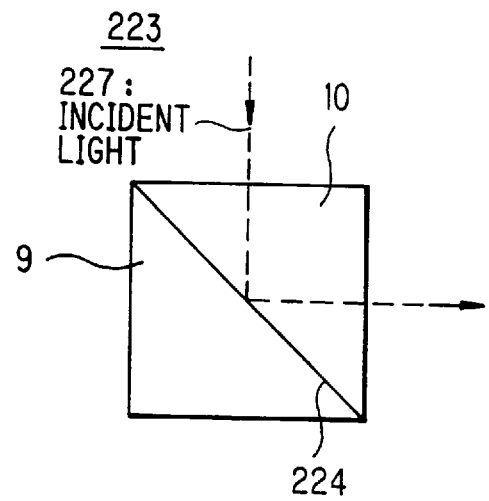

FIGS. 48A to 48C show a composition of the optical coupling and dividing device 223 used in the eleventh embodiment as shown in FIG. 47. As shown in FIGS. 48A to 48C, the optical coupling and dividing device 223 is composed of a prism 9 and a prism 10 which are adhered through a dielectric multilayer film 224. The dielectric multilayer film 224 has a function that a light with 635 nm wavelength is all reflected and, of a light with 785 nm wavelength, a P-polarization component is all transmitted through and a S-polarization component is all reflected.

Therefore, as shown in FIG. 48A, an incident light 225 with 635 nm wavelength, which is emitted from the semiconductor laser of the module 99 and then enters the prism 10 of the optical coupling and dividing device 223, is all reflected on the dielectric multilayer film 224, being emitted from the prism 10. The light with 635 nm wavelength, which is reflected on the disk 7 and then enters prism 10 of the optical coupling and dividing device 223, reversely passes through the same path as the incident light 225, being emitted from the prism 10.

On the other hand, an incident light 226 with 785 nm wavelength, which is emitted from the semiconductor laser 177 and then enters the prism 9 of the optical coupling and dividing device 223, as shown in FIG. 48B, is projected as a P-polarization light onto the dielectric multilayer film 224 and all transmitted through it, being emitted from the prism 10. An incident light 227 with 785 nm wavelength, which is reflected on the disk 8 and then enters prism 10 of the optical coupling and dividing device 223, as shown in FIG. 48C, is projected as a S-polarization light onto the dielectric multilayer film 224 and all reflected on it, being emitted from the prism 10.

An optical head device in the twelfth preferred embodiment will be explained in FIG. 49. In the twelfth embodiment, the optical path control device 207 in the eleventh embodiment as shown in FIG. 47 is replaced by an optical path control device 219. Herein, the optical path control device 207 used in the eleventh embodiment as shown in FIG. 47 has the same composition as the optical path control device 207 as shown in FIGS. 44A and 44B, and the optical path control device 219 used in the twelfth embodiment has the same composition as the optical path control device 219 as shown in FIGS. 46A and 46B.

Figure 49:
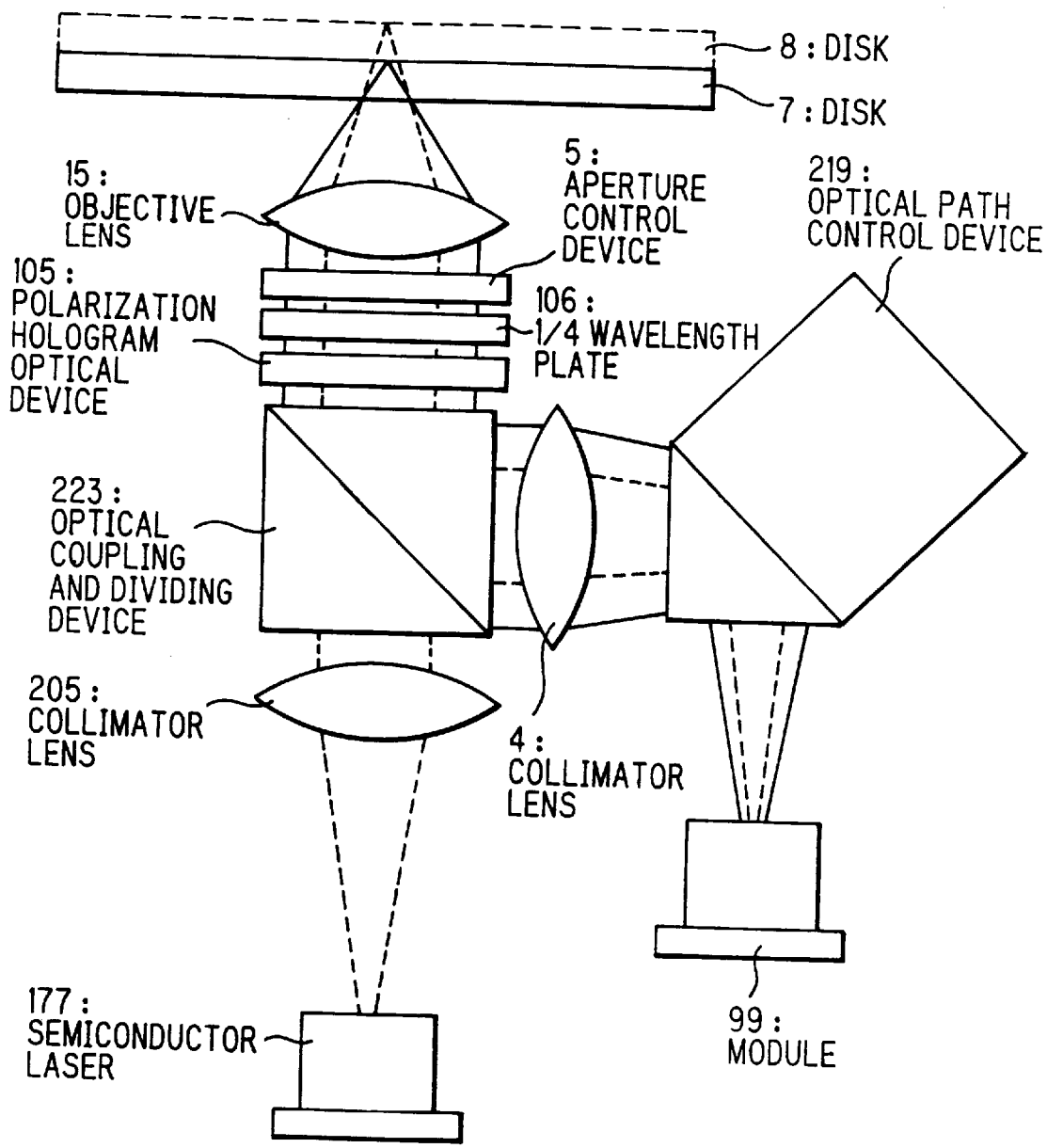
FIG. 49 shows a composition of an optical head device in a twelfth preferred embodiment according to the invention.

In the eleventh and twelfth embodiments as shown in FIGS. 47 and 49, the distance from the semiconductor laser 177 to the collimator lens 205 is equal to the focal distance of the collimator lens 205, and the distance from the module 99 to the collimator lens 4 is equal to the focal distance of the collimator lens 4. in this composition, by using the optical path control device 207 as shown in FIGS. 44A and 44B or the optical path control device 219 as shown in FIGS. 46A and 46B, the effective optical path length from the module 99 to the collimator lens 4 as to 785 nm wavelength light can be equal to the focal distance of the collimator 4, and the effective optical path length from the module 99 to the collimator lens 4 as to 635 nm wavelength light can be longer than the focal distance.

Though, in the eleventh and twelfth embodiments as shown in FIGS. 47 and 49, the optical coupling and dividing device 223 uses the dielectric multilayer film 224 in which the light with 635 nm wavelength is all reflected and, of the light with 785 nm wavelength, the P-polarization component is all transmitted through and the S-polarization component is all reflected, the optical coupling and dividing device 223 may use another dielectric multilayer film in which the light with 635 nm wavelength is all transmitted through and, of the light with 785 nm wavelength, the P-polarization component is all transmitted through and the S-polarization component is all reflected. In this case, the positions of the block which is composed of the semiconductor laser 177 and collimator lens 205 and the block which is composed of the module 99, optical path control device 207 or 219 and collimator lens 4 need to be exchanged with each other, and the light with 785 nm wavelength emitted from the semiconductor laser 177 needs to be projected as a S-polarization light onto the dielectric multilayer film of the optical coupling and dividing device.

Figure 50A:
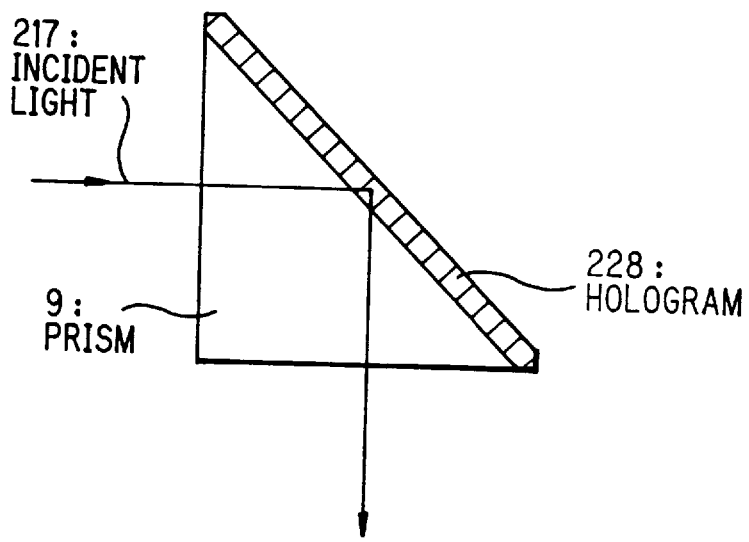
FIGS. 50A and 50B show another composition of the optical path control device used in the ninth embodiment.
Figure 50B:
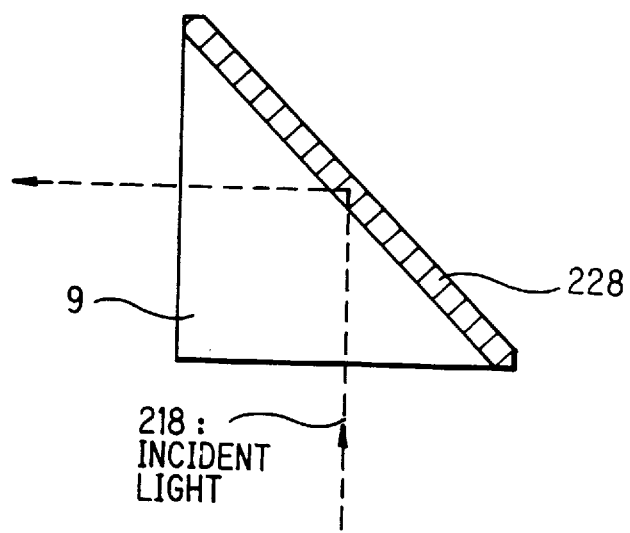

FIGS. 50A and 50B show another composition of the optical path control device 207 used in the ninth embodiment as shown in FIG. 42. This optical path control device 207 is, as shown in FIGS. 50A and 50B, composed of a prism 9 and a hologram 228 which is on the oblique plane of the prism 9. As shown in FIG. 50A, an incident light 217 with 635 nm wavelength, which is reflected on the disk 7 and then enters the prism 9 of the optical path control device 207, is reflected and diffracted as a +1st-order diffraction light by the hologram 228, being emitted from the prism 9. On the other hand, as shown in FIG. 50B, an incident light 218 with 785 nm wavelength, which is emitted from the semiconductor laser of the module 100 and then enters the prism 9 of the optical path control device 207, is all reflected by the hologram 228, being emitted from the prism 9. The light with 785 nm wavelength, which is reflected on the disk 8 and then enters the prism 9 of the optical path control device 207, reversely passes through the same way as the incident light 218, being emitted through the prism 9.

Figure 51A:
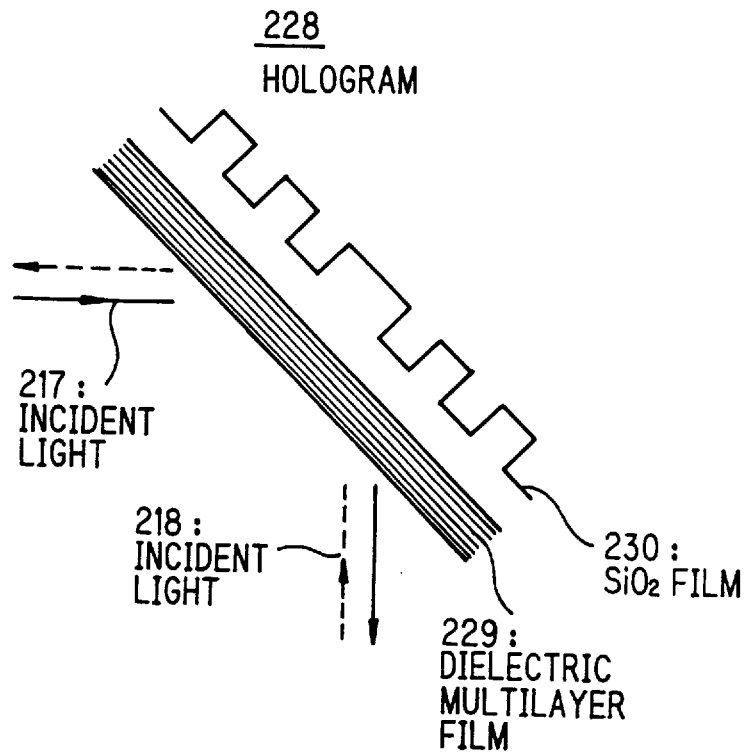
FIGS. 51A and 51B show compositions of a hologram of the optical path control device in FIGS. 50A and 50B.
Figure 51B:
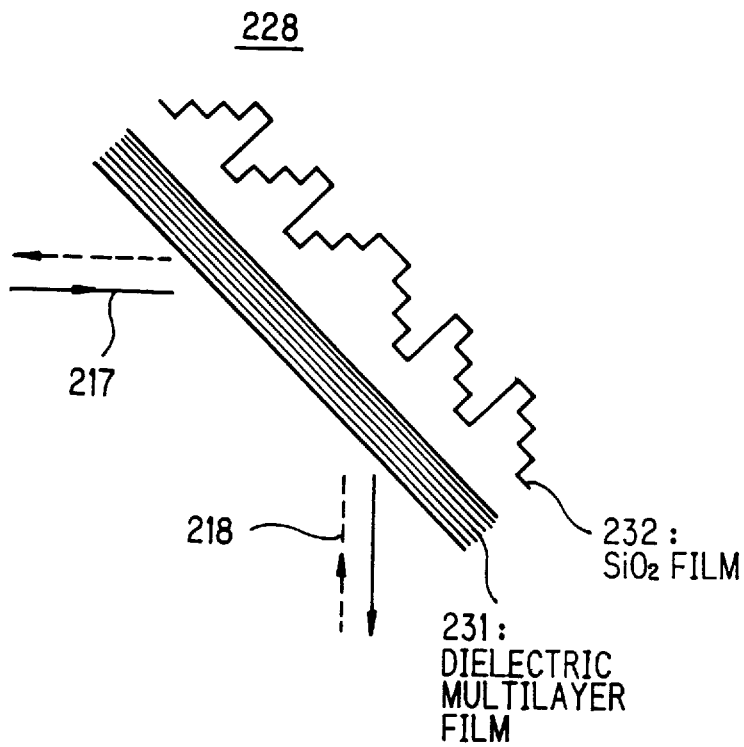

FIGS. 51A and 51B show compositions of the hologram 228 in FIGS. 50A and 50B. The hologram 228 is, as shown in FIG. 51A, composed of a dielectric multilayer film 229 and a SiO2 film 230 as a hologram layer which are formed on the oblique plane of the prism 9. On the other hand, the hologram 228 may be, as shown in FIG. 51B, composed of a dielectric multilayer film 231 and a SiO2 film 232 as a hologram layer which are formed on the oblique plane of the prism 9. The hologram 228 in FIG. 51B is different from that in FIG. 51A in the cross-sectional form of the SiO2 film 232.

The dielectric multilayer films 229 and 231 have a function that a light with 635 nm wavelength is all transmitted through and a light with 785 nm wavelength is all reflected. The hologram 228 functions as a concave surface mirror to a +1st-order diffraction light.

In these compositions, an incident light 217 with 635 nm wavelength, which is reflected on the disk 7 and then enters the hologram 228, as shown in FIGS. 51A and 51B, is all transmitted through the dielectric multilayer film 229 or 231, being reflected and diffracted as a +1st-order diffraction light by the SiO2 film 230 or 232, again being all transmitted through the dielectric multilayer film 229 or 231, being emitted from the hologram 228. On the other hand, an incident light 218 with 785 nm wavelength, which is emitted from the semiconductor laser of the module 100 and then enters the hologram 228, as shown in FIGS. 51A and 51B, is all reflected by the dielectric multilayer film 229 or 231, being emitted from the hologram 228. The light with 785 nm wavelength, which is reflected on the disk 8 and enters the hologram 228, reversely passes through the same path as the incident light 218, being emitted from the hologram 228.

As shown in FIG. 51A, when the SiO2 film 230 has a rectangular section form, a diffraction efficiency to a +1st-order diffraction light is 40.5% at maximum. On the other hand, as shown in FIG. 51B, when the SiO2 film 232 has a step-like section form, a diffraction efficiency to a +1st-order diffraction light is Increased, i.e., 81% at maximum in a four level step form and 95% at maximum in an eight level step form.

In the composition of the ninth embodiment as shown in FIG. 42, the distance from the semiconductor laser 160 to the collimator lens 205 is equal to the focal distance of the collimator lens 205, and the distance from the module 100 to the collimator lens 4 is shorter than the focal distance of the collimator lens 4. Here, by using the optical path control device 207 as shown in FIGS. 50A an 50B, a focused point to the light with 635 nm wavelength reflected on the disk 7 becomes closer to the optical path control device 207 than that to the light with 785 nm wavelength reflected on the disk 8. Therefore, the effective optical path length from the module 100 to the collimator lens 4 as to the light with 635 nm wavelength can be equal to the focal distance of the collimator lens 4, and the effective optical path length from the module 100 to the collimator lens 4 as to the light with 785 nm wavelength can be shorter than the focal distance.

The optical path control device shown in FIGS. 50A and 50B can be used in the eleventh embodiment as shown in FIG. 47. In the composition of the eleventh embodiment as shown in FIG. 47, the distance from the semiconductor laser 177 to the collimator lens 205 is equal to the focal distance of the collimator lens 205, and the distance from the module 99 to the collimator lens 4 is equal to the focal distance of the collimator lens 4. Here, by using the optical path control device 207 as shown in FIGS. 50 A and 50B, a focused point to the light with 635 nm wavelength reflected on the disk 7 becomes closer to the optical path control device 207 than that to the light with 785 nm wavelength reflected on the disk 8. Therefore, the effective optical path length from the module 99 to the collimator lens 4 as to the light with 785 nm wavelength can be equal to the focal distance of the collimator lens 4, and the effective optical path length from the module 99 to the collimator lens 4 as to the light with 635 nm wavelength can be longer than the focal distance.

Patterns of interference fringe of the hologram 187 which is used in the optical coupling and dividing/optical path control device 161 shown in FIGS. 38A to 38C, the hologram 196 which is used in the optical coupling and dividing/ optical path control device 178 shown in FIGS. 40A to 40C, and the hologram 228 which is used in the optical path control device 207 shown in FIGS. 50A and 50B are as shown in FIG. 15.

The dielectric multilayer films 165 and 166 of the optical coupling and dividing/optical path control device 161 shown in FIGS. 31A to 31C, the dielectric multilayer films 175 and 176 of the optical coupling and dividing/optical path control device 171 shown in FIGS. 33A to 33C, the dielectric multilayer films 179 and 180 of the optical coupling and dividing/optical path control device 178 shown in FIGS. 35A to 35C, the dielectric multilayer films 185 and 186 of the optical coupling and dividing/optical path control device 184 shown in FIGS. 37A to 37C, the dielectric multilayer films 189, 191, 193 and 195 of the hologram 187 shown in FIGS. 39A and 39B, the dielectric multilayer films 198, 200, 202 and 204 of the hologram 196 shown in FIGS. 41A and 41B, the dielectric multilayer film 208 of the optical coupling and dividing device 206 shown in FIGS. 43A to 43C, the dielectric multilayer film 214 of the optical path control device 207 shown in FIGS. 44A and 44B, the dielectric multilayer film 222 of the optical path control device 219 shown in FIGS. 46A and 46B, the dielectric multilayer film 224 of the optical coupling and dividing device 223 shown in FIGS. 48A to 48C, and the dielectric multilayer films 229 and 231 of the hologram 228 shown in FIGS. 51A and 51B can be made by forming an odd number of layers in which a high refractive index layer such as TiO2 and a low refractive index layer such as SiO2 are alternately deposited.

Though, in the respective embodiments as shown in FIGS. 30, 32, 34, 36, 42, 45, 47 and 49, the two modules which include the semiconductor laser and optical detector are used to miniaturize the size, two pairs of blocks, in each pair of blocks a semiconductor laser and an optical detector being separately included, may be used.

An optical head device in the thirteenth preferred embodiment will be explained in FIG. 52. Both a module 1 and a module 2 include a semiconductor laser and an optical detector which receives light reflected on a disk. The semiconductor laser of the module 1 emits light with 635 nm wavelength, and the semiconductor laser of the module 2 emits light with 785 nm wavelength. An optical coupling and dividing device 3 has the composition as shown in FIGS. 6A and 6B, and an aperture control device 5 has the composition as shown in FIGS. 16A and 16B or FIGS. 17A and 17B.

Light emitted from the semiconductor laser of the module 1 is transmitted through a collimator lens 205, an optical coupling and dividing device 3 and an aperture control device 5, entering an objective lens 6 as a collimated light, then being focused on a disk 7 such as a digital video disk with a substrate thickness of 0.6 mm. Light reflected on the disk 7 is reversely transmitted through the objective lens 6, aperture control device 5, optical coupling and dividing device 3 and collimator lens 205, being received by the optical detector of the module 1.

On the other hand, light emitted from the semiconductor of the module 2 is transmitted through a collimator lens 233 and a concave lens 234, being reflected by the optical coupling and dividing device 3, being transmitted through the aperture control device 5, entering the objective lens 6 as a divergent light, then being focused on a disk 8 such as a compact disk with a substrate thickness of 1.2 mm. Light reflected on the disk 8 reversely passes through the objective lens 6, aperture control device 5, optical coupling and dividing device 3, concave lens 234 and collimator lens 233, being received by the optical detector of the module 2. The aperture control device 5 can be integrally driven with the objective lens 6 in the directions of focusing and tracking by an actuator(not shown).

Figure 52:
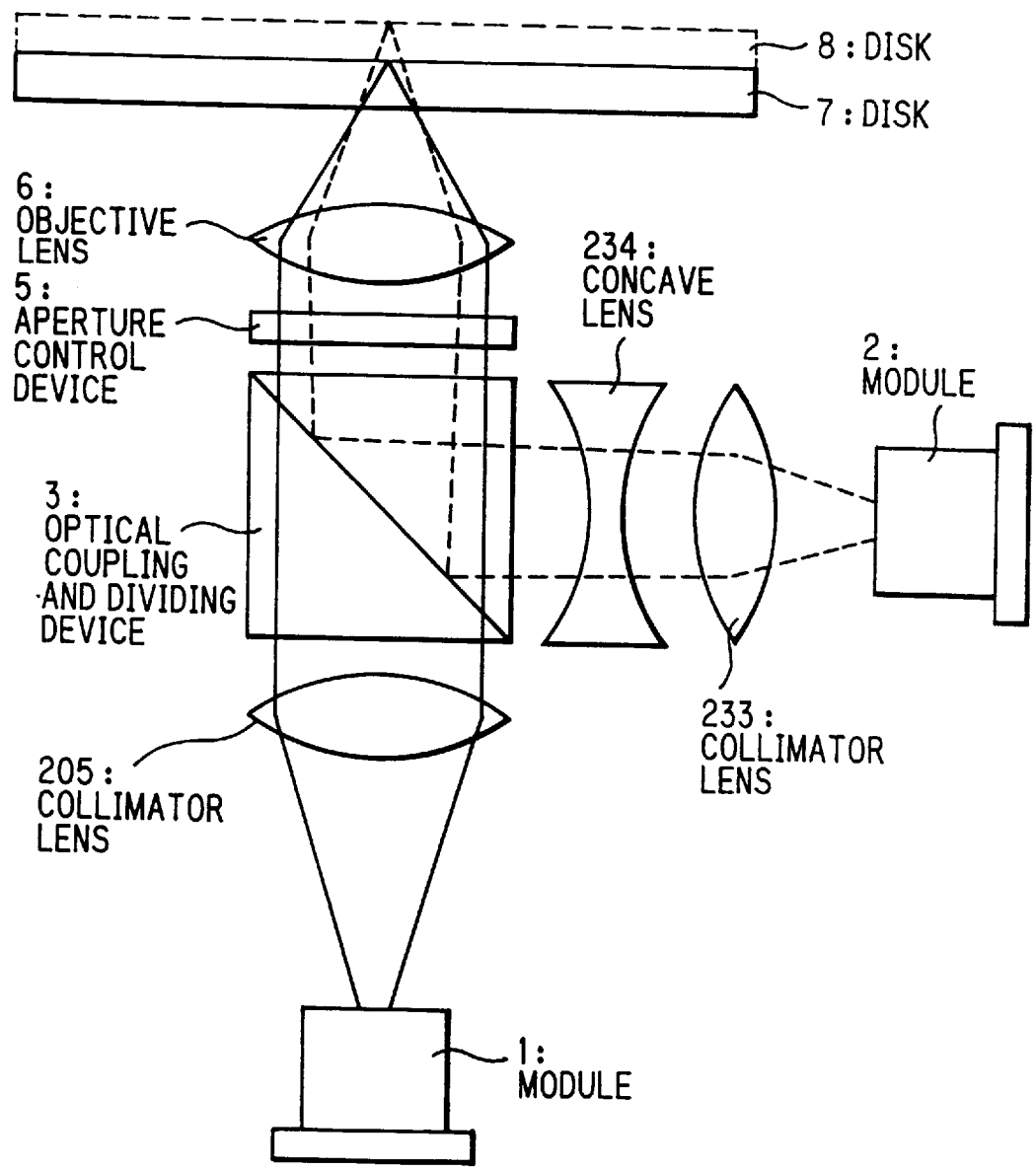
FIG. 52 shows a composition of an optical head device in a thirteenth preferred embodiment according to the invention.

Though, in the thirteenth embodiment as shown in FIG. 52, the optical coupling and dividing device 3 uses the dielectric multilayer film 11 as shown in FIGS. 6A and 6B in which the light with 635 nm wavelength is all transmitted through and the light with 785 nm wavelength is all reflected, the optical coupling and dividing device 3 may use another dielectric multilayer film in which the light with 635 nm wavelength is all reflected and the light with 785 nm wavelength is all transmitted through. In this case, the positions of the module 1 and module 2 as shown in FIG. 52 need to be exchanged with each other.

Though, in the thirteenth embodiment as shown in FIG. 52, the concave lens 234 is used to make the light emitted from the semiconductor laser of the module 2 enter the objective lens 6 as a divergent light, alternatively, the emitted light may be focused by using a convex lens, thereafter being diffused.

An optical head device in the fourteenth preferred embodiment will be explained in FIG. 53. Both a module I and a module 2 include a semiconductor laser and an optical detector which receives light reflected on a disk. The semiconductor laser of the module 1 emits light with 635 nm wavelength, and the semiconductor laser of the module 2 emits light with 785 nm wavelength. An optical coupling and dividing device 14 has the composition as shown in FIGS. 8A and 8B, and an aperture control device 5 has the composition as shown in FIGS. 16A and 16B or FIGS. 17A and 17B. The fourteenth embodiment is characterized in that a convex lens 236 is used to make the light emitted from the semiconductor laser of the module 1 enter an objective lens 15 as a convergent light.

Figure 53:
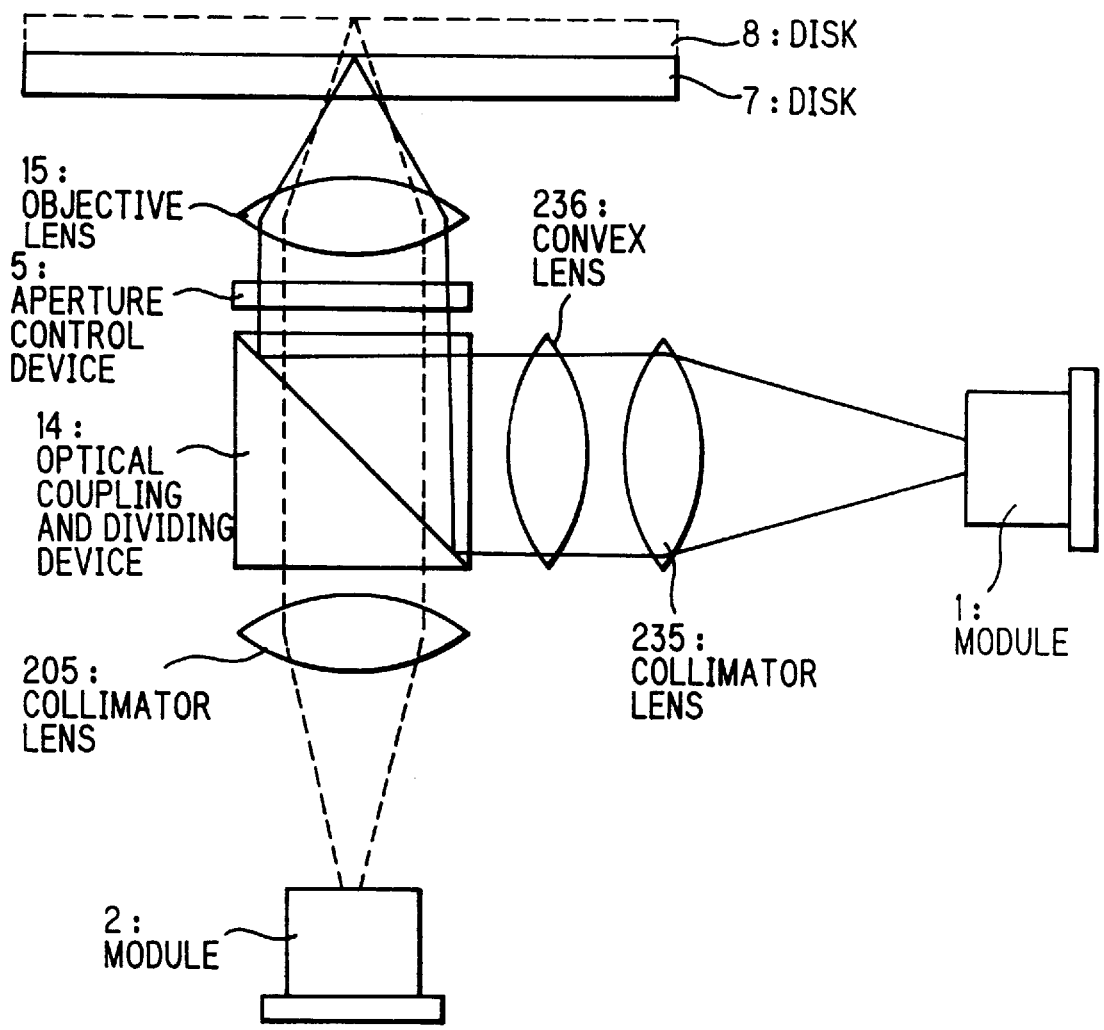
FIG. 53 shows a composition of an optical head device in a fourteenth preferred embodiment according to the invention.

As shown in FIG. 53, the light emitted from the semiconductor laser of the module 1 is transmitted through a collimator lens 235 and a convex lens 236, then being reflected by the optical coupling and dividing device 14, being transmitted through the aperture control device 5, entering the objective lens 15 as a convergent light, then being focused on a disk 7 such as a digital video disk with a substrate thickness of 0.6 mm. Light reflected on the disk 7 reversely passes through the objective lens 15, aperture control device 5, optical coupling and dividing device 14, convex lens 236 and collimator lens 235, being received by the optical detector of the module 1.

On the other hand, light emitted from the semiconductor of the module 2 is transmitted through a collimator lens 205, the optical coupling and dividing device 14 and aperture control device 5, entering the objective lens 15 as a collimated light, then being focused on a disk 8 such as a compact disk with a substrate thickness of 1.2 mm. Light reflected on the disk 8 reversely passes through the objective lens 15, aperture control device 5, optical coupling and dividing device 14 and collimator lens 205, being received by the optical detector of the module 2. The aperture control device 5 can be integrally driven with the objective lens 15 in the directions of focusing and tracking by an actuator(not shown).

Though, in the fourteenth embodiment as shown in FIG. 53, the optical coupling and dividing device 14 uses the dielectric multilayer film 16 as shown in FIGS. 8A and 8B in which the light with 635 nm wavelength is all reflected and the light with 785 nm wavelength is all transmitted through, the optical coupling and dividing device 14 may use another dielectric multilayer film in which the light with 635 nm wavelength is all transmitted through and the light with 785 nm wavelength is all reflected. In this case, the positions of the module 1 and module 2 as shown in FIG. 53 need to be exchanged with each other.

Though, in the thirteenth and fourteenth embodiments as shown in FIGS. 52 and 53, the two modules which include the semiconductor laser and optical detector are used to miniaturize the size, two pairs of blocks, in each pair of blocks a semiconductor laser and an optical detector being separately included, may be used.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical head device, comprising:

a first light source which emits a light with a first wavelength;

a second light source which emits a light with a second wavelength;

first and second optical detectors;

an optical coupling and dividing means in which said light emitted from said first light source and said light emitted from said second light source are coupled and are then individually led to a respective first and second substrate thickness of an optical recording medium, and in which said light emitted from said first light source and reflected on said optical recording medium is led to said first optical detector and said light emitted from said second light source and reflected on said optical recording medium is led to said second optical detector; and a lens system which is disposed between said optical coupling and dividing means and said optical recording medium and includes an objective lens;

wherein said second substrate thickness is set to be greater than said first substrate thickness and an effective optical path length from said second light source to said lens system is set to be shorter than an effective optical path length from said first light source to said lens system, and wherein at least one of recording and reproducing of said optical recording medium with said first substrate thickness is conducted by using said light emitted from said first light source, and at least one of the recording and reproducing of said optical recording medium with said second substrate thickness is conducted by using said light emitted from said second light source.

2. An optical head device, according to claim 1, wherein: said first wavelength is about 635 nm and said second wavelength is about 785 nm.

3. An optical head device, according to claim 1, wherein: an aperture control device which allows an incident light to be all transmitted through as to said first wavelength and allows only a central part in cross section of an incident light to be transmitted through as to said second wavelength is disposed between said optical coupling and dividing means and said objective lens.

4. An optical head device, according to claim 3, wherein: said aperture control device and said objective lens is integrally driven in the directions of focusing and tracking by an actuator.

5. An optical head device, according to claim 3, wherein: said aperture control device comprises a dielectric multilayer film which is formed on the outside of a circular region of a substrate that has a diameter smaller than an effective diameter of said objective lens, and a phase compensating film which is formed on the inside of said circular region, wherein said dielectric multilayer film allows said light with said first wavelength to be all transmitted through and allows said light with said second wavelength to be all reflected on, and said phase compensating film adjusts a phase difference between a light transmitting through the outside of said circular region and a light transmitting through the inside of said circular region to be about zero as to said first wavelength.

6. An optical head device, according to claim 3, wherein:

said aperture control device comprises a first substrate which includes a diffraction grating layer and a dielectric multilayer film formed on the outside of a circular region of said first substrate that has a diameter smaller than an effective diameter of said objective lens, and a second substrate which includes a phase compensating film formed above the inside of said circular region, said first and second substrates being adhered by an adhesive, wherein said dielectric multilayer film allows said light with said first wavelength to be all transmitted through and allows said light with said second wavelength to be all reflected on, and said phase compensating film adjusts a phase difference between a light transmitting through the outside of said circular region and a light transmitting through the inside of said circular region to be about zero as to said first wavelength.

7. An optical head device, according to claim 1, wherein: said lens system comprises a collimator lens and an objective lens.

8. An optical head device, according to claim 1, wherein: said lens system consists of an objective lens.

9. An optical head device, according to claim 1, wherein: said first light source and said first optical detector are packaged in a first common package and said second light source and said second optical detector are packaged in a second common package.

10. An optical head device, according to claim 1, wherein: said optical coupling and dividing means is a device which includes a dielectric multilayer film which allows an incident light to be transmitted through as to one of said first and second wavelengths and allows an incident light to be reflected on as to the other of said first and second wavelengths.

11. An optical head device, according to claim 1, wherein: said optical coupling and dividing means is a device which includes a dielectric multilayer film which allows an incident light to be transmitted through as to said first wavelength and allows an incident light to be reflected on as to said second wavelength, and which includes a reflection surface which allows said light emitted from said light source to be reflected on at least one time to be led to said dielectric multilayer film as to said first wavelength.

12. An optical head device, according to claim 1, wherein: said optical coupling and dividing means is a device which includes a hologram which allows an incident light to be transmitted through as to said first wavelength and allows an incident light to be reflected and diffracted as a +1st-order diffraction light as to said second wavelength, wherein said hologram functions as a convex surface mirror as to a +1st-order diffraction light.

13. An optical head device, according to claim 12, wherein:

said hologram is composed of a first prism on an oblique plane of which a hologram layer and a dielectric multilayer film are formed and a second prism which are adhered with each other, wherein said dielectric multilayer film allows an incident light to be transmitted through as to said first wavelength and allows an incident light to be reflected on as to said second wavelength.

14. An optical head device, according to claim 13, wherein:

said hologram layer has a step-like section.

15. An optical head device, according to claim 1, wherein:

said optical coupling and dividing means is a device which includes a hologram which allows an incident light to be reflected and diffracted as a +1st-order diffraction light as to said first wavelength and allows an incident light to be transmitted through as to said second wavelength, wherein said hologram functions as a concave surface mirror as to a +1st-order diffraction light.

16. An optical head device, according to claim 15, wherein:

said hologram is composed of a first prism on an oblique plane of which a hologram layer and a dielectric multilayer film are formed and a second prism, said first and second prism being adhered with each other, wherein said dielectric multilayer film allows an incident light to be reflected on as to said first wavelength and allows an incident light to be transmitted through as to said second wavelength.

17. An optical head device, according to claim 16, wherein:

said hologram layer has a step-like section.

18. An optical head device according to claim 1, wherein:

said light emitted from one of said first and second light sources is led to said objective lens of said lens system as a collimated light and said light emitted from the other of said first and second light sources is led to said objective lens of said lens system as at least one of a divergent light and a convergent light, and said objective lens has a spherical aberration that cancels a spherical aberration which occurs when said collimated light led to said objective lens is transmitted through said recording medium with said at least one of first and second substrate thickness which is subject to at least one of the recording and reproducing by said collimated light.

19. An optical head device, comprising:

a first light source which emits a light with a first wavelength;

a second light source which emits a light with a second wavelength;

an optical detector;

an optical coupling and dividing means in which said light emitted from said first light source and said light emitted from said second light source are coupled and are then individually led to a respective first and second substrate thickness of an optical recording medium, and in which said light emitted from said first light source and reflected on said optical recording medium and said light emitted from said second light source and reflected on said optical recording medium are led to said optical detector; and a lens system which is disposed between said optical coupling and dividing means and said optical recording medium and includes an objective lens;

wherein said second substrate thickness is set to be greater than said first substrate thickness and an effective optical path length from said second light source to said lens system is set to be shorter than an effective optical path length from said first light source to said lens system, and wherein at least one of recording and reproducing of said optical recording medium with said first substrate thickness is conducted by using said light emitted from said first light source, and at least one of the recording and reproducing of said optical recording medium with said second substrate thickness is conducted by using said light emitted from said second light source.

20. An optical head device, according to claim 19, wherein:

said first wavelength is about 635 nm and said second wavelength is about 785 nm.

21. An optical head device, according to claim 19, wherein:

an aperture control device which allows an incident light to be all transmitted through as to said first wavelength and allows only a central part in cross section of an incident light to be transmitted through as to said second wavelength is disposed between said optical coupling and dividing means and said objective lens.

22. An optical head device, according to claim 21, wherein:

said aperture control device and said objective lens is integrally driven in the directions of focusing and tracking by an actuator.

23. An optical head device, according to claim 21, wherein:

said aperture control device comprises a dielectric multilayer film which is formed on the outside of a circular region of a substrate that has a diameter smaller than an effective diameter of said objective lens, and a phase compensating film which is formed on the inside of said circular region, wherein said dielectric multilayer film allows said light with said first wavelength to be all transmitted through and allows said light with said second wavelength to be all reflected on, and said phase compensating film adjusts a phase difference between a light transmitting through the outside of said circular region and a light transmitting through the inside of said circular region to be about zero as to said first wavelength.

24. An optical head device, according to claim 21, wherein:

said aperture control device comprises a first substrate which includes a diffraction grating layer and a dielectric multilayer film formed on the outside of a circular region of said first substrate that has a diameter smaller than an effective diameter of said objective lens, and a second substrate which includes a phase compensating film formed above the inside of said circular region, said first and second substrates being adhered by an adhesive, wherein said dielectric multilayer film allows said light with said first wavelength to be all transmitted through and allows said light with said second wavelength to be all reflected on, and said phase compensating film adjusts a phase difference between a light transmitting through the outside of said circular region and a light transmitting through the inside of said circular region to be about zero as to said first wavelength.

25. An optical head device, according to claim 19, further comprising:

an optical path control means which is disposed between said lens system and said optical detector and in which an effective optical path length from said lens system to said optical detector as to said second wavelength is controlled to be shorter than an effective optical path length from said lens system to said optical detector as to said first wavelength.

26. An optical head device, according to claim 25, wherein:

said optical coupling and dividing means and said optical path control means are a same device which includes a first dielectric multilayer film which allows said light emitted from said light source to be transmitted through and said light reflected on said optical recording medium to be reflected on as to said first wavelength and a second dielectric multilayer film which allows an incident light to be transmitted through as to said first wavelength and allows an incident light to be reflected on as to said second wavelength, and which includes a reflection surface which allows said light reflected on said optical recording medium to be reflected on at least one time to be again led to said second dielectric multilayer film after it is transmitted through said second dielectric multilayer film and is then reflected on said first dielectric multilayer film as to said first wavelength.

27. An optical head device, according to claim 25, wherein:

said optical coupling and dividing means and said optical path control means are a same device which includes a first dielectric multilayer film which allows an incident light to be reflected on as to said first wavelength and allows an incident light to be transmitted through as to said second wavelength and a second dielectric multilayer film which allows said light emitted from said light source to be transmitted through as to said first wavelength and allows said light emitted from said light source to be transmitted through and said light reflected on said optical recording medium to be reflected on as to said second wavelength, and which includes a reflection surface which allows said light reflected on said optical recording medium to be reflected on at least one time to be again led to said second dielectric multilayer film after it is transmitted through said second dielectric multilayer film and is then reflected on said first dielectric multilayer film as to said first wavelength.

28. An optical head device, according to claim 25, wherein:

said optical coupling and dividing means and said optical path control means are a same device which includes a hologram which allows said light emitted from said light source to be transmitted through and said light reflected on said optical recording medium to be reflected and diffracted on as a +1st-order diffraction light as to said first wavelength and allows an incident light to be reflected on as to said second wavelength, wherein said hologram functions as a concave surface mirror as to a +1st-order diffraction light.

29. An optical head device, according to claim 28, wherein:

said hologram is composed of a first prism on an oblique plane of which a hologram layer and a first dielectric multilayer film are formed and a second prism on an oblique plane of which a second dielectric multilayer film is formed, said first and second prism being adhered with each other, wherein said first dielectric multilayer film allows said light emitted from said light source to be transmitted through and said light reflected on said recording medium to be reflected on as to said first wavelength and said second dielectric multilayer film allows an incident light to be transmitted through on as to first wavelength and allows an incident light to be reflected on as to second wavelength.

30. An optical head device, according to claim 29, wherein:

said hologram layer has a step-like section.

31. An optical head device, according to claim 25, wherein:

said optical coupling and dividing means and said optical path control means are a same device which includes a hologram which allows an incident light to be reflected and diffracted on as a +1st-order diffraction light as to said first wavelength and allows said light emitted from said light source to be transmitted through and said light reflected on said optical recording medium to be reflected on as to said second wavelength, wherein said hologram functions as a concave surface mirror as to a +1st-order diffraction light.

32. An optical head device, according to claim 31, wherein:

said hologram is composed of a first prism on an oblique plane of which a hologram layer and a first dielectric multilayer film are formed and a second prism on an oblique plane of which a second dielectric multilayer film is formed, said first and second prism being adhered with each other, wherein said first dielectric multilayer film allows an incident light to be reflected on as to said first wavelength and allows an incident light to be transmitted through as to said second wavelength, and said second dielectric multilayer film allows an incident light to be transmitted through as to said first wavelength and allows said light emitted from said light source to be transmitted through and said light reflected on said recording medium to be reflected on as to said second wavelength.

33. An optical head device, according to claim 32, wherein:

said hologram layer has a step-like section.

34. An optical head device, according to claim 19, wherein:

said lens system comprises a collimator lens and an objective lens.

35. An optical head device, according to claim 19, wherein:

said lens system consists of an objective lens.

36. An optical head device, according to claim 19, wherein:

one of said first and second light sources and said optical detector are packaged in a common package.

37. An optical head device according to claim 19, wherein:

said light emitted from one of said first and second light sources is led to said objective lens of said lens system as a collimated light and said light emitted from the other of said first and second light sources is led to said objective lens of said lens system as at least one of a divergent light and a convergent light, and said objective lens has a spherical aberration that cancels a spherical aberration which occurs when said collimated light led to said objective lens is transmitted through said recording medium with said at least one of first and second substrate thickness which is subject to at least one of the recording and reproducing by said collimated light.

38. An optical head device, comprising:

a first light source which emits a light with a first wavelength;

a second light source which emits a light with a second wavelength;

an optical detector;

an optical coupling and dividing means in which said light emitted from said first light source and said light emitted from said second light source are coupled and are then individually led to a respective first and second substrate thickness of an optical recording medium, and in which said light emitted from said first light source and reflected on said optical recording medium and said light emitted from said second light source and reflected on said optical recording medium are led to said optical detector;

an objective lens which is disposed between said optical coupling and dividing means and said optical recording medium;

a first collimator lens which is disposed between said first light source and said optical coupling and dividing means; and a second collimator lens which is disposed between said second light source and said optical coupling and dividing means;

wherein said second substrate thickness is set to be greater than said first substrate thickness, and a difference between an effective optical path length from said second light source to said second collimator lens and a focal distance of said second collimator lens is set to be smaller than a difference between an effective optical path length from said first light source to said first collimator lens and a focal distance of said first collimator lens, and wherein at least one of recording and reproducing of said optical recording medium with said first substrate thickness is conducted by using said light emitted from said first light source, and at least one of the recording and reproducing of said optical recording medium with said second substrate thickness is conducted by using said light emitted from said second light source.

39. An optical head device, according to claim 38, wherein:

said first wavelength is about 635 nm and said second wavelength is about 785 nm.

40. An optical head device, according to claim 38, wherein:

an aperture control device which allows an incident light to be all transmitted through as to said first wavelength and allows only a central part in cross section of an incident light to be transmitted through as to said second wavelength is disposed between said optical coupling and dividing means and said objective lens.

41. An optical head device, according to claim 40, wherein:

said aperture control device and said objective lens is integrally driven in the directions of focusing and tracking by an actuator.

42. An optical head device, according to claim 40, wherein:

said aperture control device comprises a dielectric multilayer film which is formed on the outside of a circular region of a substrate that has a diameter smaller than an effective diameter of said objective lens, and a phase compensating film which is formed on the inside of said circular region, wherein said dielectric multilayer film allows said light with said first wavelength to be all transmitted through and allows said light with said second wavelength to be all reflected on, and said phase compensating film adjusts a phase difference between a light transmitting through the outside of said circular region and a light transmitting through the inside of said circular region to be about zero as to said first wavelength.

43. An optical head device, according to claim 40, wherein:

said aperture control device comprises a first substrate which includes a diffraction grating layer and a dielectric multilayer film formed on the outside of a circular region of said first substrate that has a diameter smaller than an effective diameter of said objective lens, and a second substrate which includes a phase compensating film formed above the inside of said circular region, said first and second substrates being adhered by an adhesive, wherein said dielectric multilayer film allows said light with said first wavelength to be all transmitted through and allows said light with said second wavelength to be all reflected on, and said phase compensating film adjusts a phase difference between a light transmitting through the outside of said circular region and a light transmitting through the inside of said circular region to be about zero as to said first wavelength.

44. An optical head device, according to claim 38, wherein:

one of said first: and second light sources and said optical detector are packaged in a common package.

45. An optical head device, according to claim 38, wherein:

said optical coupling and dividing means is a device which includes a dielectric multilayer film which allows said light emitted from said light source to be transmitted through and said light reflected on said optical recording medium to be reflected on as to one of said first and second wavelengths and allows an incident light to be reflected on as to the other of said first and second wavelengths.

46. An optical head device, according to claim 38, wherein:

said optical coupling and dividing means is a device which includes a dielectric multilayer film which allows said light emitted from said light source to be reflected on and said light reflected on said optical recording medium to be transmitted through as to one of said first and second wavelengths and allows an incident light to be transmitted through as to the other of said first and second wavelengths.

47. An optical head device, according to claim 38, further comprising:

an optical path control means which is disposed between said lens system and said optical detector and in which an effective optical path length from said at least one of first and second collimator lens to said optical detector as to said second wavelength is controlled to be shorter than an effective optical path length from said at least one of first and second collimator lens to said optical detector as to said first wavelength.

48. An optical head device, according to claim 47, wherein:

said optical path control means is a device which includes a dielectric multilayer film which allows an incident light to be transmitted through as to said first wavelength and allows an incident light to be reflected on as to said second wavelength, and which includes a reflection surface which allows said light reflected on said optical recording medium to be reflected on at least two times to be again led to said dielectric multilayer film after it is transmitted through said dielectric multilayer film as to said first wavelength.

49. An optical head device, according to claim 47, wherein:

said optical path control means is a device which includes a hologram which allows an incident light to be reflected and diffracted on as a +1st-order diffraction light as to said first wavelength and allows an incident light to be reflected on as to said second wavelength, wherein said hologram functions as a concave surface mirror as to a +1st-order diffraction light.

50. An optical head device, according to claim 48, wherein:

said hologram is composed a prism on an oblique plane of which a dielectric multilayer film and a hologram layer are formed, wherein said dielectric multilayer film allows an incident light to be transmitted through as to said first wavelength and allows an incident light to be reflected on as to said second wavelength.

51. An optical head device, according to claim 50, wherein:

said hologram layer has a step-like section.

52. An optical head device, comprising:

a first light source which emits a light with a first wavelength;

a second light source which emits a light with a second wavelength;

first and second optical detectors;

an optical coupling and dividing means in which said light emitted from said first light source and said light emitted from said second light source are coupled and are then individually led to a respective first and second substrate thickness of an optical recording medium, and in which said light emitted from said first light source and reflected on said optical recording medium is led to said first optical detector and said light emitted from said second light source and reflected on said optical recording medium is led to said second optical detector;

an objective lens which is disposed between said optical coupling and dividing means and said optical recording medium;

a first collimator lens which is disposed between said first light source and said optical coupling and dividing means; and a second collimator lens which is disposed between said second light source and said optical coupling and dividing means;

wherein a lens means by which at least one of said light emitted from said second light source is led to said objective lens as a divergent light and by which said light emitted from said first light source is led to said objective lens as a convergent light is disposed between said at least one of first and second collimator lens and said optical coupling and dividing means, and wherein at least one of recording and reproducing of said optical recording medium with said first substrate thickness is conducted by using said light emitted from said first light source, and at least one of the recording and reproducing of said optical recording medium with said second substrate thickness which is greater than said first substrate thickness is conducted by using said light emitted from said second light source.

53. An optical head device, according to claim 52, wherein:

said first wavelength is about 635 nm and said second wavelength is about 785 nm.

54. An optical head device, according to claim 52, wherein:

an aperture control device which allows an incident light to be all transmitted through as to said first wavelength and allows only a central part in cross section of an incident light to be transmitted through as to said second wavelength is disposed between said optical coupling and dividing means and said objective lens.

55. An optical head device, according to claim 54, wherein:

said aperture control device and said objective lens is integrally driven in the directions of focusing and tracking by an actuator.

56. An optical head device, according to claim 54, wherein:

said aperture control device comprises a dielectric multilayer film which is formed on the outside of a circular region of a substrate that has a diameter smaller than an effective diameter of said objective lens, and a phase compensating film which is formed on the inside of said circular region, wherein said dielectric multilayer film allows said light with said first wavelength to be all transmitted through and allows said light with said second wavelength to be all reflected on, and said phase compensating film adjusts a phase difference between a light transmitting through the outside of said circular region and a light transmitting through the inside of said circular region to be about zero as to said first wavelength.

57. An optical head device, according to claim 54, wherein:

said aperture control device comprises a first substrate which includes a diffraction grating layer and a dielectric multilayer film formed on the outside of a circular region of said first substrate that has a diameter smaller than an effective diameter of said objective lens, and a second substrate which includes a phase compensating film formed above the inside of said circular region, said first and second substrates being adhered by an adhesive, wherein said dielectric multilayer film allows said light with said first wavelength to be all transmitted through and allows said light with said second wavelength to be all reflected on, and said phase compensating film adjusts a phase difference between a light transmitting through the outside of said circular region and a light transmitting through the inside of said circular region to be about zero as to said first wavelength.

58. An optical head device, according to claim 52, wherein:

said first light source and said first optical detector are packaged in a first common package and said second light source and said second optical detector are packaged in a second common package.

59. An optical head device, according to claim 52, wherein:

said optical coupling and dividing means is a device which includes a dielectric multilayer film which allows an incident light to be transmitted through as to one of said first and second wavelengths and allows an incident light to be reflected on as to the other of said first and second wavelengths.

60. An optical head device, according to claim 52, wherein:

said lens means is at least one of a concave lens and a convex lens which is disposed between said second collimator lens and said optical coupling and dividing means and which allows said light emitted from said second light source to be led to said objective lens as a divergent light.

61. An optical head device, according to claim 52, wherein:

said lens means is a convex lens which is disposed between said first collimator lens and said optical coupling and dividing means and which allows said light emitted from said first light source to be led to said objective lens as a convergent light.

* * * * *